United States Patent [19]

Saylor

[11] 4,199,656

[45] Apr. 22, 1980

[54] DIGITAL VIDEO SIGNAL PROCESSOR WITH DISTORTION CORRECTION

[75] Inventor: Richard Saylor, Monsey, N.Y.

[73] Assignee: IDR, Inc., Farmingdale, N.Y.

[21] Appl. No.: 679,909

[22] Filed: Apr. 23, 1976

Related U.S. Application Data

[63] Continuation-in-part of Ser. No. 611,843, Sep. 10, 1975, Pat. No. 4,042,958.

[51] Int. Cl.² .......................... H04J 3/00; H04L 1/00
[52] U.S. Cl. ................... 178/66.1; 178/69 D; 358/147; 358/171; 358/280; 370/94
[58] Field of Search ............. 178/6, 6.8, DIG. 23, 178/5.6, 5.8 R, 68, 69 D; 179/15 AD

[56] References Cited

U.S. PATENT DOCUMENTS

| | | | |
|---|---|---|---|
| 3,727,135 | 4/1973 | Holzer | 178/68 |
| 3,757,051 | 9/1973 | Girard | 179/15 AD |
| 3,859,458 | 1/1975 | Takezawa | 178/DIG. 23 |
| 3,889,054 | 6/1975 | Nagel | 178/6.8 |
| 3,931,580 | 1/1976 | Hebda | 179/15 AD |
| 3,961,137 | 6/1976 | Hutt | 178/68 |

*Primary Examiner*—Howard W. Britton
*Attorney, Agent, or Firm*—Hubbell, Cohen, Stiefel & Gross

[57] ABSTRACT

An apparatus for compensating for signal distortions in an input digital signal, such as a pseudo video scan line having a television video scan line format and capable of comprising a complete self-contained packet of digital information sufficient to provide an entire video displayable row of video data characters, said signal comprising a plurality of ones and zeroes defining the digital information therein, the pseudo video scan line having associated peak-to-peak signal levels respectively defining the ones and zeroes wherein the signal distortion in the signal comprise the respective peak-to-peak signal levels associated with at least some of the plurality of ones and zeroes differing from the respective peak-to-peak signal levels associated with others of this plurality, the peak-to-peak signal levels resulting from zero-to-one and one-to-zero transitions in the signal, provides a compensated output digital signal from the distorted input digital signal having the same information content wherein the plurality of ones and the plurality of zeroes comprising the compensated output digital signal all have the same respective peak-to-peak signal levels varying about a common base level. The compensating apparatus comprises means for tracking both the zero-to-one and the one-to-zero transitions in the input digital signal operatively associated with means responsive to both the zero-to-one and one-to-zero transitions for providing the compensated output digital signal in which all ones and all zeroes are of the same respective levels.

42 Claims, 34 Drawing Figures

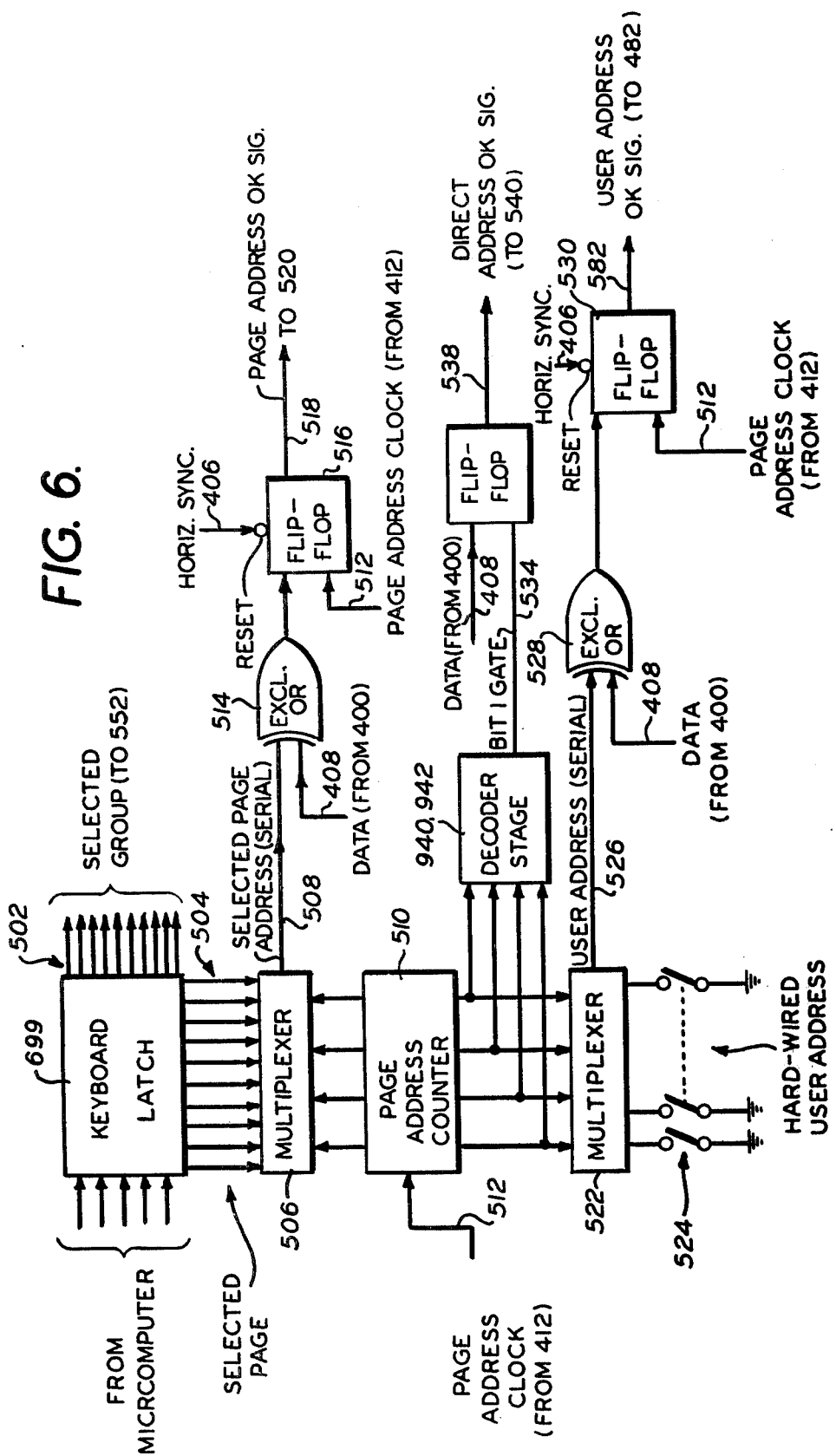

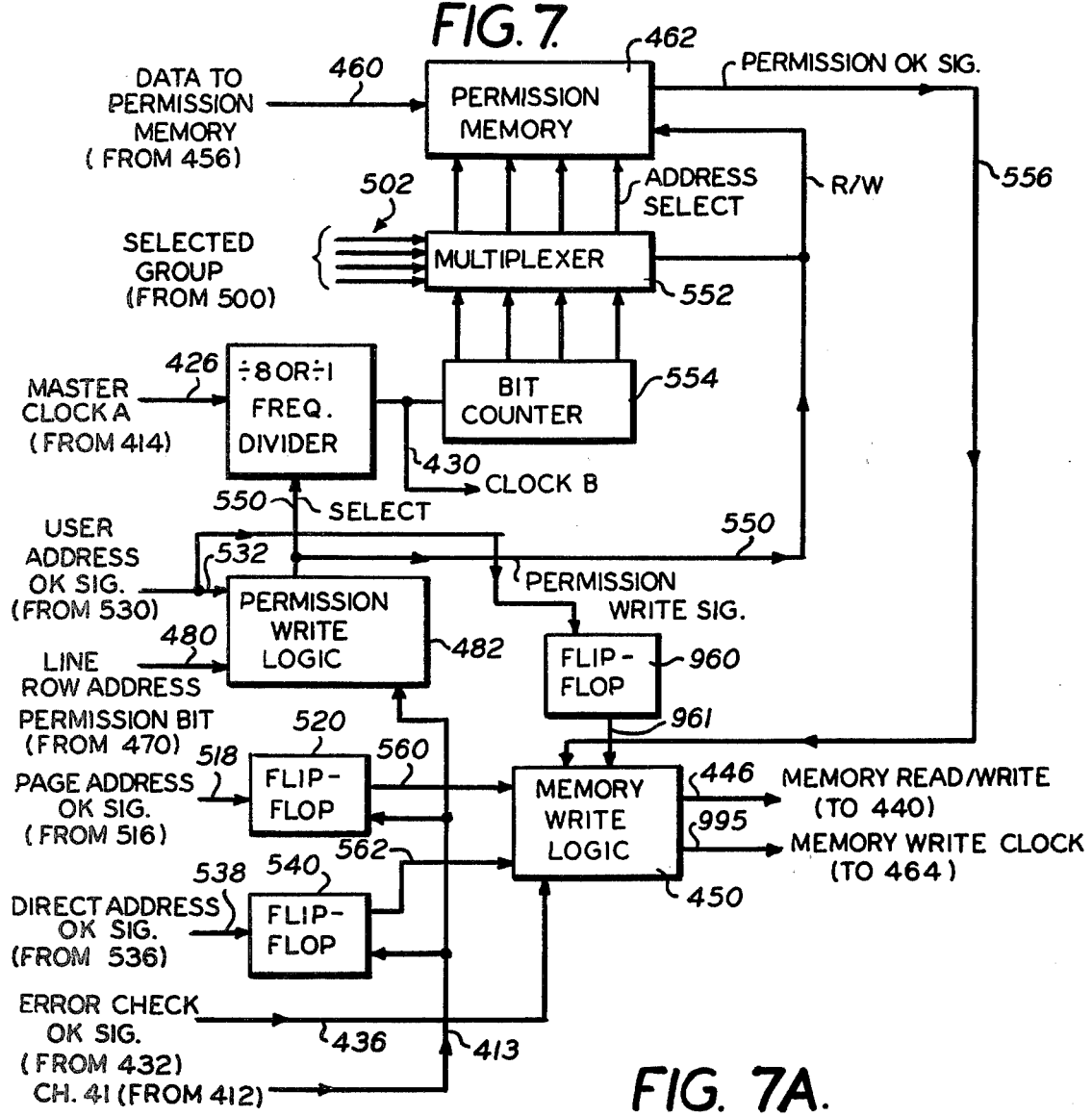
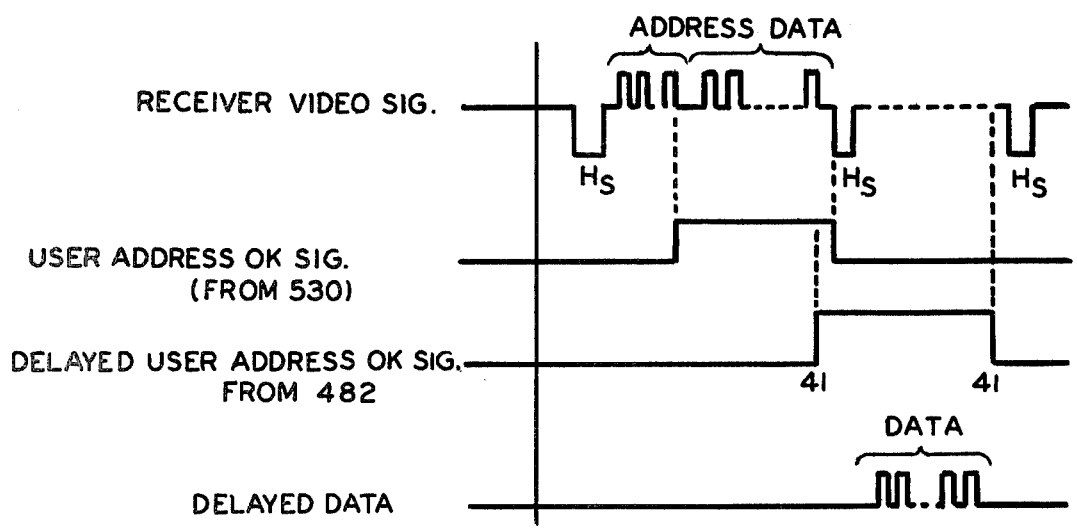

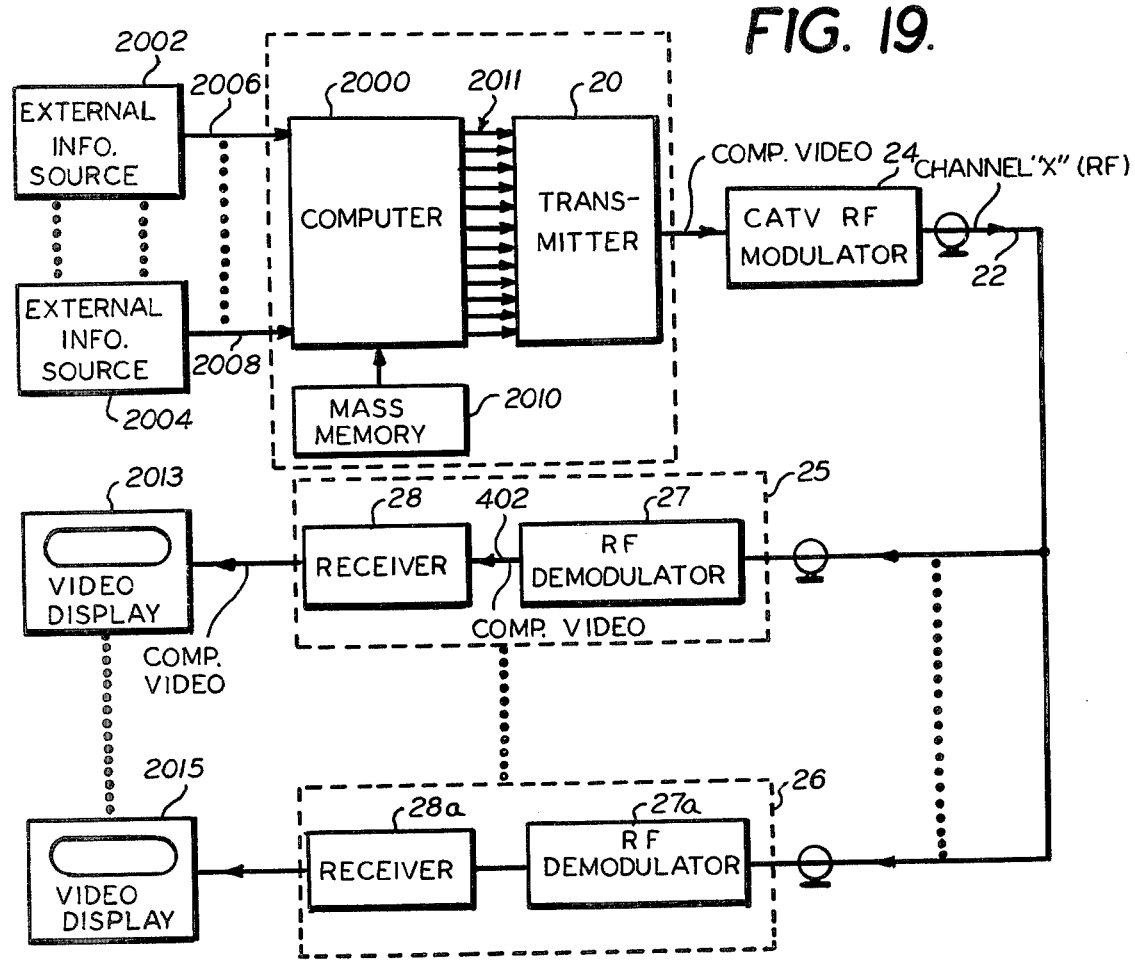
FIG. 19.
FIG. 21A. → ORIGINAL UNDISTORTED TRANSMISSION
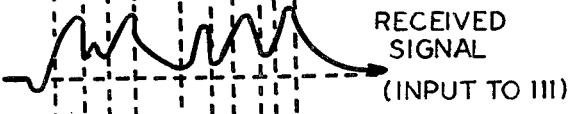
FIG. 21B. → RECEIVED SIGNAL (INPUT TO 111)
FIG. 21C. → CORRECTED SIGNAL (OUTPUT FROM 111)

DIGITAL VIDEO SIGNAL PROCESSOR WITH DISTORTION CORRECTION

CROSS-REFERENCE TO RELATED APPLICATIONS

This application is a continuation-in-part of a copending U.S. patent application entitled "Improved Row Grabbing System", filed Sept. 10, 1975, and bearing U.S. Ser. No. 611,843, now U.S. Pat. No. 4,042,958 and is related to the following: U.S. Pat. No. 3,889,954, issued June 10, 1975; and the commonly owned copending U.S. patent application of Robert H. Nagel, entitled "Information and Retrievable System Having Selectable Purpose Variable Function Terminal", filed Sept. 10, 1975 and bearing U.S. Ser. No. 611,937; my commonly owned copending U.S. patent application entitled "Interface for Enabling Continuous High Speed Row Grabbing Video Display with Real Time Hard Copy Print Out Thereof", filed Apr. 23, 1976 and bearing U.S. Ser. No. 679,907; the commonly owned copending U.S. patent application of Leonard Wintfield and Robert H. Nagel entitled "Row Grabbing Video Display Terminal Having Local Programmable Control Thereof", filed Apr. 23, 1976 and bearing U.S. Ser. No. 679,558; and my commonly owned copending U.S. patent application, entitled "Phase Locked Loop for Providing Continuous Clock Phase Correction", filed Apr. 23, 1976 and bearing U.S. Ser. No. 679,701, the contents all of which are specifically incorporated by reference herein.

BACKGROUND OF THE INVENTION

The present invention relates to digital signal communication systems such assuch systems in which digital video signal is processed for providing video communication.

DESCRIPTIOBN OF THE PRIOR ART

Video communication systems in which individual frames may be grabbed for video display are well known, such as the system disclosed in U.S. Pat. No. 3,740,465, or a system employing the Hitachi frame grabbing disc. These prior art systems such as the one disclosed in U.S. Pat. No. 3,746,780 are normally two-way request response systems requiring the user to request information by the dialing of a specific digital code which is uniquely assigned to each frame. However, such systems normally grab a group of frames for storage and then subsequently select the individual frame for display out of the group of grabbed frames as opposed to instantaneously selecting a single frame in real time. Furthermore, such prior art systems do not provide for real time updating of the grabbed video frame. Furthermore, some such prior art frame grabbing systems, such as the type disclosed in U.S. Pat. No. 3,397,283, are normally capable of only grabbing the next immediate signal in response to the provision of a starter signal or, as disclosed in U.S. Pat. No. 3,051,777, utilize a counter for frame location which must be reset to the beginning of a tape for video tape supplied information in order to locate a selected frame to be grabbed. These systems are not applicable in a real time frame grabbing environment. Similarly, other typical prior art frame grabbing systems, such as disclosed in U.S. Pat. Nos. 3,695,565; 2,955,197; 3,509,274; 3,511,929; and 3,582,651, cannot be utilized in a real time frame grabbing environment, such as one in which the video information associated with the grabbed frame is capable of being continuously updated. Accordingly, presently available prior art frame grabbing systems familiar to the Inventor are not capable of easily locating a frame to be grabbed in real time nor of being able to continuously update such a grabbed frame in real time.

Video communication systems in which the signal being transmitted is digitized are also well known. For example, U.S. Pat. No. 3,743,767 discloses a video communication system for the transmission of digital data over standard television channels wherein the digital data is transmitted in a conventional television scan line format through conventional television distribution equipment. However, such a prior art communication system merely digitizes one television scan line at a time for distribution to a video display terminal on a bit-by-bit basis in a line, 84 bits of information being provided per television scan line. Furthermore, such a prior art system is not transmission selectable by every display terminal nor is the data for a displayable video row packed into a self-contained pseudo video scan line information packet. Thus, there is no significant increase in the data transmission rate resulting from such a prior art video communication system. Similarly U.S. Pat. Nos. 3,061,672 and 3,569,617 and German Patent No. 2,307,414 are examples of other prior art video communication systems in which television signals are digitized without any significant resultant compression in data transmission time. Furthermore, these other prior art systems require special distribution circuitry. In addition, prior art video communication systems in which a digital television signal is transmitted do not sufficiently isolate the individual rows comprising a frame so as to provide satisfactory noise immunity between those rows nor is there satisfactory data compression in the transmission time of the video information in such prior art systems nor satisfactory distortion compensation.

Moreover, in such prior art video communication systems known to the Inventor, the logic data extracted from the digital input data may contain significant signal distortions, such as signal distortions resulting from use of a conventional vestigal sideband modulation scheme for transmission as well as from phase delay distortion in the cable transmission system used to transmit the signal and the bandwidth limitations inherent in the FCC channel allocations for conventional video transmission. These distortions occur in any TV transmission and are not generally compensated for due to low required levels of fidelity. However, when high levels of fidelity are required, the prior art systems known to the Inventor do not adequately compensate for both one-to-zero and zero-to-one transition distortions which manifest themselves in the zeros and ones comprising the input digital signal not always returning to the same level, thus providing unsatisfactory results. These disadvantages of the prior art are overcome by the present invention.

SUMMARY OF THE INVENTION

An apparatus is provided for compensating for signal distortions in an input digital signal, such as a pseudo video scan line having a television video scan line format and capable of comprising a complete self-contained packet of digital information sufficient to provide an entire video displayable row of video data characters, the pseudo video scan line having an associated transmission time equivalent to the television video scan line. The digital information comprising the input signal comprises a plurality of ones and zeros defining the information content for the input digital signal. The input digital signal has associated peak-to-peak signal levels respectively defining the ones and zeros wherein the signal distortion in the input digital signal comprises the respective peak-to-peak signal levels associated with at least some of the plurality of ones and zeros comprising the input digital signal differing from the respective peak-to-peak signal levels associated with others of the plurality of ones and zeros comprising the input digital signal. These peak-to-peak signal levels of the input digital signal result from zero-to-one and one-to-zero transitions in the input digital signal. The compensating apparatus provides a compensated output digital signal, such as a compensated pseudo video scan line, from the distorted input digital signal, assuming the input digital signal is a pseudo video scan line, having the same information content as the input digital signal defined information content. The plurality of ones and the plurality of zeros comprising the compensated output digital signal provided from the compensating apparatus all have the same respective peak-to-peak signal levels varying about a common base level. In accomplishing this, the compensating apparatus comprises means for tracking the zero-to-one and one-to-zero transitions in the input digital signal, such as a capacitive means. A first means, such as a silicon diode means, is operatively connected to the tracking means and responsive to each tracked zero-to-one transition in the peak-to-peak signal level of the input digital signal for clamping the level of the zero-to-one transition at a first predetermined signal level irrespective of any continued rise which may occur in the level of the distorted input digital signal zero-to-one transition, this first clamping means maintaining the clamped zero-to-one transition at the first predetermined signal level until the presence of a subsequent one-to-zero transition in the distorted input digital signal is detected, whereby the signal level becomes unclamped. The tracking means tracks the subsequent one-to-zero transition in the unclamped signal. Second means, such as another silicon diode means, are operatively connected to the tracking means and responsive to the tracked subsequent one-to-zero transition for the unclamped signal for reclamping the level of the tracked subsequent one-to-zero transition at a second predetermined signal level, such as one below the common base level by an amount equal in magnitude to the amount that the first predetermined signal level is above the common base level, irrespective of any continued fall which may occur in the level of the distorted input digital signal subsequent one-to-zero transition until the presence of a subsequent zero-to-one transition in the distorted input digital signal is detected, whereby the signal level of the reclamped signal again becomes unclamped. The tracking means then tracks the subsequent zero-to-one transition in the again unclamped signal and the zero-to-one transition responsive means is again responsive to the tracked subsequent zero-to-one transition for providing the clamping thereof at the first predetermined signal level until another subsequent one-to-zero transition in the distorted input digital signal is detected, whereby the signal level once again becomes unclamped. In this manner, the tracking means in conjunction with the first and second clamping means cyclically clamp and unclamp the distorted input digital signal at the respective first and second predetermined levels in accordance with the occurrence of the respective zero-to-one and one-to-zero transitions in the peak-to-peak signal level of the distorted input digital signal for providing the compensated output digital signal. Thus, the compensating apparatus responds to both the zero-to-one and one-to-zero transitions in the input digital signal so as to produce a compensated output digital signal which has all ones and all zeros of the same respective levels. A plurality of successive ones or successive zeros may occur in the input digital signal in which instance the clamped voltage output due to the operation of the first or second clamping means would normally tend to decay as a result of the discharge of the capacitive tracking means and in order to compensate for this, a compensating charge voltage, such as from a resistive-capacitive network, is preferably provided to the clamped signal for compensating for any decay in the clamped signal resulting from the aforementioned occurrence of successive ones or zeros in the input digital signal. The compensating apparatus, as previously mentioned, is responsive to the occurrence of either a zero-to-one or one-to-zero transition, irrespective of the order of their occurrence, to provide the aforementioned compensated output digital signal from the distorted input digital signal.

The compensating apparatus may comprise part of an improved real time frame grabbing video display terminal for substantially instantaneously providing a continuous direct video display of a selectable predetermined video frame of information on a video display means from continuously receivable information remotely provided over a transmission media wherein the continuously receivable information comprises a plurality of pseudo video scan lines, such as a terminal comprising microcomputer means for controlling the operation thereof and selection means operatively connected to the microcomputer means for variably selecting the predetermined video frame to be continuously displayed. Furthermore, the aforementioned improved terminal may be comprised in an improved real time frame grabbing system for substantially instantaneously providing a continuous video display of a selectable predetermined video frame of information on a video display means from continuously transmittable video information, wherein the improved system comprises means for transmitting this information as a plurality of pseudo video scan lines which each contain a horizontal sync signal as a record separator between adjacent pseudo video scan lines and in which a vertical sync signal is transmitted after a predetermined plurality of pseudo video scan lines with the pseudo video scan line being a composite video signal, such improved system further comprising television signal distribution means, such as comprising coaxial cable, for distributing the transmitted composite pseudo video scan line signals to the video display means for providing the continuous video display with the aforementioned improved receiver or terminal being operatively connected between the television signal distribution means and the video display means for processing the distributed composite video scan line signals for providing a displayable video row signal to the video display means from each of the pseudo video scan line signals pertaining to the selected frame for providing the continuous video display. In such an improved system, it is the compensated pseudo video scan line which is provided from the distorted received pseudo video scan line in accordance with the operation of the aforementioned compensating apparatus in order to provide the continuous video display.

BRIEF DESCRIPTION OF DRAWINGS

FIG. 6 is a block diagram of another portion of the memory input control portion of the preferred improved receiver of the present invention;

FIG. 7 is a block diagram of the memory and output processing portion of the preferred improved receiver of the present invention;

FIG. 7A is a graphical illustration of the timing associated with various signals in the arrangement of FIG. 7;

FIG. 19 is a functional block diagram of the preferred embodiment of the improved row grabbing system of the present invention;

FIGS. 21A, 21B and 21C are graphic illustrations of the various waveforms present throughout the video processor of FIG. 20 which illustrate the operation of the signal distortion compensating apparatus of FIG. 20 therein;

DETAILED DESCRIPTION OF THE PREFERRED EMBODIMENTS

General System Description

Figure 1:
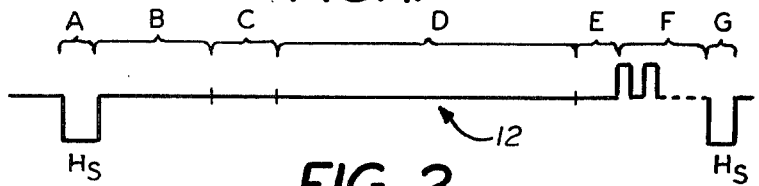
FIG. 1 is a diagrammatic illustration of a typical pseudo video scan line format in accordance with my previous U.S. Pat. No. 3,889,054.

Referring now to the drawings in detail and initially to FIG. 19 thereof, the preferred embodiment of the row grabbing system, generally referred to by the reference numeral 10, described in our previously issued U.S. Pat. No. 3,889,054, of which the foregoing invention is an improvement thereon in shown. As shall be described in greater detail hereinafter, the general system description of the present invention is essentially similar to that previously given in the aforementioned U.S. Pat. No. 3,889,054 with the exception that the present improved row grabbing system preferably utilizes a microcomputer control in the receiver portion in place of some of the hard-wiring control functions performed by the row grabbing system described in U.S. Pat. No. 3,889,054. For purposes of clarity, where applicable, the appropriate pertinent portions of the row grabbing system described in our U.S. Pat. No. 3,889,054 will be reiterated herein, the balance of the applicable description therein being specifically incorporated by reference herein. The row grabbing system 10 of the present invention is preferably a one-way frame grabbing system in which continuously transmitted information or messages are transmitted via pseudo scan lines 12a, illustrated in FIGS. 2 and 3, on a row-by-row basis, with the pseudo video can line 12a preferably being identical in format to a conventional video scan line; that is, it is consistent with FCC and EIA standards for a video scan line signal format. However, this pseudo video scan line 12a actually contains a row of information such as approximately between 11 and 13 actual television video scan lines of information, with the transmission time of the pseudo video scan line 12a preferably being equal to the transmission time of a conventional TV video scan line, which is approximately 63 microseconds. The various portions of the pseudo video scan line 12a will be described in greater detail hereinafter with reference to FIGS. 2 and 3 and it should be noted at this time that the format for the preferred pseudo video scan line 12a of the present invention is similar, with certain exceptions to be described hereinafter, to the previously preferred format for the pseudo video scan line 12, illustrated in FIG. 1, which was described in our previously issued U.S. Pat. No. 3,889,054, with identical regions thereon being given the same reference designations. As was shown in that patent, in the row grabbing system 10 of the present invention, the information is updated on a row-by-row basis by transmission of a pseudo video scan line containing new information so that the frame being grabbed will effectively have this row containing new information updated when this row of information is updated in memory. In the preferred system 10 of the present invention, as well as in the system described in U.S. Pat. No. 3,889,954, continuously transmitted information or messages may be instantaneously "grabbed" in real time so as to repetitively provide a video display of a selected video frame of such information which may be updated on a row-by-row basis in real time.

Figure 15:
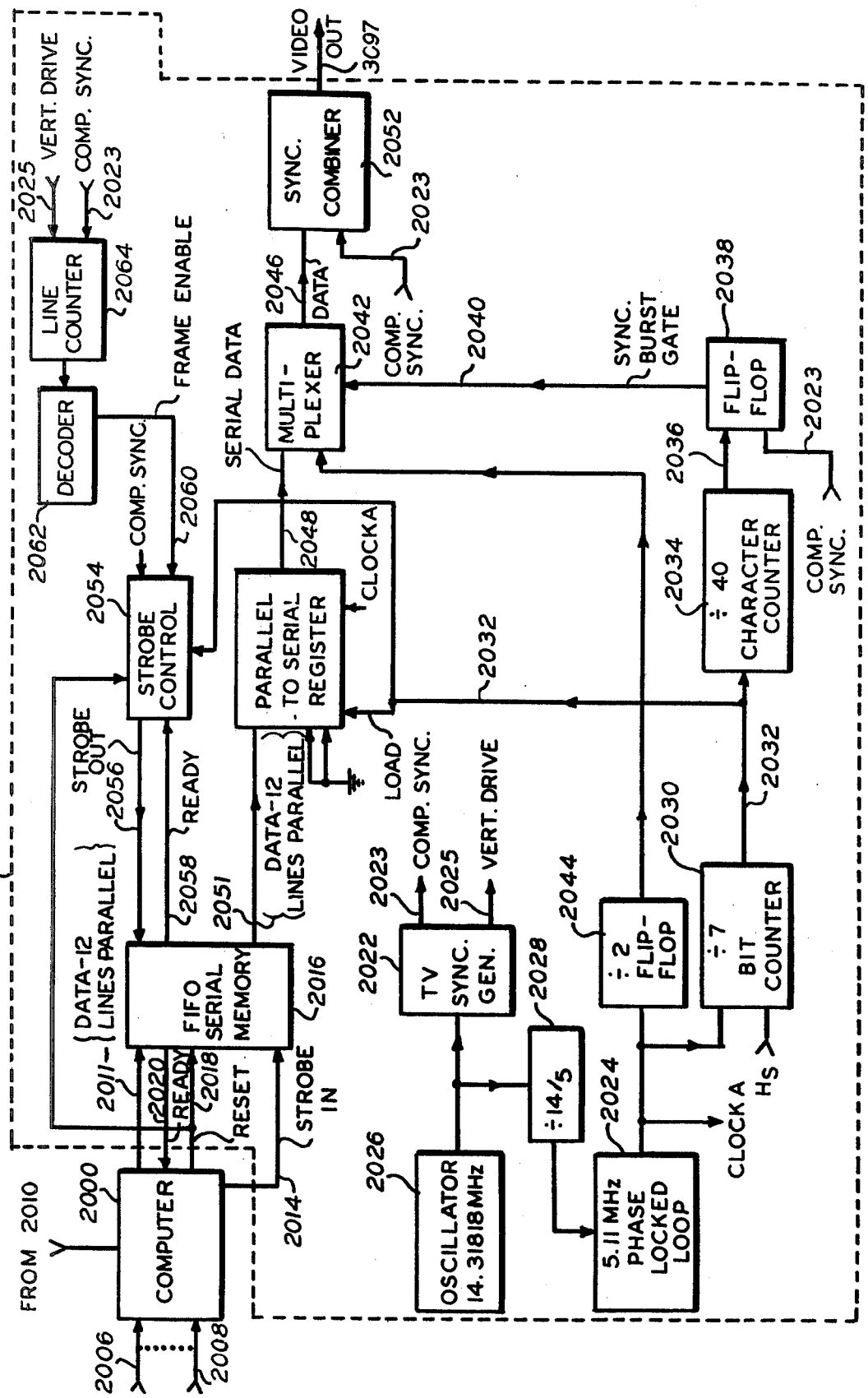
FIG. 15 is a block diagram of the preferred transmitter portion of the present invention.
Figure 16:
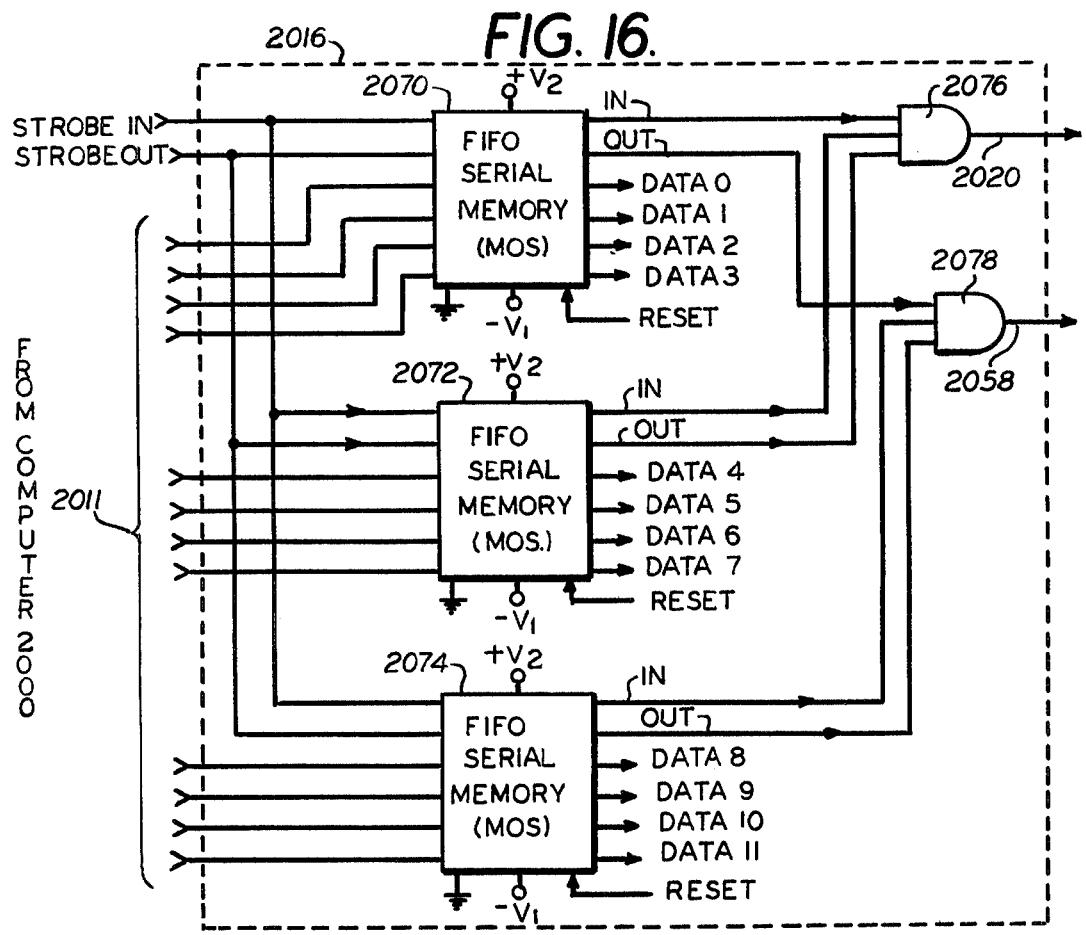
FIG. 16 is a logic diagram of the first in-first out memory portion of the transmitter portion illustrated in FIG. 15.
Figure 17:
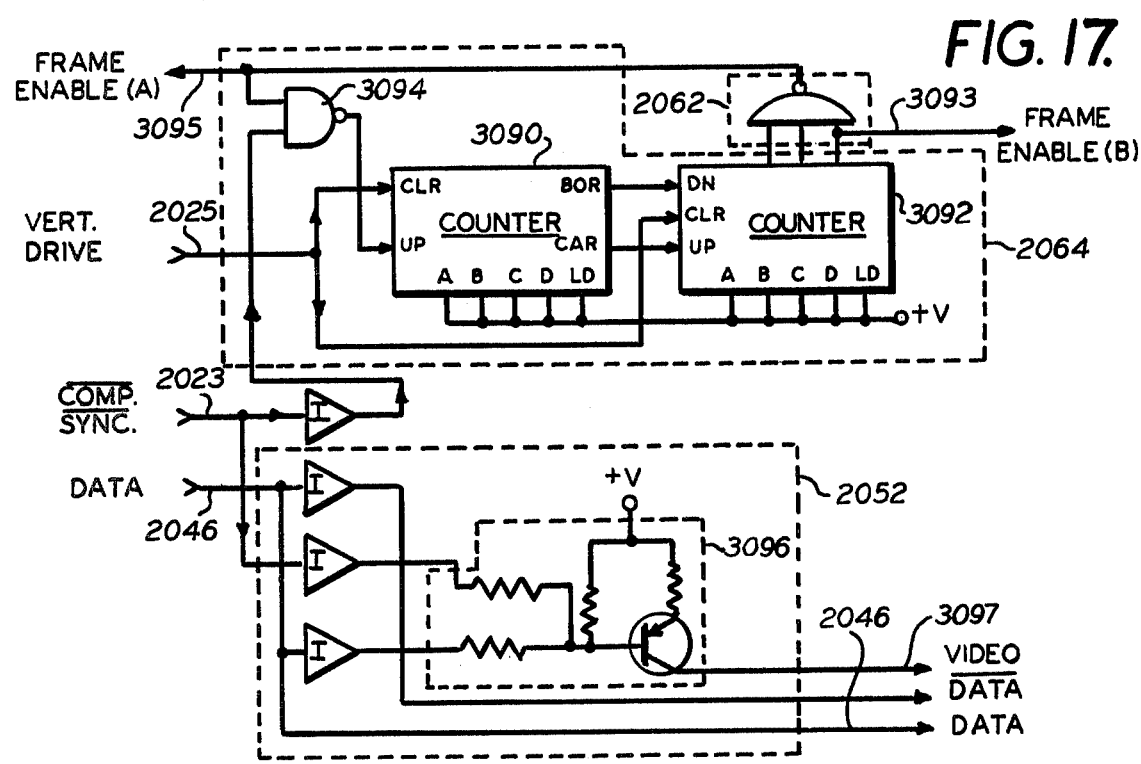
FIGS. 17 and 18 are logic diagrams, partially in schematic, of the transmitter portion illustrated in FIG. 15 except for the first in-first out memory portion illustrated in FIG. 16.
Figure 18:
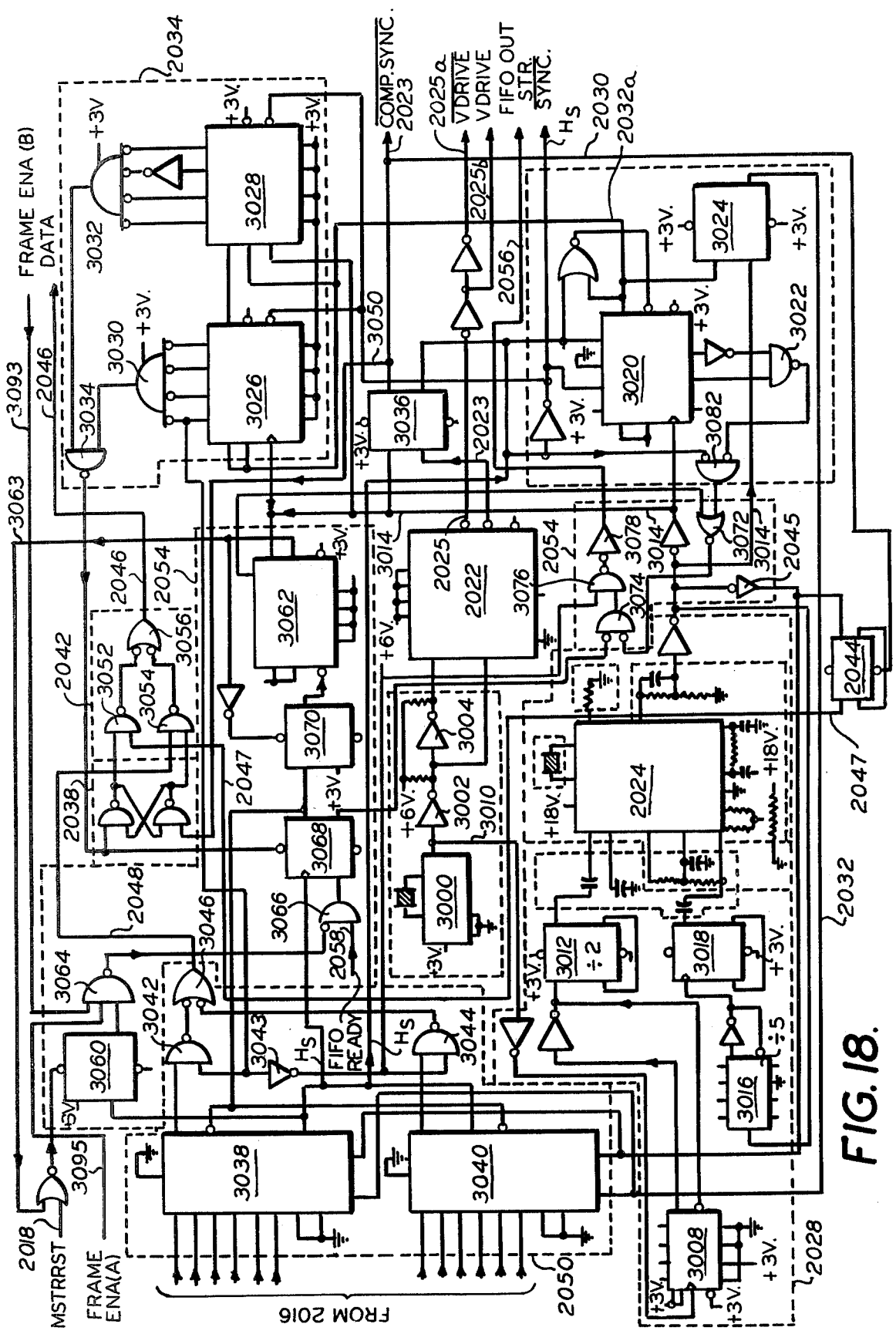

Video information may be of any conventional type, such as news information, money rate information, stock market information, local advertising, television program listings, weather information, consumer information, etc., which is conventionally supplied from conventional external information sources for such types of information, such as sources 2002 and 2004 shown by way of example. These conventional external information sources 2002 and 2004 preferably conventionally supply this information in a digital format such as from a ticker for news information or stock information, by way of example, through a conventional communication line 2006 or 2008 or a conventional local video terminal, preferably, to a conventional minicomputer 2000, such as a model No. PDP-8e manufactured by Digital Equipment Corp. Minicomputer 2000 preferably has an associated conventional mass memory 2010 for conventional storage of data. Computer 2000 stores this information in mass memory 2010, reformats it, such as by adding other information, and continuously provides this information as a 12 bit parallel output 2011 to a transmitter 20, to be described in greater detail hereinafter, which provides the pseudo video scan line 12a for transmission to the TV distribution network. It should be noted that at any time, the 12 bit parallel output of computer 2000 preferably presents two characters for one word. If desired, a 14 bit parallel output from the computer 2000 could be utilized to provide two 7 bit characters. The mass memory 2010 is preferably updated by the computer 2000 in conventional fashion at the optimum transfer time for data which is, conventionally, not necesarily in the order of the reception of the external information from sources 2002 and 2004, this data being preferably continuously suppliable in real time to the computer 2000. In conventional fashion, information in computer 2000 is supplied to the transmitter 20 which, in turn, supplies this information to a CATV cable system 22 through a conventional RF modulator 24, composite video being supplied to modulator 24 from transmitter 20. One such modulator 24 is preferably provided for each television channel on which information is to be transmitted, only one such channel being illustrated in FIG. 15 by way of example. Preferably, the mass memory 2010 which is read in conventional fashion by computer 2000 to provide the requisite information via transmitter 20 to the CATV cable system 22, has sufficient storage capacity to store the entire page capacity of the system.

As used hereinafter throughout the specification and claims the term "page" means one video frame of information, the term "group" means a predetermined number of pages, the term "row" is a displayable video row and means a portion of a page containing a plurality of conventional television video scan lines, the term "pseudo video scan line" means a signal which is identical in form to that of a conventional video scan line but which actually contains a row of information, such as approximately between 11 and 13 actual television video scan lines of information with the transmission time of the pseudo video scan line being equal to the transmission time of a conventional TV video scan line and with the pseudo video scan line being an entire packet of information necessary for video display of that row. The term conventional or television video scan line is used in the conventional manner.

As described in our previously issued U.S. Pat. No. 3,889,054, the mass memory 2010 can be any conventional mass memory storage device sufficient to store the requisite page capacity of the system, such as an RK-08 memory device manufactured by Digital Equipment Corp. The output of the computer 2000 is preferably conventionally transmitted from computer 2000 to the transmitter 20 via conventional data break of the computer 2000. All pages of information are preferably continuously being transmitted from the computer 2000 through transmitter 20 on a pseudo-video-scan-line-by-pseudo-video-scan-line basis, that is respectively on a row-by-row basis, through the appropriate RF modulator 24 for the video channel being utilized and therefrom through the CATV cable system 22 to conventional video display terminals or devices 2013 and 2015, such as commercially available video monitors, two such devices being shown by way of example. It should be noted that the number of video display devices 2013 and 2015 preferably have no requisite correlation with the number of external information sources 2002 and 2004 and more such sources could be utilized than video display devices or vice versa if desired. In normal contemplated use, the number of video display devices 2013 and 2015 will normally exceed the number of external information sources 2002 and 2004, however, this need not be the case. The computer 2000 conventionally recirculates the data provided thereto in continuous fashion and, as previously mentioned, eventually updates the mass memory 2010 at the optimum transfer time for the data, which time is not necessarily in the order of reception of the external information from sources 2002 and 2004. The information from external sources 2002 and 2004, which is preferably being provided substantially continuously to the computer 2000 (as long as it is being generated from the external sources 2002 and 2004) is provided to the mass memory 2010 and instantaneously to the transmitter 20 which operates in a manner to be described in greater detail hereinafter to provide the pseudo video scan line 12a transmission of the information. Each video display device 2013 and 2015 preferably has an associated display control unit 25 and 26, respectively, which preferably functions to enable the real time frame grabbing or selection of a single page of continuously transmitted information for the instantaneous repetitive continuous video display, or frame grabbing thereof, this information being updatable on a row-by-row basis in real time. Preferably, each of the display control units 25 and 26 by way of example, one such display control unit preferably being associated with each video display terminal device, are identical in structure and operation. If desired, however, any display control unit 25–26 may be modified in a manner, such as described in U.S. Pat. No. 3,889,054, so as to prevent the reception of certain categories of information while enabling the reception of other categories of information. For purposes of clarity, only one such typical display control unit 25 will be described by way of example, the structure and operation previously mentioned, being identical with that of display control unit 26. Identical reference numerals, followed by the letter "a" will be utilized in FIG. 19 for elements of display control unit 26 which are identical in structure and operation with those of display control unit 25. In the overall system block diagram of FIG. 19, the display control unit 25 preferably contains a conventional RF demodulator 27, one such RF demodulator 27 being provided for each channel and a receiver 28, to be described in greater detail hereinafter, which receiver preferably includes a microcomputer and which receives the composite video demodulated by demodulator 27 and determines whether the user is correct, the user has permission to receive the pseudo video scan line information being transmitted at that time, whether the signal is error free, whether the page address of the pseudo video scan line is correct, and whether a direct address condition exists, and, preferably, assuming the pseudo video scan line signal passes all these tests, then the receiver processes this signal and provides a video signal corresponding to a displayable row of information on the video display device 2013.

Figure 2:
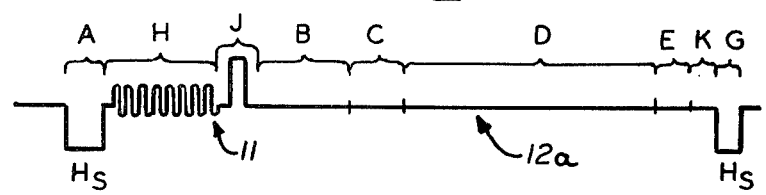
FIG. 2 is a diagrammatic illustration of a typical pseudo video scan line format in accordance with the present invention.

Referring now to FIGS. 4 through 14, 20 through 23, and once again to FIGS. 2 and 3, the preferred improved receiver portion 28 of the improved row grabbing system 10 of the present invention shall be described in greater detail. As will be described with reference to the preferred transmitter portion 20 of the row grabbing system 10 of the present invention, the transmitter 20 preferably provides the pseudo video scan line such as the type 12a illustrated in FIG. 2. This pseudo video scan line 12a, as was previously described, is identical in format to a conventional video scan line; that is, it is consistent with FCC and EIA standards for video scan line signal format; however this pseudo video scan line 12a actually contains a row of information, such as approximately between 11 and 13 actual television video scan lines of information with the transmission time of the pseudo video scan line 12a being equal to the transmission time of a conventional TV video scan line, which is approximately 63 microseconds. With respect to the pseudo video scan line 12a, the horizontal sync and vertical sync portions are preferably identical to a conventional video signal as is the format for the horizontal sync and the vertical sync as well as the horizontal sync amplitude. The time and amplitude envelope of the video region of the pseudo video scan line 12a, which region is defined as areas H, J, B, C, D, E, and K in FIG. 2, is identical with the format for a conventional video scan line as is the three dimensional frequency envelope. Thus, all of the above mentioned standard conditions for a conventional video scan line signal are met by the pseudo video scan line 12a provided by the transmitter portion 20 of the improved row grabbing system 10 of the present invention and received by the improved receiver portion 28. Accordingly, any equipment that can handle conventional video can handle the pseudo video scan line 12a of the present invention which can thus be transmitted and received through a conventional television distribution system with conventional television equipment.

Figure 3:
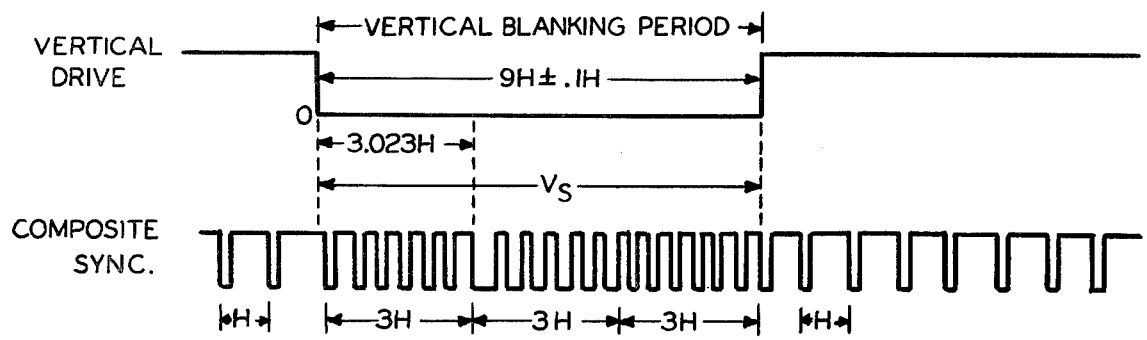
FIG. 3 is a graphical illustration of conventional vertical drive and composite sync signals illustrating the origin of the vertical sync signal in accordance with the present invention.

Returning once again to the pseudo video scan line 12a illustrated in FIG. 2, as is also true for the pseudo video scan line 12 illustrated in FIG. 1 which was previously described in our U.S. Pat. No. 3,889,054, the signal received by the receiver portion 28 and transmitted by transmitter 20 is in reality a digital signal which looks like a conventional video scan line to the receiver 28. Pseudo video scan line 12a, as will be described in greater detail hereinafter, however, preferably employs a start bit to provide timing and phase adjustment for the phase locked loop of the receiver terminal 28. In such an instance, region F which was previously contained in the pseudo video scan line 12 transmitted in the system of our U.S. Pat. No. 3,889,054, and which contained the clock synchronizing burst or pulse train at the bit rate (the frequency preferably being equal to one-half the bit rate) and comprised a pulse train of ones and zeros for two character spaces or 14 bits, is not present and the sync burst information which was previously contained therein is not required for timing and phase adjustment in the improved row grabbing system of the present invention. Instead, region H, which preferably contains color burst information and region J which preferably contains one start bit are preferably inserted between regions A and B, with regions B, C, D, and E being electronically shifted down in position to be adjacent region G, only being separated therefrom by a region K, which region K merely represents the standard TV spacing for providing the front porch of the signal, the back porch of the signal being defined between region A and the leading edge of the start bit in region J. The color burst signal in region H preferably is the standard FCC eight cycle signal at 3.58 megahertz. Apart from the repositioning and deletion of certain regions of the pseudo video scan line 12 of FIG. 1, the contents of regions A, B, C, D, E and G in pseudo video scan line 12a of FIG. 2 is preferably identical with that previously described with reference to FIG. 1 in our U.S. Pat. No. 3,889,054 with respect to the transmission of a displayable row of data. Suffice it to say for purposes of clarity, that region A represents the horizontal sync signal which indicates the beginning of the pseudo video scan line from the beginning of the horizontal sweep for a conventional television scan line; and region B represents the pseudo video scan line 12a address which contains all the following information bit locations, a one preferably indicating the presence of a pulse and a zero preferably indicating the absence of a pulse, all of the following information bits preferably being present when data is transmitted: group, which is the section or chapter including a predetermined number, such as 1,000, of pages and is the most significant bit of the page address, page which represents one frame in a group, and row which occupies one character space which is preferably 7 bits and defines a portion of the page preferably containing approximately 11 to 13 scan lines which comprise one displayable character. The region B also preferably contains direct address information, which is the first transmitted bit preferably and is a zero unless a direct address condition exists which is a control condition for a selected terminal informing the terminal to supercede the requested page. This region B also preferably contains permission information which is a one bit position which is preferably a one only when the user is being given authority to receive one or more selected groups of information. It should be noted that preferably there is also an emergency override condition which provides control information to all terminals to override all requests including the permission request and preferably occurs on a page and group information bit location of zero, this condition preferably being utilized to display emergency information such as a civil defense warning. Region C is preferably a special character information region of 7 bits which is preferably utilized for optional functions to be performed by the individual receiver 28 or terminal. Region D preferably contains 32 characters of displayable information in digital form. Region E preferably contains error check information, as will be described in greater detail hereinafter. Region G is preferably the same as region A and represents the horizontal sync signal. As was previously mentioned, the vertical sync is preferably provided by generating a special sequence of horizontal sync pulses during the normal television blanking period, which is after approximately 236 horizontal sync pulses, which in the present invention as in U.S. Pat. No. 3,889,054 is after approximately 15 pages have been transmitted. Therefore, 15 pages are transmitted before each vertical sync. The sync signal looks like a conventional composite sync signal with a vertical sync interval comprising approximately nine normal horizontal sync pulse times as illustrated in FIG. 3 which is an illustration of conventional composite sync and vertical drive signals.

RECEIVER-VIDEO PROCESSOR PORTION

Now referring to FIGS. 4, 20, 21a through C, 22 and 23, the preferred embodiment of the video processor portion of the receiver 28 of the present invention which contains the preferred compensation circuit 111 (FIG. 20) therein shall be described hereinafter. Referred initially to FIG. 20, the composite video input signal via path 402 (FIG. 5) is provided to the preferred video processor 4000 via path 100 which is the video processor input therefor. This signal is conventionally amplified, such as by a conventional transistor amplifier 101 which drives both a conventional sync separator circuit 102 for providing the vertical sync and horizontal sync outputs therefrom in conventional fashion, and a preferred video processing circuit 103 to be described in greater detail hereinafter. The preferred video processing circuit 103 preferably extracts the correct logic data from the input data from the composite video input signal. This input data may contain significant distortions resulting from a conventional vestigal sideband modulation scheme utilized for transmission as well as from phase delay distortion in a cable transmission system and the bandwidth limitations inherent in the FCC channel allocations. These distortions generally occur in any television transmission and are not normally compensated for due to the low level fidelity requirements of conventional television transmission and display. The nature of the aforementioned distortion is illustrated in FIGS. 21 A through 21 C. FIG. 21 A represents the original undistorted transmission; FIG. 21 B represents the received signal which is provided to the preferred distortion compensation circuit 111, to be described in greater detail hereinafter, which is preferably included in the preferred video processing circuit 103, this signal containing distortions as previously mentioned; and FIG. 21 C illustrates the corrected or distortion compensated signal output from preferred distortion compensation circuit 111. The nature of the distortion as illustrated in FIGS. 21 A through 21 C is such that zeros and ones do not always return to the same level, the level of each zero and one being dependent on the preceding few bits of data as illustrated in FIG. 21 B. It should be noted at this point that although the amplitudes of the signals in FIGS. 21 A and 21 C are different, if desired these amplitudes could be the same, the primary difference between the original undistorted transmission and the corrected signal output of preferred distortion compensator 111 being the sloping sides of the pulses present in the compensated or corrected signal of FIG. 21 C.

The received signal illustrated in FIG. 21 B which contains the aforementioned distortions is preferably provided to the preferred video processing circuit 103 via path 105 which provides this signal to a conventional synchronous clamp circuit 104. As shown and preferred in FIG. 20, this received signal provided via path 105 to synchronous clamp 104 is shorted through a reference voltage at a point A at the beginning of each horizontal scan line. This is preferably accomplished by field effect transistor 106 which acts as a fast switch. A gate pulse provided via path 107 (FIG. 22) which is termed the "keyed clamp gate" signal, turns field effect transistor 106 on through transistor driver 108 for a short part of the back porch of the signal, this interval being defined as after the color burst which is in region H and before the start bit which is the pulse in region J (FIG. 2). As a result, the DC level of the data lne, represented by path 109, is the same at the start of each horizontal scan line. Without the presence of this synchronous clamp 104, the DC level would change from line to line depending on the relative number of ones and zeros defining the data content of each line. Synchronous clamp 104 insures that the receiver terminal 28 will respond properly to the first data line that follows a group of empth or no data lines. The output of synchronous clamp 104 via data line 109 is preferably provided to preferred distortion compensation circuit 111 through a conventional isolation amplifier 110 whose input is the data line 109, with isolation amplifier 110 preferably having a high input impedance which prevents any average change of DC level during a horizontal scan line period. As illustrated in FIG. 21 B, when distortion is present in the received signal, there is a significant peak-to-peak change although the value of the location of the peaks may differ. Preferred distortion compensation circuit 111 preferably responds to the one-to-zero or zero-to-one transitions in the signal. When the transition is a zero-to-one transition, as shown and preferred in FIG. 20, the right side or output side of capacitor 112 rises positively tracking the transition up to a predetermined voltage, such as preferably the normal threshold voltage of the silicon diodes 113 and 114 utilized in the preferred distortion compensation circuit 111, this voltage preferably being by way of example 0.7 volts. At that time, this diode 113, which as previously mentioned is preferably a silicon diode, conducts clamping the voltage at this predetermined value of 0.7 volts even though the input data may continue to rise in voltage value. This predetermined voltage is maintained until a one-to-zero transition occurs. As soon as the input voltage reverses direction, as caused by a one-to-zero transition, silicon diode 113 cuts off and the voltage at the right side or output side of capacitor 112 falls tracking the input change until, preferably, it reaches the negative equivalent of this predetermined preferred voltage which, in the example given, is −9.7 volts. At that time silicon diode 114 which preferably has the same threshold level as silicon diode 113, conducts clamping the voltage at this predetermined level, which by way of example is −0.7 volts, until a zero-to-one transition occurs at which point silicon diode 114 cut off and the aforementioned cycle repeats. In this manner a signal is produced which has all ones and all zeros of the same respective levels as illustrated in FIG. 21 C. For a string of unchanged ones or unchanged zeros, that is where no transition occurs, the clamped voltage output due to silicon diodes 113 and 114 which is provided to the gate of output field effect transistor 116 of preferred distortion compensation circuit 111 would normally tend to decay as a result of capacitor 112 discharging. In order to compensate for this, an RC network 115 is connected in parallel across the capicator 112-diode 113-114 network to provide a reverse tilt or compensating charge voltage to this decaying voltage to the gate of field effect transistor 116 in order to compensate for the decay. This field effect transistor 116 buffers the clamped output signal and supplies it to a conventional output amplifier 117 whose output is in turn coupled to a conventional logic inverter 118 through a conventional biasing network 119 to provide a true digital data signal at the output of logic inverter 118 which is equivalent to the original transmitted signal as illustrated in FIG. 21 C, amplifier 117 amplifying the amplitude of the signal illustrated in FIG. 21 C to the amplitude of the signal level illustrated in FIG. 21 A. Biasing network 119 preferably insures that the switching of logic inverter 118 occurs about midway on the clamped signal transition, the output of logic inverter 118 being digital data.

Figure 20:
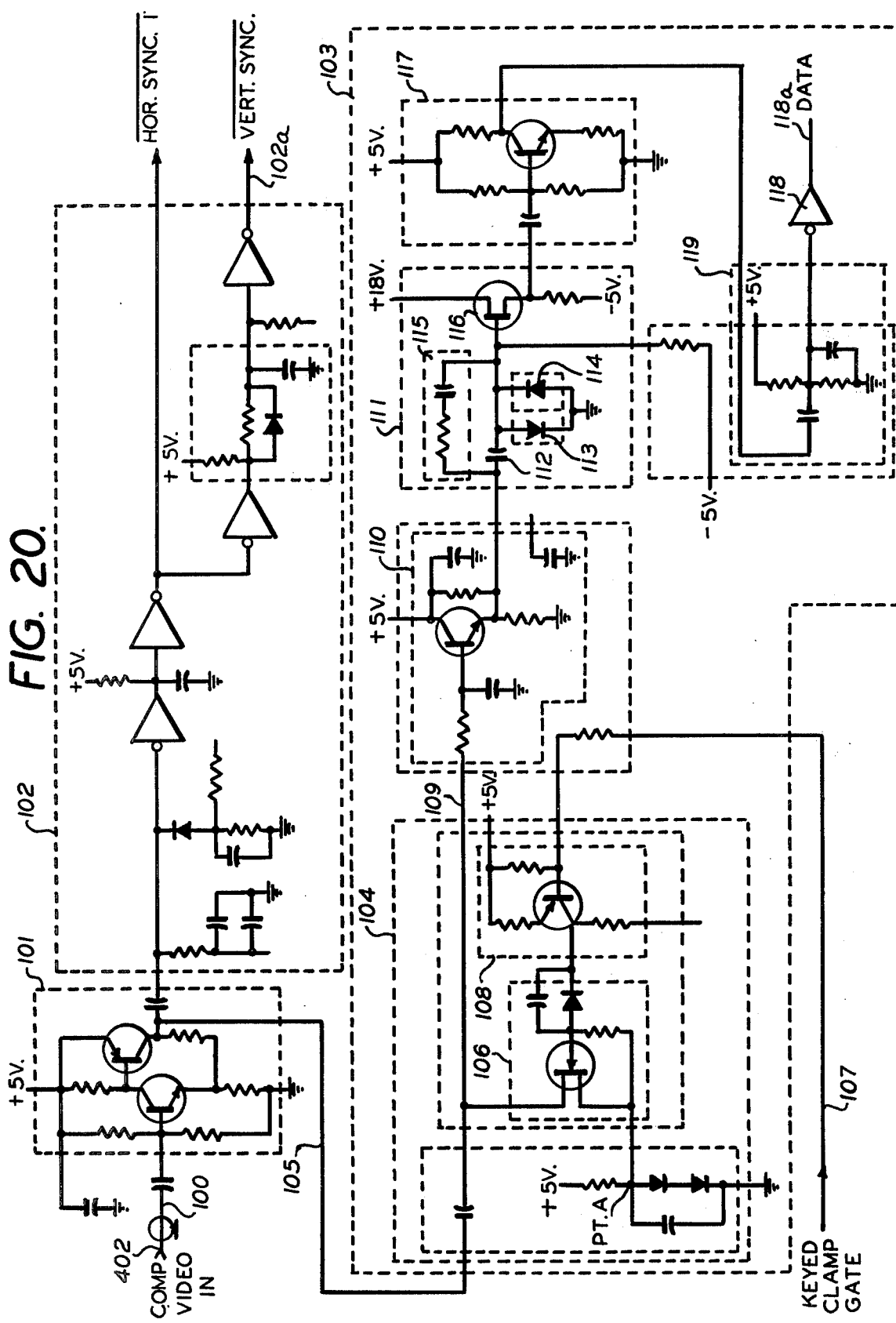
FIG. 20 is a schematic diagram of the video processor portion of the improved preferred receiver of the present invention illustrated in FIG. 5, illustrating the preferred signal distortion compensating apparatus forming a part thereof.
Figure 22:
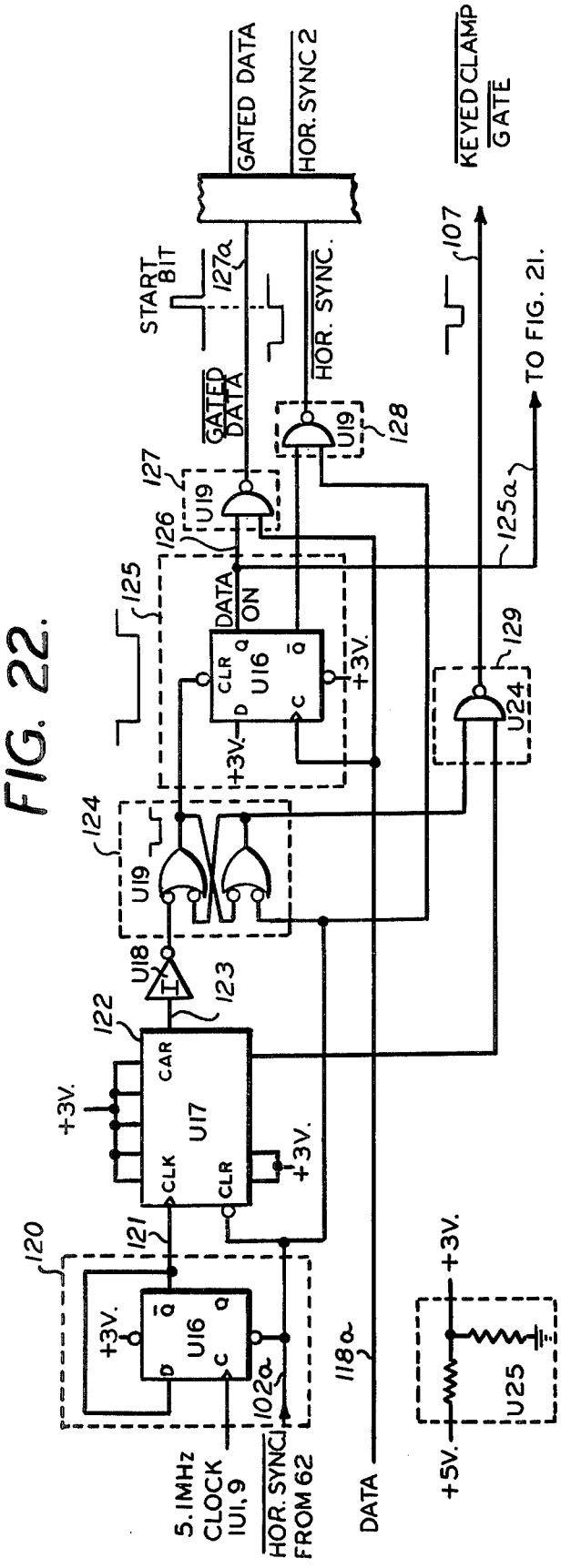
FIG. 22 is a logic diagram, partially in schematic, of another portion of the video processor portion of the improved receiver illustrated in FIGS. 5 and 20.
Figure 22A:
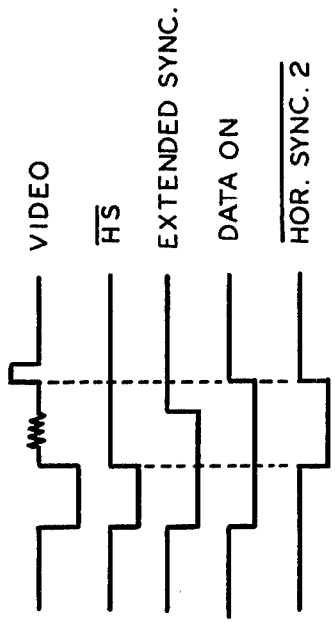
FIG. 22A is a graphic illustration of the various waveforms present in the video processor portion illustrated in FIG. 22.
Figure 23:
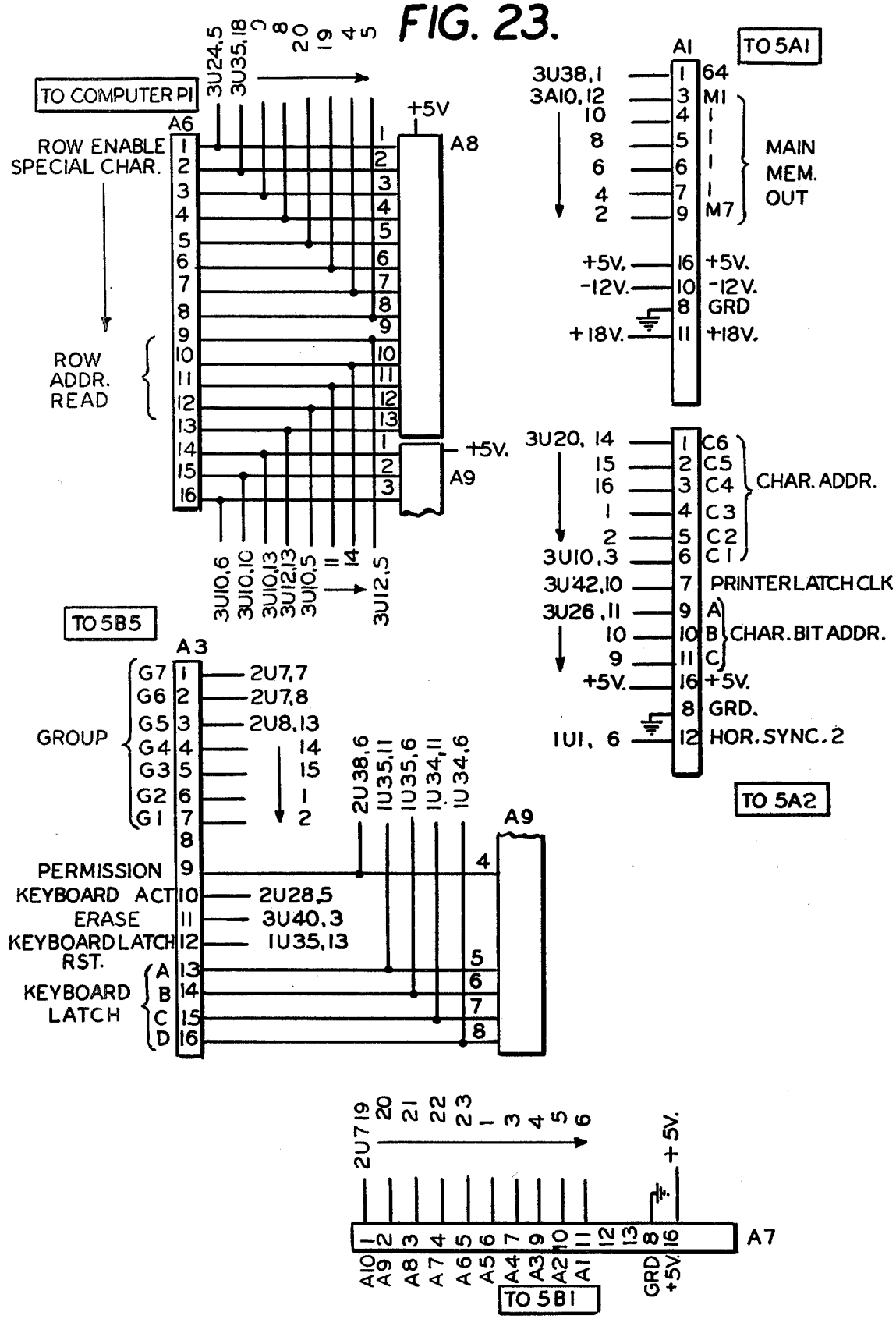
FIG. 23 is a block diagram of the various interconnections or interfacings of the video processor of FIGS. 20 and 22 with the balance of the circuitry in the preferred improved receiver of the present invention.

Referring now to FIG. 22, another portion of the preferred video processing circuit 4000 is shown. Preferably, the digital data output of logic inverter 118 still contains the color burst which was present in region H of the signal and would normally remain in the transmitted signal if a color TV receiver was being utilized for the display terminal. However, when a monochromatic digital TV terminal is utilized, the color burst signal must preferably be omitted or gated out. It should be noted that, if desired, if only monochromatic TV terminals are to be utilized, then the color burst may be omitted all together from the transmitted signal although preferably color burst is present to allow for color TV display. The color burst removal circuit illustrated in FIG. 22, as shown and preferred, includes a conventional separator D-type divide-by-2 flip-flop 120 which preferably receives a 5.1 megahertz clock at the clock input and is preferably cleared by the horizontal sync provided from sync separator circuit 102 via path 102a (FIG. 20). Flip-flop 120 is preferably connected in a toggle mode so that its output, which is provided via path 121, is a series of 2.55 megahertz pulses, in the example given, that start at the completion of the horizontal sync pulse. A conventional decade counter 122 is preferably connected so as to receive these pulses and count these pulses so as to generate an output at the tenth pulse which output is provided via path 123, inverted and then provided to another conventional flip-flop 124 which is initially set by the horizontal sync pulse provided via path 102a and reset by the output signal provided via line 123. The output of flip-flop 124 is preferably a pulse which starts with the beginning of the horizontal sync pulse and ends at the completion of the count of the tenth clock pulse as indicated by the presence of a signal via path 123. The width of this pulse output of flip-flop 124 is preferably such so as to continue beyond the color burst present in region H but to end prior to the initiation of the start bit in region J. This pulse clears a conventional flip-flop 125 whose clear input is connected to the output of flip-flop 124 and whose clock input is preferably clocked by the data input provided from logic inverter 118 via path 118a (FIG. 20). As a result, the output of flip-flop 125 which is provided via path 126 is preferably low during the horizontal sync and color burst periods and is clocked high by the start bit of region J contained in the logic inverter 118 output provided via path 118a. The signal which is present on path 126 enables a conventional NAND gate 127 which has two inputs, with the other input being connected to the output of logic inverter 118 via path 118a. As a result, the output of NAND gate 127 is gated data which includes the start bit and subsequent data, such as present in regions B through K, but excludes the color burst. A second conventional two input NAND gate preferably receives the horizontal sync signal provided via path 102a as one input and the inverted gate signal from flip-flop 125 as its other input. As a result, NAND gate 128 preferably generates a pulse which starts at the trailing edge of the horizontal sync signal and terminates with the start bit. This output signal from gate 128 is preferably utilized as a delayed horizontal sync signal for use by other circuits in the receiver terminal 28 as will be described in greater detail hereinafter. It should be noted that the delayed horizontal sync output of gate 128 which is preferably terminated with the start bit essentially makes the system insensitive to any jitter or noise that might be present in the original horizontal sync signal provided via path 102a. As shown and preferred, the aforementioned keyed clamp gate signal provided via path 107 through preferred video processing circuit 103 is preferably provided as the output of a third conventional two input NAND gate 129 whose inputs are the non-inverted output of flip-flop 124, which is the extended sync signal (FIG. 22 A), and an output from counter 122 which is preferably high after counting eight pulses as opposed to the tenth pulse count output provided via path 123 to flip-flop 124. As a result, the output of gate 129 is a pulse that starts eight clock pulses after the end of the horizontal sync and ends after the tenth clock pulse; in other words, the gate output pulse via path 107 occurs between the eighth and tenth counts of counter 122. This pulse defines the aforementioned unused region on the back porch between the end of the color burst in region H and the start of the start bit in region J, this area being designated by reference numeral 11 in FIG. 2.

it should be noted that the aforementioned conventional sync separator circuit 102 is preferably identical with that previously described in our U.S. Pat. No. 3,889,054 which description is specifically incorporated by reference herein.

RECEIVER-PHASE LOCKED LOOP PORTION

Figure 4:
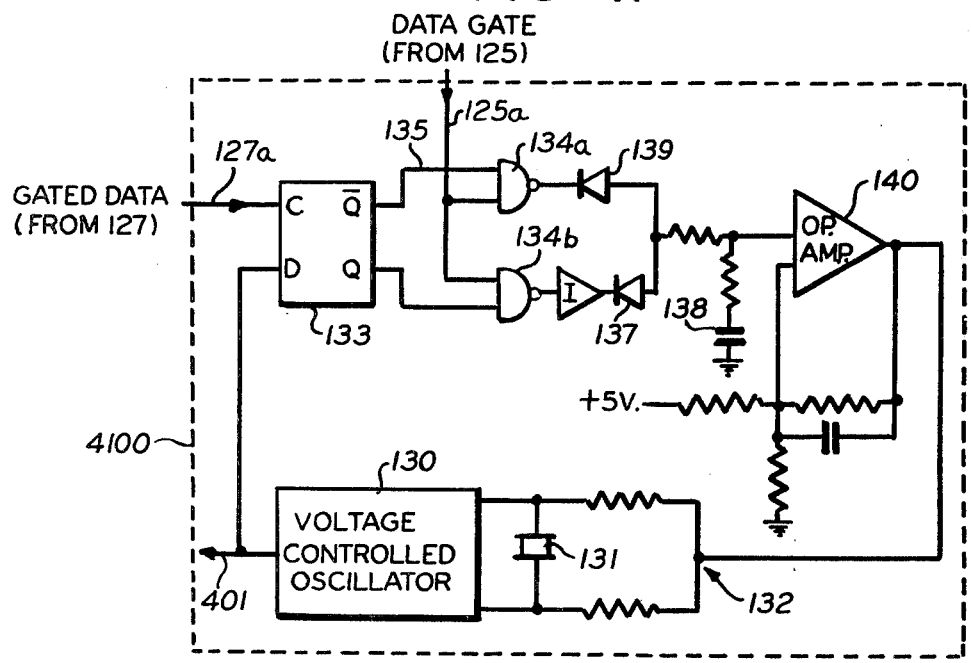
FIG. 4 is a block diagram of the phase locked loop portion of the arrangement illustrated in FIG. 5.

Referring now to FIG. 4, the improved phase locked loop 4100 (FIG. 5) of the preferred synchronization timing portion of the receiver portion 28 of the row grabbing system 10 of the present invention is shown, this phase locked loop 4100 preferably being utilized in place of the phase locked loop arrangement described in our previous U.S. Pat. No. 3,889,054. Phase locked loop 4100 preferably includes a conventional voltage controlled crystal oscillator 130 whose nominal frequency, which is preferably by way of example 5.1136 megahertz, is set by a conventional crystal 131. This frequency can preferably be varied over a small range by adjusting the voltage present at input 132. The output of voltage controlled oscillator 130 is preferably fed back to a conventional D-type flip-flop 133 at the D input as well as being provided via path 401. The gated data output from gate 127 (FIG. 22), which is preferably provided via path 127a, is preferably provided to the clock input of flip-flop 133 which flip-flop preferably acts as a phase detector. Preferably, whenever a zero-to-one data transition occurs while the clock is high, flip-flop 133 is in a set state. If it occurs when the clock is low, flip-flop 133 is preferably then in the reset state. Thus, a change in the output of flip-flop 133 occurs only when the phasing of the clock changes with respect to the phasing of the data. It should be noted that preferably the voltage controlled oscillator 130 is the same as the voltage controlled oscillator forming part of the phase locked loop described in our previous U.S. Pat. No. 3,889,054. As shown and preferred, a pair of conventional two input NAND gates 134a and 134b connect the output of the phase detector 133 to the oscillator control circuits only during the valid data period which is preferably defined as the time of the horizontal scan line including the start bit when data can be present. One input to gates 134a and 134b, which input is connected in parallel thereto, is the data gate output from flip-flop 25 provided via path 125a (FIG. 22). The other input to gate 134a provided via path 135 is the inverted output of flip-flop 133 while the other input provided via path 136 to gate 134b is the non-inverted output of flip-flop 133. If path 135 is high, it denotes that the clock leads the data in phase whereas if path 136 is high it denotes that the clock lags the data in phase. When path 136 is high, a diode 137, which is preferably connected to the output of gate 134b through an inverter, charges a capacitor 138 connected to the output thereof in a positive going direction. As long as the phase lag condition remains, the voltage continues to rise. In the leading phase condition, that is with path 135 high, this preferably causes capacitor 138 to discharge through a diode 139 connected to the output of gate 134a. In the normal closed loop condition, the phase varies between a very small leading and very small lagging angle, such as by way of example, plus or minus 10 degrees, as necessary to maintain a constant voltage on capacitor 138. This voltage is preferably amplified by a conventional FET operational amplifier 140, such as an Intersil 8007C, to provide the control voltage for the voltage controlled oscillator 130 via path 132. It should be noted that for the improved phase locked loop 4100, if a full line of data is present, phase locked loop 4100 will utilize every data transition to continuously correct the clock phase whereas in the case of a series of empty or non-data lines being transmitted, phase locked loop 4100 will make a single correction each line utilizing the start bit which correction will be adequate to insure that phase lock exists at the beginning of the first non-empty or data line. Thus, improved phase lock loop 4100 can maintain phase lock to a single start bit rather than to the entire clock burst as well as utilizing every data transition to continuously correct clock phase. Thus, phase locked loop 4100 is an improvement over the phase locked loop arrangement described in our U.S. Pat. No. 3,889,054 which only utilizes the clock burst for phase lock rather than utilizing every data transition. In order to prevent large over corrections during periods when lines are not transmitted such as when not even the start bit is transmitted, for example during the vertical blanking interval, during which periods it is important that the last error state at the output of gates 134a and 134b does not continue to charge or discharge capacitor 138, such as if the last error state was in a leading condition where over correction would continue to drive through into a lagging condition, gates 134a and 134b are turned off except when an active line, which is defined as a line including a start bit, such as in region J, is received data gate path 125a. This data gate path 125a preferably goes high coindident with the start bit and goes low at the beginning of the following horizontal sync pulse so as to indicate the presence of an active line and to thus prevent the occurrence of correction during periods when lines are not transmitted.

Figure 5:
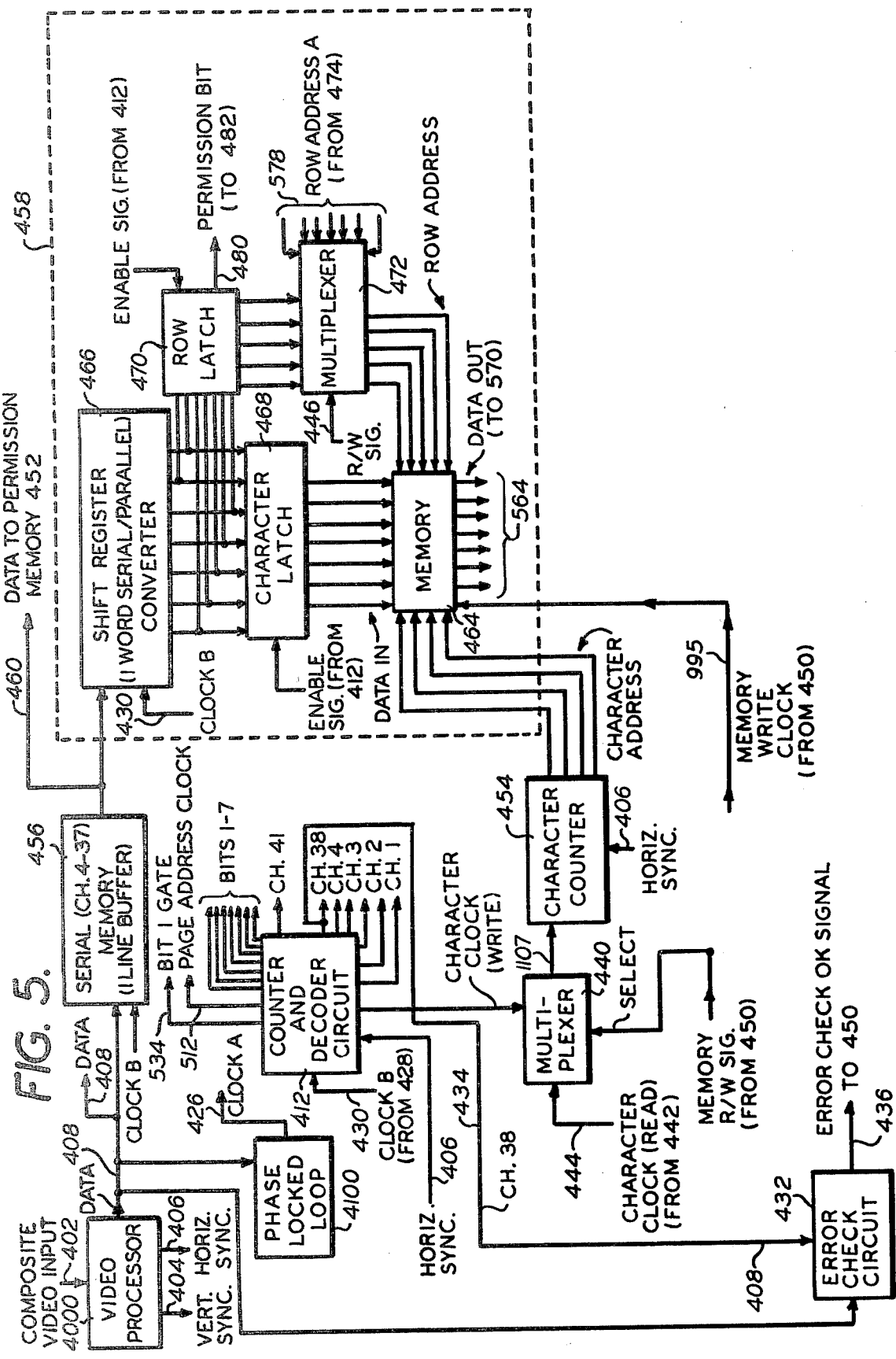
FIG. 5 is a block diagram of the timing control, memory input control and a part of the output processing portions of the preferred improved receiver of the present invention.
Figure 8:
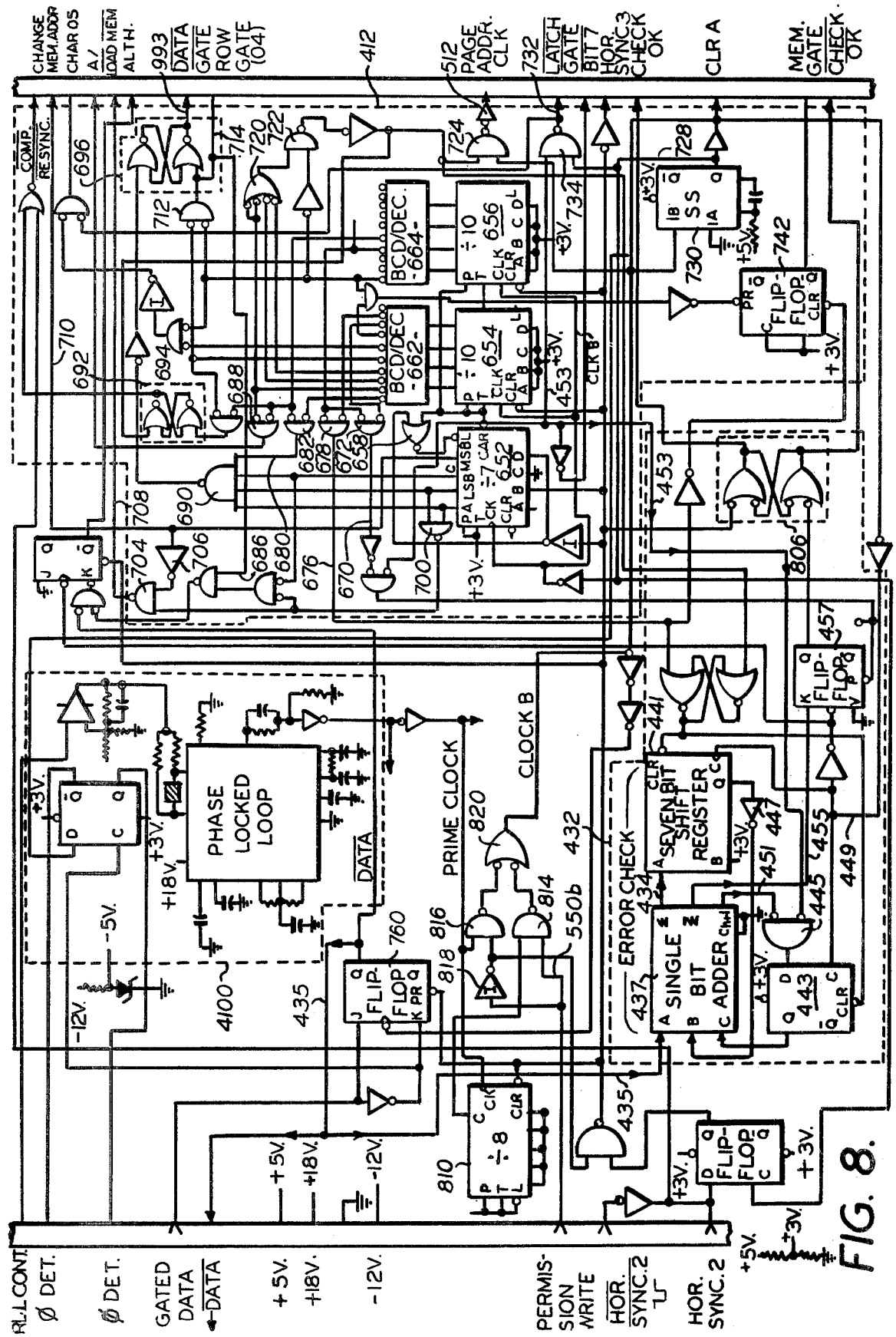
FIG. 8 is a logic diagram, partially in schematic, of a portion of the timing and keyboard control portion of the preferred improved receiver of the present invention illustrated in FIG. 5.
Figure 9:
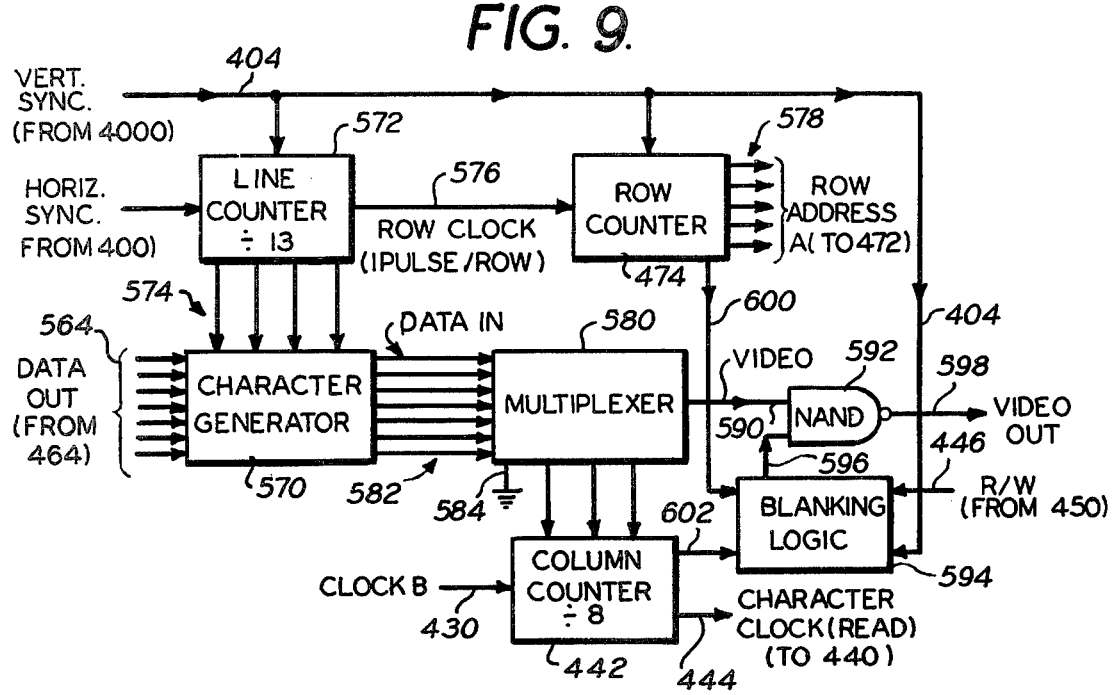
FIG. 9 is a block diagram of another portion of the memory and output processing portion of the preferred improved receiver of the present invention.
Figure 10:
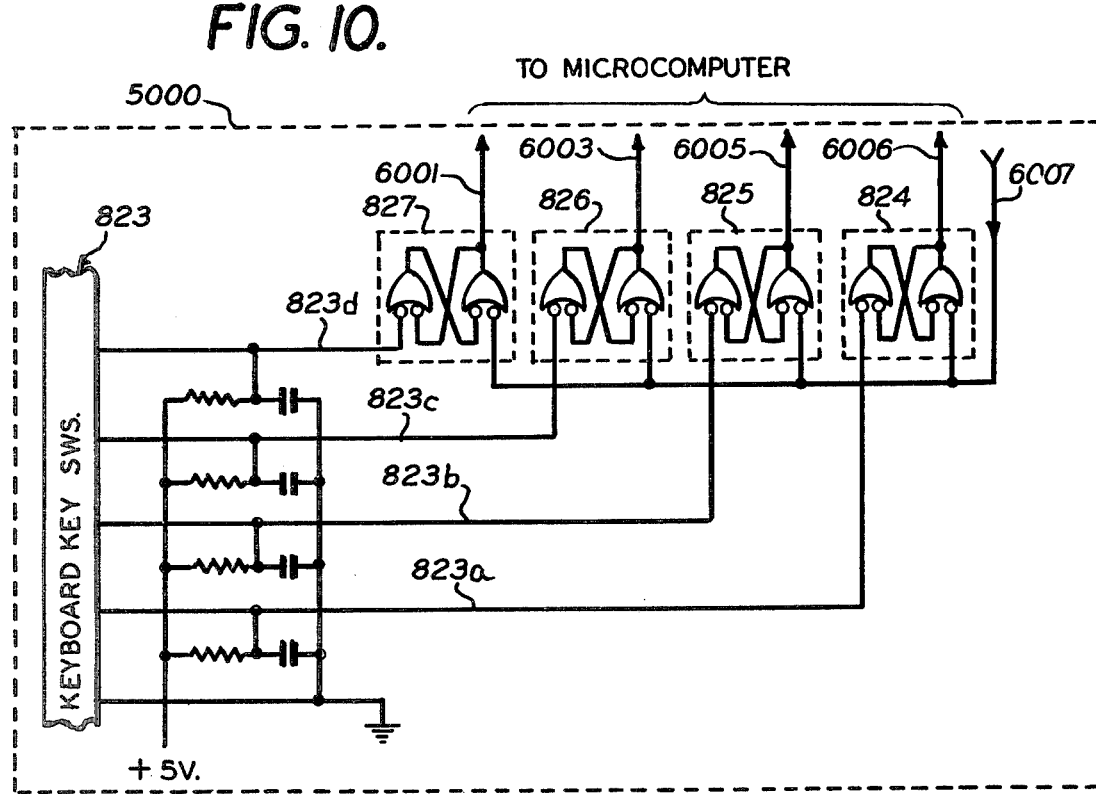
FIG. 10 is a logic diagram, partially in schematic, of the keyboard portion of the timing and keyboard control portion of the improved receiver illustrated in FIG. 5.
Figure 11:
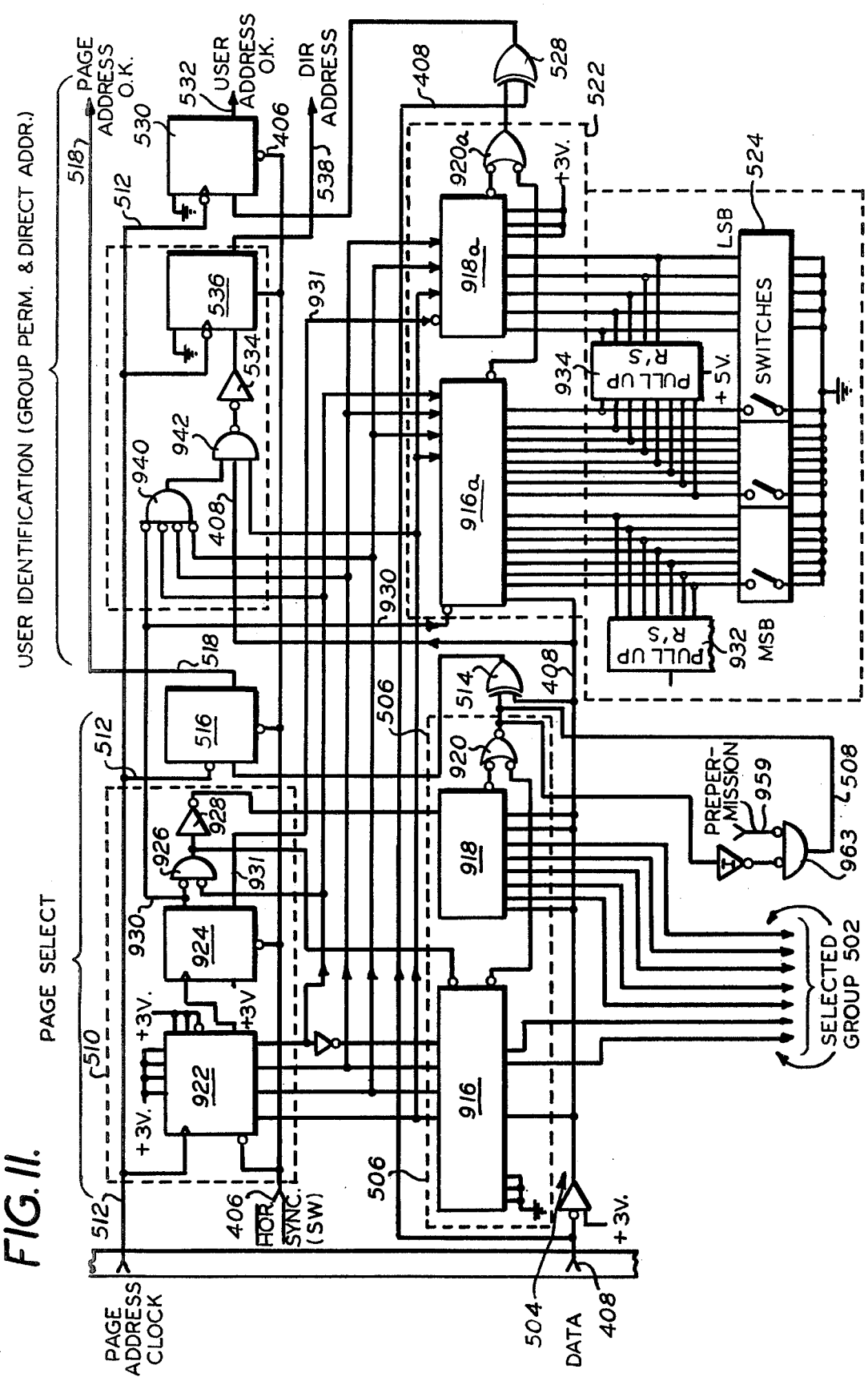
FIG. 11 is a logic diagram, partially in schematic, of the portion of the memory input control portion of the improved receiver illustrated in FIG. 6.

Referring now to FIG. 8, which is a logic diagram, partially in schematic, of a portion of the timing and keyboard control portion of the preferred receiver 28 of the present invention illustrated in FIG. 5, the circuit shown therein is essentially similar to that described with reference to FIG. 8 of our previous U.S. Pat. No. 3,889,054 with the exception of the improved phase locked loop portion 4100 previously described with reference to FIG. 4 and with the exception of an improved error check circuit 432 in place of the error check circuit described in our previous U.S. Pat. No. 3,889,054. As shown and preferred in FIG. 8, the input to error check circuit 432 is preferably resynchronized data out of flip-flop 760 which, as described in our previous U.S. Pat. No. 3,889,054 is an output which preferably follows the input data line except that it will be synchronized with the clock B signal by the clock of flip-flop 760 provided via path 435 which is the same data as utilized by the balance of the receiver display terminal 28. The resynchronized data preferably goes to the A input of a conventional single bit adder 437 which produces the sum of two input bits present at inputs A and B thereof with the B input initially being zero. This sum is preferably provided via path 439 to the input of a conventional seven bit shift register 441. The output of shift register 441 is preferably provided to the B input of adder 437 through a conventional inverter 447. As a result of the seven bit delay provided by register 441, adder 437 at any given time adds an input bit of a given character, since the system preferably utilizes seven bits per character, with the same bit of the previous character. At the beginning of the line, shift register 441 is preferably cleared so that the B input of adder 437 is again logic zero for the duration of the first character. When the first bit of the second character is received at the A input of adder 437, the first bit of the first character is then present at the B input of adder 437 and the output of adder 437 provided via path 439 is the sum of these two bits. At the beginning of the third character, the B input of adder 437 represents the sum of bit one from the first two characters. In this manner for the remainder of the line, that is the pseudo video scan line, the individual bits of the characters are added and accumulated. This is preferably a serial process which is serially repeated for each of the seven bits of the character; for example, for bit one of character 10, the B input of adder 437 is equivalent to the sum of bits one of characters one through nine and for bit two of character 10 the B input to adder 437 is equivalent to the sum of bits two of characters one through nine, etc. Adder 437 provides a carry output where required by binary addition; namely if one and one are added, the sum is zero in that position plus a carry of one to the next position. This carry output is present on path 451 and is preferably applied to the D input of a conventional flip-flop 443 via a conventional two input NAND gate 445. Flip-flop 443 is preferably clocked by the system clock provided via path 449 so that the non-inverted output of flip-flop 443 represents the carry output of adder 437 delayed by one bit. Thus, the carry output present via path 451, such as, by way of example, the output that results from the addition of bit one, is present at the C input of adder 437 when the bit two addition is taking place. The bit two addition then is a full addition resulting from the data bits at A and B of adder 437 as well as the carry state at C of adder 437. Preferably, a carry output of bit seven is ignored which is accomplished by gate 445 which turns off the input to flip-flop 443 during bit seven in response to a bit seven pulse from the decoder 412 whose operation is described in our previous U.S. Pat. No. 3,889,054, which pulse is provided via path 453. It should be noted that the output of adder 437 via path 439 preferably represents in serial form the accumulated sum of individual character bits. Preferably, during the 38th character, which is preferably the error check character, the accumulated sums will all be ones after the error check character is added in if no error is present. The inverted output of adder 437 is provided via path 455 to another conventional flip-flop 457. Path 455 preferably must be in the zero state during the seven bits of the 38th character for the received pseudo video scan line to be considered a true or valid line. Flip-flop 457 tests for this condition by being kept in a set state due to a negative preset signal at all times except during character 38; in other words, except when the 38th character pulse is provided. Path 455 is connected to the K input of J-K flip-flop 457 so that if path 455 is high during any bit of the 38th character, flip-flop 457 will be reset. Thus, a negative pulse at the non-inverted or Q output of flip-flop 457 during the 38th character will indicate an error. Accordingly, the improved error check circuit 432 of the present invention adds on a word-by-word basis as opposed to a bit-by-bit basis as described in our previous U.S. Pat. No. 3,889,054 and accomplishes this summing or addition in serial fashion rather than parallel fashion.

Microprocessor and Keyboard System

Referring now to FIGS. 24, 26, 27 and 28, the improved microprocessor and keyboard control system of the present invention which preferably replaces the keyboard circuitry of the system described in our previous U.S. Pat. No. 3,889,054 will be described. If desired, however, the improved row grabbing system of the present invention may continue to operate with the keyboard circuit arrangement described in our previous U.S. Pat. No. 3,889,054 as opposed to utilizing the improved microprocessor-keyboard control system to be described hereinafter without departing from the spirit and scope of the present invention in which instance the improved system 10 will contain whichever advantages described herein are not dependent on the microprocessor-keyboard control system to be described hereinafter. As shown and preferred in FIGS. 27 and 28, the microprocessor 6000 of the present invention preferably includes a conventional microcomputer or CPU 601, a conventional read only memory or ROM 603, a conventional random access memory or RAM 605, and a conventional input/output buffer or I/O 607. Preferably, the microcomputer 601, read only memory 603, random access memory 605 and input/output buffer 607 are all integrated circuit chips of the type manufactured by Rockwell International, such as what is commonly available from Rockwell International as their PPS-4 MP system wherein the microcomputer chip 601 is a Rockwell International 10660 CPU, read only memory 603 and random access memory 605 are Rockwell International 10432 memory chips and input/output buffer chip 607 is a Rockwell International 10696. The programming language for the permanently storable loader and executive program which is preferably stored in read only memory 603 is preferably written in PPS-4 Assembler language provided from Rockwell International and a typical such conventional preferred control program for operating the microprocessor 6000 of the present invention in accordance with the desired row grabbing function for the video display terminal is set forth below, with this version of the program utilizing the arrangement of FIG. 28 comprising one CPU chip 601, one 256-by-4 bit random access memory chip 605, one 1024-by-8 read only memory chip 603 and two input/output buffer chips 607:

MICROPROCESSOR 6000 CONTROL PROGRAM

```
          *
          *INITIALISATION
          *
0000 81             T       #1
          *SET O/P TO ZERO
0001 7F             LDI     0
0002 1C OE          IOL     #E
0004 7F             LDI     0
0005 1C OD          IOL     #D
0007 7F             LDI     0
0008 1C 07          IOL     #7
```

```
            *RESET FLIP-FLOPS
000A 26              RF1
000B 25              RF2
            *CLEAR RAM
000C 00 00           LBL    D15R15
000E 7F     IN10     LDI    0
000F 2F              EXD
0010 8E              T      IN10
0011 18              XBMX
0012 1A              XAX
0013 60              ADI    F
0014 98              T      IN20
0015 1A              XAX
0016 18              XBMX
0017 8E              T      IN10
            *SET RAM SPECIAL VALUES
0018 CB     IN20     LB     R0D9
0019 71              LDI    E
001A 2B              EXD    4          KBD CHARACTER (FOR INITIAL CALL)
001B 7B              LDI    4
001C 2F              EXD    *          CONSTANT (PCC BIT MASK)
001D C7              LB     R4D5
001E 7E              LDI    1
001F 2F              EXD    *          SEARCHING FOR ROW (NOT)
0020 C2              LB     R6D2
0021 70              LDI    F
0022 3A              EX     5          KBD ROUTINE ADDRESS
0023 7E              LDI    1
0024 2A              EXD    5          KBD # (INITIALLY PAGE 1)
0025 70              LDI    F
0026 2F              EXD
0027 73              LDI    C
0028 3F              EX
0029 50 40           TL     SCHED
            *
            *
                     ORG    40
            *
            *
            *
            *SCHEDULER
            *  CHECKS 1)RAR CHANGED WITH REN HIGH & SCH/RAW CHANGED
            *               (PROCESS SCH)
            *          2)AS 1) WITH NO SCH/RAW CHANGE & RAR
            *               APPROACHING PRINT ROW (PROCESS RAR)
            *          3)PCC CHANGED & HIGH & PRINTING IN PROGRESS
            *               (PROCESS PRINT)
            *          4)KBD HELD FOR 1 MILLISEC AT LEAST
            *               (PROCESS KBD)
            *
            *
            *
            *SCH HAS HIGHEST PRIORITY FOR CHECKING.
            *    CHANGES 110 MICROSEC (22 CYCLES) BEFORE
            *    RAR CHANGES & IS LATCHED UNTIL NEW ONE
            *    AVAILABLE. RAW DENOTES ROW TO WHICH IT
            *    APPLIES. IF UNCHANGED SCH FOR THIS RAW
            *    EITHER NOT CHANGED OR REPEATED - IN
            *    BOTH CASES IGNORE TO AVOID MULTIPLE
            *    PRINTS, ETC. CHECKED ONLY WHEN RAR
            *    CHANGES. RAR CHANGES EVERY 13*63 MICRO-
            *    SECS (163 CYCLES), SO HAVE COMPLETE
            *    PROGRAM CYCLE LESS THAN 141 CYCLES IF
            *    RAR UNCHANGED LAST TIME, OR 163 CYCLES
            *    IF RAR CHANGED LAST TIME. RAR ONLY VALID
            *    WHEN REN HIGH.
            *
            *CHECK RAR CHANGED
0040 CD     SCHED    LB     R3D10
0041 1C 19           IOL    #19        GET RAR
0043 0C              EOR
0044 1E              SKZ
0045 88              T      *+3        RAR CHANGED
0046 50 80  PCXX     TL     PCCX       RAR UNCHANGED
0048 1C 13           IOL    #13        GET REN
```

```
004A 67              ADI    8      SCHED
004B 80              T      SCHED         REN GONE LOW
004C 1C 19           IOL    #19           REREAD RAR IN CASE REN LOW WHEN 1ST READ
004E 1B              LXA    *             SAVE IN X
004F 3F              EX     *             SAVE IN RAM
            *CHECK SCH/RAW CHANGED
0050 C0              LB     R1
0051 1C 03           IOL    #3            GET RAW
0053 19              XABL   *             SET UP SCH TABLE OFFSET
0054 1C 0A           IOL    #A            GET SCH BITS 0-3
0056 0C              EOR
0057 1E              SKZ
0058 A0              T      SCXX          SCH CHANGED
0059 34              LD     3
005A 1C 1A           IOL    #1A           GET SCH BITS 4-6
005C 0C              EOR
005D 1E              SKZ
005E A5              T      SCYX          SCH CHANGED
005F A9              T      RARX          SCH UNCHANGED
0060 0C     SCXX     EOR    *             SAVE SCH BITS 0-3
0061 3C              EX     3
0062 1C 1A           IOL    #1A
0064 0C              EOR
0065 0C     SCYX     EOR    *             SAVE SCH BITS 4-6
0066 3C              EX     3
0067 DF              TM     SCHX          PROCESS SCH
0068 80              T      SCHED
            *
            *
            *IF NO SCH TO BE PROCESSED, NEXT PRIORITY IS TO
            *   SEARCH FOR ROW TO PRINT. IF THERE IS ONE,
            *   THE PRINTER INTERFACE MUST BE INFORMED
            *   WITHIN 189 MICROSECS (37 CYCLES) OF RAR
            *   CHANGING TO CORRECT VALUE BY PWR PULSE.
            *   SO IF RAR IS ONE BEFORE REQUIRED ROW, SET
            *   UP DATA FOR PRINT & WAIT IN LOOP FOR ROW TO
            *   CHANGE. MAY ALSO BE SEARCHING FOR ROW NOT
            *   TO BE PRINTED. IN THIS CASE, SEE IF ALL ROWS
            *   PRINTED & IF NOT, START SEARCH FOR NEXT ROW.
            *
            *CHECK CORRECT RAR
0069 C7     RARX     LB     R4D5
006A 30              LD     7
006B 1E              SKZ
006C 86              T      PCXX          NOT SEARCHING FOR ROW
006D 12              LAX    *             GET RAR
006E 0E              COMP
006F 0B              AD
0070 1E              SKZ
0071 86              T      PCXX          WRONG ROW
0072 31              LD     6
0073 19              XABL
0074 37              LD
0075 09              ADSK
0076 B9              T      RWGX          ROW NOT TO BE PRINTED
0077 53 17           TL     ROWP          PRINT THIS ROW
0079 53 3D  RWGX     TL     ROWG          GET NEXT ROW
            *
            *
            *IF RAR UNCHANGED, NEXT PRIORITY IS TO CHECK PRINTER
            *   CLOCK. PCC IS HIGH FOR 27 MSEC (5400 CYCLES) AND
            *   ANY PRINT PULSE MUST BE GIVEN DURING THIS TIME.
            *   TO CATCH THIS HIGH EVERY TIME, MAXIMUM PROGRAM
            *   CYCLE FOR RAR CHANGING MUST BE 158 CYCLES. IF
            *   PRINTING IS IN PROGRESS, ONE OF THE FOLLOWING
            *   PULSES WILL BE GIVEN WHEN PCC CHANGES TO HIGH:
            *     SPA - 16 LEADING SPACES ON 32-CHAR ROW
            *     PRT - PRINT ROW
            *     BLANK - NO PULSE WHILE WAITING FOR ROW TO BE
            *       PRINTED (32/64 CLOCKS) OR FOR 1 CLOCK DELAY
            *       IN 64-CHAR. ROW WHILE PRINTER I/F READS ROW
            *     LFD - LINE FEED AFTER ROW & BEFORE CERTAIN ROWS
            *     CAR - CARRIAGE RETURN (AS LFD)
            *
            *CHECK PCC CHANGED
                     ORG    80
```

```
0080 CA       PCCX    LB      R4D8
0081 1C 13            IOL     #13             GET NEW PCC
0083 0D               AND     *               GET BIT 2
0084 3F               EX
0085 38               EX      7               (RESTORE CONSTANT)
0086 3F               EX      *               SAVE NEW PCC
0087 0C               EOR     *               BIT 2 = 1 IF CHANGED
0088 63               ADI     C               CARRY IF BIT 2 = 1
0089 BC               T       KBXX            PCC NOT CHANGED
008A 37               LD
008B 60               ADI     F
008C BD               T       SHDX            NEW PCC = 0
008D 1F               DECB
008E 37               LD
008F 60               ADI     F
0090 BD               T       SHDX            PRINTING NOT IN PROGRESS
              *SET UP NEXT PRINTER PULSE
0091 1F               DECB
0092 37               LD
0093 60               ADI     F
0094 9F               T       PR30            4-BIT COUNT = 0
0095 3F               EX      *               STORE COUNT-1
0096 17      PR10     INCB
0097 30               LD      7               GET NEXT O/P
0098 0D               AND     *               MASK
0099 1C 0E  PR20      IOL     #E              PULSE PRINTER
009B 7F               LDI     0
009C 1C 0E            IOL     #E
009E BD               T       SHDX            CONTINUE
009F 38      PR30     EX      7               STORE 4-BIT COUNT - 1
00A0 37               LD
00A1 60               ADI     F
00A2 A5               T       PR40            6-BIT COUNT = 0
00A3 38               EX      7               STORE 6-BIT COUNT - 1
00A4 96               T       PR10            & O/P NORMALLY
              *GET NEW PRINTER PULSE
00A5 C9      PR40     LB      R3D7
00A6 30               LD      7
00A7 61               ADI     E
00A8 AC               T       PR50            NEXT O/P = 1 (ROW TO BE PRINTED NEX
00A9 C8               LB      R3D6
00AA 7F               LDI     0               CLEAR COUNT FOR NON-ROW PRINT
00AB B1               T       PR60
00AC 37      PR50     LD      *               GET MASK (=0 FOR 64-CHAR ROW)
00AD 2F               EXD     *               (=1 FOR 32-CHAR ROW)
00AE 1E               SKZ
00AF B1               T       PR60            32-CHAR ROW (ACC=CT=1)
00B0 7C               LDI     3               SET CT. FOR 64-CHAR ROW
00B1 3F      PR60     EX      *               STORE NEW COUNT
00B2 C9               LB      R3D7            SHIFT LEFT NEXT O/P
00B3 37               LD      *               (GET NEW O/P)
00B4 0B               AD
00B5 3F               EX
00B6 37               LD
00B7 1E               SKZ     *               (SKIP IF PRINT CYCLE COMPLETE)
00B8 99               T       PR20            PRINT NEW CHAR
00B9 C7               LB      R4D5
00BA 3F               EX      *               SET SEARCHING FOR ROW
00BB BD               T       SHDX            CONTINUE
              *
              *
              *IF RAR & PCC UNCHANGED, KBD FUNCTIONS ARE ALLOWED.
              *   MAXIMUM LENGTH IN ANY PROGRAM IS A LIMITED
              *   NUMBER OF CYCLES, SO A SUSPEND SUBROUTINE IS
              *   USED TO ENTER THE CURRENT PROGRAM, AND SUSPEND
              *   IT WHEN ITS TIME IS UP.
              *   THIS ALLOWS A PART ROUTINE BETWEEN TWO TM STORE'S
              *   TO BE 63 CYCLES, OR A COMPLETE ROUTINE TO BE
              *   25 CYCLES LONG.
              *
              *DO KEYBOARD FUNCTIONS
00BC D1      KBXX     TM      STORE           ENTER CURRENT PROGRAM
00BD 50 40   SHDX     TL      SCHED           CONTINUE
              *
              *
```

```
                ORG     300
            *INITIAL KBD PROGRAM
0300 CC     KBYX    LB      R3D9
0301 70             LDI     F
0302 09             ADSK
0303 8E             T       KBX20           KBD CT. = 0
0304 3C             EX      3               SAVE CT. -1
0305 1C 09          IOL     #9              GET KBD
0307 0C             EOR
0308 1E             SKZ
0309 8B             T       KBX10           KBD CHANGED
030A 95             T       KBX40           KBD UNCHANGED
030B 0C     KBX10   EOR
030C 3C             EX      3               STORE NEW KBD
030D 93             T       KBX30
            *ENTER KBD DECODER
030E 34     KBX20   LD      3
030F D8             TM      KBDX            ENTER KBD ROUTINE
0310 7D     KBX25   LDI     2
0311 D3             TM      PLSB            PULSE KLR
0312 CC             LB      R3D9
0313 7B     KBX30   LDI     4               RESET COUNT
0314 3F             EX
0315 D1     KBX40   TM      STORE           SUSPEND - RETURN TO SCHEDULER
0316 80             T       KBYX
            *
            *
            *RAR PROCESSING - SET UP DATA FOR PRINT & WAIT
            *   FOR RAR TO CHANGE.
            *
0317 7F     ROWP    LDI     0
0318 3B             EX      4               CLEAR PRINT BIT
0319 37             LD      *               GET SCH FOR ROW
031A 09             ADSK    *               C SET & SKIP IF 64-CHAR ROW
031B 71             LDI     E               32-CHAR ROW
031C 70             LDI     F               64-CHAR ROW
031D 1C 1D          IOL     #1D             SET RWL
031F 0E             COMP
0320 00 B9          LBL     D7R4
0322 38             EX      7               SAVE MASK
0323 7E             LDI     1
0324 28             EXD     7               SET NEXT O/P TO SPACE
0325 15             SKC
0326 AB             T       RP10            32-CHAR ROW
0327 38             EX      7               SET CT. FOR 64-CHAR. ROW
0328 7E             LDI     1               (DELAY CT. = 1)
0329 28             EXD     7
032A AD             T       RP20
032B 7E     RP10    LDI     1               SET CT. FOR 32-CHAR. ROW
032C 2F             EXD     *               (SPACE CT. = 16)
032D 7E     RP20    LDI     1
032E 3D             EX      2               CLEAR SEARCHING FOR ROW
032F 3A             EX      5               CLEAR ROW COUNT
0330 1C 19  RP30    IOL     #19             WAIT FOR RAR TO CHANGE
0332 0C             EOR
0333 1E             SKZ
0334 B0             T       RP30            WRONG RAR
0335 1C 13          IOL     #13
0337 67             ADI     8
0338 B0             T       RP30            REN LO
0339 7E             LDI     1
033A D3             TM      PLSB            PULSE PWR
033B 50 40  RP40    TL      SCHED           CONTINUE
            *
            *
            *RAR PROCESSING - GET NEXT ROW
            *
033D D7     ROWG    TM      GETROW
033E BB             T       RP40            CONTINUE
            *
            *
            *
                    ORG     C0
            *
            *PAGE 3
```

```
*       DATA ADDRESSES
*       SUBROUTINE ADDRESSES
*       EQUATES
*
*EQUATES
        D0R0    EQU     00              GROUP # 3RD DIGIT
        D0R2    EQU     30              KBD # MOST SIG. DIGIT
        D2R4    EQU     42              WORKSPACE (FOR BINARY*2)
        D5R4    EQU     45              SEARCHING FOR ROW (WHEN ZERO)
        D5R6    EQU     65              ROW COUNT
        D7R3    EQU     37              NEXT O/P
        D7R4    EQU     47              MASK
        D15R2   EQU     2F              TOP OF SCH TABLE
        D15R5   EQU     5F              TOP OF ROW STATUS REGISTER
        D15R15  EQU     FF              TOP OF USED RAM
        *DATA ADDRESSES
00C0 EF         R1      PTR     #10     SCH TABLE
00C1 FD         R0D2    PTR     #02     GROUP #
00C2 9D         R6D2    PTR     #62     SAVED KBD ROUTINE ADDRESS
00C3 8D         R7D2    PTR     #72     PAGE NUMBER
00C4 CD         R3D2    PTR     #32     CURRENT KBD NUMBER
00C5 8C         R7D3    PTR     #73     INITIALISING
00C6 CA         R3D5    PTR     #35     CURRENT ROW
00C7 BA         R4D5    PTR     #45     SEARCHING FOR ROW (WHEN ZERO)
00C8 C9         R3D6    PTR     #36     PRINT COUNT
00C9 C8         R3D7    PTR     #37     NEXT O/P
00CA B7         R4D8    PTR     #48     MASK FOR PCC VALUE
00CB F6         R0D9    PTR     #09     KEYBOARD CHARACTER
00CC C6         R3D9    PTR     #39     KEYBOARD COUNT
00CD C5         R3D10   PTR     #3A     LAST RAR
00CE FF                 PTR
00CF FF                 PTR
                *SUBROUTINE ADDRESSES
00D0 FD         INDEX   PTR     ZINDE   SWITCH ROUTINE
00D1 E2         STORE   PTR     ZSTOR   SUSPEND OR RE-ENTER KBD ROUTINE
00D2 F6         SHIFT   PTR     ZSHIF   DOUBLE BINARY NUMBER
00D3 E8         PLSB    PTR     ZPLSB   SET AC AS PULSE ON I/O 0 GRP B
00D4 6C         CLEAR   PTR     ZCLEA   CLEAR 3 DIGITS
00D5 65         SCHRS   PTR     ZSCHR   RESET SPECIAL CHARACTERS
00D6 EF         PEND    PTR     ZPEND   STOP PRINTING & MODE A
00D7 BF         GETROW  PTR     ZGETR   GET NEXT ROW
00D8 D6         KBDX    PTR     ZKBDX   SELECT KBD ROUTINE
00D9 3F         NUM     PTR     ZNUM    KBD ROUTINES (IF <26 CYCLES, BEGIN
00DA 5D         GRP     PTR     ZGRP    FINISH RTN; IF >25 CYCLES, DO NOT
00DB 07         PRINT   PTR     ZPRIN   BEGIN XS, FINISH TL KBX25, BREAK U
00DC 38         UP      PTR     ZUP     INTO 63 CYCLE BLOCKS)
00DD 1C         BACK    PTR     ZBACK
00DE 5D         CALL    PTR     ZGRP
00DF FF         SCHX    PTR     ZSCHX   JUMP TO SCH DECODER
00E0 74         ERASE   PTR     ZERAS   SCH ROUTINES (BEGIN ALL WITH XS)
00E1 9C         PROWD   PTR     ZPROW   (FINISH RTN)
00E2 99         PROWX   PTR     ZPROX   (MUST BE <114 CYCLES)
00E3 70         ERAS2   PTR     ZERA2   ERASE SCREEN (BY KBD)
00E4 7F         PGPRT   PTR     ZPP20   PAGE PRINT (BY KBD)
00E5 94         RWPRT   PTR     ZPX15   ROW PRINT (BY KBD)
                *
                *
                *
                        ORG     100
                *
                *PAGES 4-7
                *       SUBROUTINES CALLED BY TM
                *
                *
                *GO TO S/R FOR SCH PROCESSING
0100 52 2F      ZSCHX   TL      SCHY
                *
                *
                *
                *INDEX - SWITCH ROUTINE
                *       SETS RETURN ADDR. BITS 0-3 TO COMP. OF M
                *       % ADDS COMP. OF M EOR 3 TO RETURN ADDR. BITS 4-7.
                *       LEAVES B AS B EOR 3.
                *       SWITCH TABLE MUST START AT 16-WD. BLOCK &
                *       LIE WITHIN 256-WD. BLOCK. CALLING INSTRUCTION
```

```
              *   MUST BE AT 16-WD BOUNDARY - 1. IF M EOR 3 = 0
              *   IS NOT TO AFFECT BITS 4-7 OF RETURN ADDRESS.
              *   TABLE MUST NOT START AT 64-WD. BLOCK & CALLING
              *   INSTRUCTION MUST IMMEDIATELY PRECEDE IT. IF M EOR 3
              *   = -1 IS NOT TO AFFECT BITS 4-7 OF RETURN ADDRESS,
              *   CALLING INSTRUCTION MUST BE 17 WORDS BEFORE
              *   TABLE & NOT AT END OF 64-WORD BLOCK.
0102 6F       ZINDE    CYS
0103 34                LD      3
0104 6F                CYS
0105 0B                AD
0106 6F                CYS
0107 6F                CYS
0108 05                RTN
              *
              *
              *
              *MULTIPLY BINARY # BY 2
              *   BY ADDING TO ITSELF
              *
0109 C3       ZSHIF    LB      R7D2
010A 24                RC
010B 37       ZS10     LD
010C 0A                ADC
010D 2F                EXD
010E 8B                T       ZS10
010F 05                RTN
              *
              *
              *
              *STOP PRINTING
              *   CLEAR MODE A
              *   CLEAR ALL ROW, CRLF BITS
              *
0110 26       ZPEND    RF1     *            CLEAR MODE A
0111 00 A0             LBL     D15R5
0113 7F       PE10     LDI     0            CLEAR ROW, CRLF BITS
0114 2F                EXD
0115 93                T       PE10
0116 05                RTN
              *
              *
              *
              *PULSE OUTPUT ROUTINE
              *   SET O/P ON GROUP B OF I/O 0
              *   TO ACCUMULATOR & CLEAR IMMEDIATELY.
              *   PULSE LENGTH = 15 MICROSEC.
0117 1C 0D    ZPLSB    IOL     #D
0119 7F                LDI     0
011A 1C 0D             IOL     #D
011C 05                RTN
              *
              *
              *
              *SUSPEND OR RE-ENTER KBD ROUTINE PROGRAM.
              *   MUST NOT BE IN ANY KBD ROUTINE TOO LONG
              *   SO CALLING THIS WILL STORE CURRENT ADDRESS
              *   & RETURN TO THE LAST STORED ADDRESS.
              *   STORED ADDRESS INITIALLY SET TO KBYX
              *   SO CALLED AT KBXX TO ENTER, & AFTER
              *   BLOCKS OF KBD ROUTINE TO SUSPEND.
011D C2       ZSTOR    LB      R6D2
011E 6F       ST10     CYS
011F 2F                EXD
0120 9E                T       ST10
0121 6F                CYS
0122 05                RTN
              *
              *
              *
              *PROCESS KBD
              *   POSSIBLE KBD VALUES:
              *     0-9 NUMERALS
              *     10  GROUP
              *     11  PRINT
```

```
               *       12   UP
               *       13   BACK
               *       14   CALL
               *       15   IDLE STATE
               *
                       ORG       129
0129 33        ZKBDX   LD        4           GET KBD CHAR.
012A 3B                EX        4           SAVE & GET LAST KBD
012B OC                EOR
012C 1E                SKZ       *           NOT CHANGED?
012D AF                T         *+2         PROCESS NEW KBD
012E 05                RTN
               *THIS TABLE MUST BEGIN AT END OF 16-WD BLOCK & LIE
               *    WITHIN A 64-WD BLOCK.
012F D0                TM        INDEX       (RETURN ADDRESS = P + SWITCH INDEX)
0130 05                RTN       *           NO CHARACTER
0131 DE                TM        CALL
0132 DD                TM        BACK
0133 DC                TM        UP
0134 DB                TM        PRINT
0135 DA                TM        GRP
0136 D9                TM        NUM
0137 D9                TM        NUM
0138 D9                TM        NUM
0139 D9                TM        NUM
013A D9                TM        NUM
013B D9                TM        NUM
013C D9                TM        NUM
013D D9                TM        NUM
013E D9                TM        NUM
013F D9                TM        NUM
               ***END OF TABLE
               *
               *
               *
               *GET NEXT ROW & PRINT LEADING CRLF IF NECESSARY.
               *    STOP PRINT MODE A IF ROW COUNT = 16
               *    (CLEARED WHENEVER ROW OR CRLF PRINTING IS SET
               *    UP, OR WHEN A ROW PRINT OR CRLF BIT IS SET IN
               *    ROW STATUS; INCREMENTED EACH TIME NEXT ROW GOT).
               *    CALLED WHEN ROW PRINTED TO GET NEXT, OR WHEN
               *    PRINTING TO BE STARTED (WHEN PUT CURRENT ROW
               *    = 1ST ROW - 1).
               *
               *GET NEXT ROW
0140 00 BA     ZGETR   LBL       DSR4
0142 7F                LDI       0
0143 38                EX        7           SET SEARCHING FOR ROW
0144 7E                LDI       1
0145 0B                AD
0146 3F                EX        *           INCR. CURRENT ROW
0147 31                LD        6
0148 19                XABL      *           GET ROW STATUS
0149 7B                LDI       4
014A 0D                AND
014B 1E                SKZ
014C 98                T         GT20        CRLF BIT SET
014D 00 9A             LBL       DSR6
014F 37                LD
0150 6E                ADI       1           INCR. ROW COUNT
0151 96                T         GT10        NOT YET SCANNED ALL 16 ROWS
               *TERMINATE KBD PRINT MODE
0152 26                RF1       *           CLEAR PRINT MODE A (ALL ROWS PRINTED)
0153 3D                EX        2
0154 7E        GT05    LDI       1
0155 3D                EX        2           CLEAR SEARCHING FOR ROW
0156 3F        GT10    EX        *           CLEAR (OR STORE) ROW COUNT
0157 05                RTN
               *PRINT LEADING CRLF
0158 0C        GT20    EOR
0159 3F                EX        *           CLEAR CRLF BIT
015A 00 C8             LBL       D7R3
015C 7D                LDI       2
015D 2F                EXD       *           SET TO PRINT LFD NEXT
015E 7F                LDI       0
```

```
015F 38                EX       7          PRINT COUNT = 0
0160 7F                LDI      0
0161 2F                EXD
0162 94                T        GTO5
         *
         *
         *
         ****SPECIAL CHARACTER ROUTINES
         *
         *
         *
         *SPECIAL CHARACTER ROW PRINTS
         *   PROWX - ONLY IF IN MODE B, NO LEADING CRLF
         *   PROWO - ALWAYS
         *
0163 06    ZPROW       XS       *          DISCARD RETURN ADDRESS
0164 30                LD       7
0165 AB                T        ZPX15
0166 06    ZPROX       XS
0167 14                SKF2
0168 05                RTN      *          NOT MODE B
0169 30                LD       7
016A 77                LDI      8          SET ONLY ROW PRINT BIT
016B 73    ZPX15       LDI      .C         ENTRY FROM KBD ROUTINE
016C 2F                EXD      *          SET CRLF & ROW PRINT BITS
016D AE                T        *+1        (IGNORE SKIP)
016E 11                LABL     *          SAVE ROW-1
016F 1B                LXA
0170 00 9A             LBL      D5R6
         *ENTRY POINT FROM PPGEX
0172 7F    PX20        LDI      0
0173 3D                EX       2          CLEAR ROW COUNT
0174 37                LD
0175 60                ADI      F
0176 05                RTN      *          SEARCHING FOR ROW
0177 C9                LB       R3D7
0178 37                LD
0179 1E                SKZ
017A 05                RTN      *          PRINTING IN PROGRESS
017B C6                LB       R3D5
017C 12                LAX
017D 3F                EX       *          SET CURRENT ROW
017E D7                TM       GETROW     PRINT IT
017F 05                RTN
         *
         *
                       ORG      180
         *
         *
         *SPECIAL CHARACTER PAGE PRINT
         *   NO LONGER USED FOR SCH
         *   ONLY USED FOR COMPLETION OF KBD PAGE PRINT
         *   SCH CODE LEFT AS COMMENTS IN CASE OF FUTURE USE
         *
         *ZPPGE XS * DISCARD RETURN ADDRESS
         *     SKF2
         *     RTN * NOT MODE B
         *     LBL D15R5
         *PP10 LDI 8 SET ROW BIT ON ALL ROWS
         *     EXD
         *     T PP10
0180 17    ZPP20       INCB     *          ENTRY FROM KBD ROUTINE
0181 82                T        *+1
0182 73                LDI      C          SET CRLF BIT ON ROW 1
0183 3F                EX
0184 C6                LB       R3D5
0185 7F                LDI      0
0186 3A                EX       5          CURRENT ROW = 0
0187 70                LDI      F
0188 1B                LXA      *          SAVE CURRENT ROW IF GETROW CALLED
0189 51 72             TL       PX20
         *
         *
         *
```

```
                *SPECIAL CHARACTER ERASE
018B 06     ZERAS   XS
018C 7B     XERA2   LDI     4           ENTRY FROM KBD ROUTINE
018D D3             TM      PLSB
018E 05             RTN
                *KBD S/R - ERASE SCREEN
018F 7D     ZERA2   LDI     2
0190 1C 17          IOL     #17         SET KAC
0192 8C             T       XERA2       ERASE SCREEN
                *
                *
                *
                *
                *
                *
                ****EXTRA UTILITIES
                *
                *
                *
                *CLEAR 3 SUCCESSIVE RAM DIGITS
0193 7F     ZCLEA   LDI     0
0194 2F             EXD
0195 7F             LDI     0
0196 2F             EXD
0197 7F             LDI     0
0198 3F             EX
0199 05             RTN
                *
                *
                *
                *RESET SPECIAL CHARACTERS
019A 00 D0  ZSCHR   LBL     D15R2
019C 7F     SR10    LDI     0
019D 3C             EX      3
019E 7F             LDI     0
019F 2C             EXD     3
01A0 9C             T       SR10
01A1 05             RTN
                *
                *
                *
                ****KEYBOARD ROUTINES
                *
                *
                *
                *PROCESS GROUP KEY
                *   NO GROUP IGNORED
                *   INVALID GROUP SET TO ZERO, WITH PAGE 10
                *   GOOD GROUP # SENT TO TERMINAL WITH PGE # ZERO
                *
                *
                *PROCESS CALL KEY
                *   NO NUMBER = 0
                *   GROUP NUMBER NOT AFFECTED
                *   NEW PAGE NUMBER SENT TO TERMINAL
                *
01A2 E3     ZGRP    TM      ERAS2       CLEAR SCREEN
01A3 00 CF          LBL     DOR3
01A5 37             LD
01A6 6E             ADI     1
01A7 AE             T       K10         NUMBER INSERTED BEFORE GROUP/CALL
01A8 3F             EX      *           NO NUMBER = 0
01A9 CB             LB      ROD9
01AA 37             LD
01AB 6A             ADI     5
01AC 53 D2          TL      RESET       FROM GRP - IGNORE NO #
                *
01AE D1     K10     TM      STORE       WAIT
                *
01AF 53 40          TL      XGPCL       SELECT NEW GROUP/PAGE
                *
                *
                    ORG     1C0
                *
                *
```

```
                  *PROCESS NUMERAL KEY
                  *   ADD INTO CURRENT 3-DIGIT NUMBER
                  *   EXCESS DIGITS SHIFTED OFF END
                  *
01C0 06           ZNUM    XS
01C1 34                   LD      3          GET KBD CHARACTER
01C2 37                   LD
01C3 C4                   LB      R3D2
01C4 2F           NM10    EXD     *          INSERT IN KBD NUMBER
01C5 84                   T       NM10
01C6 05                   RTN
                  *
                  *
                  *
                  *PROCESS UP KEY
                  *   IGNORED IF PAGE # AT HIGH LIMIT
                  *   ELSE INCREMENTS PAGE NUMBER
                  *
01C7 E3           ZUP     TM      ERAS2      CLEAR SCREEN
                  *
01C8 D1                   TM      STORE      WAIT
                  *
01C9 C3                   LB      R7D2
01CA 37                   LD
01CB 66                   ADI     9
01CC 98                   T       UP30       BITS 0-3 NOT 7-F
01CD 1F                   DECB
01CE 37                   LD
01CF 6D                   ADI     2
01D0 98                   T       UP30       BITS 4-7 NOT E/F
01D1 1F                   DECB
01D2 7C                   LDI     3
01D3 0D                   AND
01D4 62                   ADI     D
01D5 98                   T       UP30       BITS 8-9 NOT 3
01D6 53 D2        UP15    TL      RESET      PAGE NUMBER AT HIGH LIMIT
                  *
01D8 D1           UP30    TM      STORE      WAIT
                  *UP ACCEPTED
01D9 C3                   LB      R7D2       ADD 1 TO PAGE #
01DA 24                   RC
01DB 7E                   LDI     1
01DC 9E                   T       UP50
01DD 7F           UP40    LDI     0
01DE 0A           UP50    ADC
01DF 2F                   EXD
01E0 9D                   T       UP40
01E1 53 96                TL      SEND       SEND TO TERMINAL
                  *
                  *
                  *
                  *PROCESS BACK KEY
                  *   IGNORED IF PAGE # AT ZERO
                  *   ELSE DECREMENTS PAGE NUMBER
                  *
01E3 E3           ZBACK   TM      ERAS2      CLEAR SCREEN
01E4 C3                   LB      R7D2
01E5 37           BK10    LD
01E6 1E                   SKZ
01E7 AF                   T       BK20
01E8 1F                   DECB
01E9 40                   SKBI    0
01EA A5                   T       BK10
01EB 73                   LDI     C
01EC 0F                   OR
01ED 6C                   ADI     3
01EE 96                   T       UP15       PAGE NUMBER = 0
                  *
01EF D1           BK20    TM      STORE      WAIT
                  *BACK ACCEPTED
01F0 C3                   LB      R7D2       SUBTRACT 1 FROM PAGE #
01F1 24                   RC
01F2 70           BK30    LDI     F
01F3 0A                   ADC
```

```
01F4 2F              EXD
01F5 B2              T       BK30
01F6 53 96           TL      SEND        SEND TO TERMINAL
             *
             *
             *
             *PROCESS PRINT KEY
             *   CODE IN ANOTHER PAGE
             *
01F8 52 C0   ZPRIN   TL      XPRIN
             *
             *
             *
                     ORG     22F
             *
             *PAGES 8-15 (EXCEPT PAGE 12 300-33F USED ALREADY)
             *    SUBROUTINES CALLED BY TML OR OTHER PROGRAMS
             *
             *
             *
             *PROCESS SCH
             *THIS TABLE MUST BEGIN AT THE END OF A 16-WD BLOCK
             *   (NOT A 64-WORD BLOCK) & LIE WITHIN A 256-WD BLOCK.
             *   & THE SWITCH TABLE MUST BE 16 WORDS ON FROM
             *   CALLING INSTRUCTION.
022F D0      SCHY    TM      INDEX       (RETURN ADDRESS = P + SWITCH INDEX)
             *   AN SCH 7F WILL ADD 1 TO RETURN ADDR. BITS 4-7 &
             *   THEREFORE RETURN HERE (16 WDS ON FROM CALLING INSTRUCTION).
                     ORG     240
0240 05              RTN
0241 05              RTN
0242 05              RTN
0243 05              RTN
0244 05              RTN
0245 05              RTN
0246 05              RTN
0247 05              RTN
0248 05              RTN
0249 05              RTN
024A 05              RTN
024B 05              RTN
024C 05              RTN
024D 05              RTN
024E 05              RTN
024F 05              RTN
0250 05              RTN
0251 05              RTN
0252 05              RTN
0253 05              RTN
0254 05              RTN
0255 05              RTN
0256 05              RTN
0257 05              RTN
0258 05              RTN
0259 05              RTN
025A 05              RTN
025B 05              RTN
025C 05              RTN
025D 05              RTN
025E 05              RTN
025F 05              RTN
0260 05              RTN
0261 05              RTN
0262 05              RTN
0263 05              RTN
0264 05              RTN
0265 05              RTN
0266 05              RTN
0267 05              RTN
0268 05              RTN
0269 05              RTN
026A 05              RTN
026B 05              RTN
026C 05              RTN
026D 05              RTN
```

| | | | |
|---|---|---|---|
| 026E 05 | RTN | | |
| 026F 05 | RTN | | |
| 0270 05 | RTN | | |
| 0271 05 | RTN | | |
| 0272 05 | RTN | | |
| 0273 05 | RTN | | |
| 0274 05 | RTN | | |
| 0275 05 | RTN | | |
| 0276 05 | RTN | | |
| 0277 05 | RTN | | |
| 0278 05 | RTN | | |
| 0279 05 | RTN | | |
| 027A 05 | RTN | | |
| 027B 05 | RTN | | |
| 027C 05 | RTN | | |
| 027D 05 | RTN | | |
| 027E 05 | RTN | | |
| 027F 05 | RTN | | |
| 0280 05 | RTN | | |
| 0281 05 | RTN | | |
| 0282 05 | RTN | | |
| 0283 05 | RTN | | |
| 0284 05 | RTN | | |
| 0285 05 | RTN | | |
| 0286 05 | RTN | | |
| 0287 05 | RTN | | |
| 0288 05 | RTN | | |
| 0289 05 | RTN | | |
| 028A 05 | RTN | | |
| 028B 05 | RTN | | |
| 028C 05 | RTN | | |
| 028D 05 | RTN | | |
| 028E 05 | RTN | | |
| 028F 05 | RTN | | |
| 0290 05 | RTN | | |
| 0291 05 | RTN | | |
| 0292 05 | RTN | | |
| 0293 05 | RTN | | |
| 0294 05 | RTN | | |
| 0295 05 | RTN | | |
| 0296 E1 | TM | PROWO | SCH=41 |
| 0297 05 | RTN | | |
| 0298 05 | RTN | | |
| 0299 05 | RTN | | |
| 029A 05 | RTN | | |
| 029B 05 | RTN | | |
| 029C 05 | RTN | | |
| 029D 05 | RTN | | |
| 029E E1 | TM | PROWO | SCH=33 |
| 029F E0 | TM | ERASE | SCH=32 |
| 02A0 E2 | TM | PROWX | SCH=31 |
| 02A1 05 | RTN | | |
| 02A2 E2 | TM | PROWX | SCH=29 |
| 02A3 05 | RTN | | |
| 02A4 E2 | TM | PROWX | SCH=27 |
| 02A5 05 | RTN | | |
| 02A6 E2 | TM | PROWX | SCH=25 |
| 02A7 05 | RTN | | |
| 02A8 E2 | TM | PROWX | SCH=23 |
| 02A9 05 | RTN | | |
| 02AA E2 | TM | PROWX | SCH=21 |
| 02AB 05 | RTN | | |
| 02AC E2 | TM | PROWX | SCH=19 |
| 02AD 05 | RTN | | |
| 02AE E2 | TM | PROWX | SCH=17 |
| 02AF 05 | RTN | | |
| 02B0 E2 | TM | PROWX | SCH=15 |
| 02B1 05 | RTN | | |
| 02B2 E2 | TM | PROWX | SCH=13 |
| 02B3 05 | RTN | | |
| 02B4 E2 | TM | PROWX | SCH=11 |
| 02B5 05 | RTN | | |
| 02B6 E2 | TM | PROWX | SCH=9 |
| 02B7 05 | RTN | | |
| 02B8 E2 | TM | PROWX | SCH=7 |

```
02B9 05                  RTN
02BA E2                  TM      PROWX       SCH=5
02BB 05                  RTN
02BC E2                  TM      PROWX       SCH=3
02BD 05                  RTN
02BE E2                  TM      PROWX       SCH=1
02BF 05                  RTN     *           SCH=0
              ***END OF TABLE
              *
              *
              *
              ****MORE KEYBOARD ROUTINES IN PAGES 8-15
              *
                         ORG     2C0
              *
              *
              *PROCESS PRINT KEY
              *    NO NUMBER = PRINT PAGE OR STOP PRINT
              *    NUMBER 0  = START MODE B
              *    NUMBER 1-16 = PRINT ROW
              *
02C0 00 CF    XPRIN      LBL     DOR3
02C2 37                  LD
02C3 6E                  ADI     1
02C4 9A                  T       P60         NUMBER INSERTED
              *
02C5 D1                  TM      STORE       WAIT
              *NO NUMBER INSERTED
02C6 16                  SKF1
02C7 89                  T       P10
02C8 8B                  T       P20         MODE A
02C9 14       P10        SKF2
02CA 8E                  T       P30         NOT MODE B
              *STOP PRINTING
02CB 25       P20        RF2     *           CLEAR MODE B
02CC D6                  TM      PEND        CLEAR MODE A, ROW, CRLF BITS
02CD 98                  T       P50         EXIT
              *PRINT PAGE
02CE 22       P30        SF1     *           SET MODE A
02CF 00 A0               LBL     D15R5
02D1 77       P40        LDI     8           SET ALL ROW BITS
02D2 2F                  EXD
02D3 91                  T       P40
              *
02D4 D1                  TM      STORE       WAIT
              *
02D5 00 A0               LBL     D15R5       RESET B
02D7 E4                  TM      PGPRT       USE SCH ROUTINE TO SET REST OF DATA
02D8 53 D2    P50        TL      RESET       RESET KBD # AND EXIT
              *NUMBER INSERTED
02DA C4       P60        LB      R3D2
02DB 37                  LD
02DC 66                  ADI     9
02DD 9F                  T       P70
02DE A6                  T       P80
02DF 1F       P70        DECB
02E0 7E                  LDI     1
02E1 0C                  EOR
02E2 1E                  SKZ
02E3 B1                  T       P90
02E4 17                  INCB
02E5 76                  LDI     9
02E6 70       P80        LDI     F
02E7 0B                  AD
              *PRINT ROW
02E8 22                  SF1     *           SET MODE A
02E9 25                  RF2     *           CLEAR MODE B
02EA 3F                  EX      *           SAVE ROW #
              *
02EB D1                  TM      STORE       WAIT
              *
02EC C4                  LB      R3D2
02ED 39                  EX      6           GET ROW #
02EE 19                  XABL    *           GET ROW STATUS WORD
02EF E5                  TM      RWPRT       USE SCH ROUTINE TO SET REST OF DATA
```

```
02F0 98            T      P50          EXIT
            *SET MODE B
02F1 17     P90    INCB
02F2 37            LD
02F3 1E            SKZ
02F4 A6            T      P80          NOT ZERO NUMBER - PRINT ROW
02F5 26            RF1    *            CLEAR MODE A
02F6 21            SF2    *            SET MODE B
02F7 98            T      P50          EXIT
            *
                   ORG    340
            *
            *
            *
            *CONTINUE WITH GROUP/CALL KEY PROCESSING
            *  THE STORY SO FAR:-
            *  SCREEN ERASED, NO NUMBER DEALT WITH
            *
            *CONVERT DECIMAL TO BINARY NUMBER
0340 C3     XGPCL  LB     R7D2
0341 D4            TM     CLEAR        INITIALISE BINARY TO ZERO
0342 3F            EX
0343 38            EX     7            GET GROUP BITS 8/9
0344 3F            EX     .
0345 37            LD     *            SHIFT TWICE RIGHT & INSERT IN GROUP
0346 0B            AD
0347 3F            EX
0348 37            LD
0349 0A            ADC
034A 3F            EX
034B 37            LD
034C 0A            ADC
034D 2B            EXD    4
034E 8F            T      *+1
034F 7F            LDI    0
0350 3F            EX     *            INITIALISE POINTER FOR KBD # DIGITS
            *ADD IN NEXT DIGIT TO NUMBER SO FAR
0351 7E     DB20   LDI    1
0352 0B            AD     *            INCREMENT POINTER
0353 38            EX     7
0354 19            XABL
0355 37            LD     *            GET NEXT DIGIT
0356 C3            LB     R7D2
0357 24            RC
0358 9A            T      DB40
0359 7F     DB30   LDI    0            ADD ANY CARRY
035A 0A     DB40   ADC
035B 2F            EXD
035C 99            T      DB30
            *CHECK COMPLETION
035D 34            LD     3
035E 37            LD
035F 62            ADI    0
0360 A3            T      DB60         NOT ALL DIGITS DONE
0361 53 80         TL     DB90         FINISHED
            *
0363 D1     DB60   TM     STORE        WAIT
            *MULTIPLY NUMBER SO FAR BY 10 (MAKE ROOM FOR NEXT DIGIT)
0364 D2            TM     SHIFT        *2
0365 C3            LB     R7D2
0366 34     DB70   LD     3            SAVE *2
0367 2C            EXD    3
0368 A6            T      DB70
0369 D2            TM     SHIFT        *4
            *
036A D1            TM     STORE        WAIT
            *
036B D2            TM     SHIFT        *8
036C 00 BD         LBL    D2R4         ADD *2
036E 24            RC
036F 34     DB80   LD     3
0370 0A            ADC
0371 2C            EXD    3
0372 AF            T      DB80
0373 91            T      DB20         DO NEXT DIGIT
```

```
              ORG    380
         *
0380 D1  DB90    TM     STORE       WAIT
         *COMPLETION
0381 CB          LB     R0D9
0382 37          LD
0383 6A          ADI    5
0384 86          T      *+2         FROM GROUP
0385 8C          T      DB120       FROM CALL
0386 C3          LB     R7D2
0387 30  DB100   LD     7
0388 28          EXD    7
0389 87          T      DB100
038A C3          LB     R7D2
038B D4  DB110   TM     CLEAR       CLEAR PAGE #
038C 00 FF DB120 LBL    D0R0        RESET GROUP BITS 8/9
038E 37          LD
038F 0B          AD
0390 0B          AD
0391 0B          AD
0392 3F          EX
0393 30          LD     7
0394 0F          OR
0395 3F          EX
         *SEND NEW GROUP/PAGE TO TERMINAL

0396 D1  SEND    TM     STORE       WAIT
         *
0397 D6          TM     PEND        STOP PRINTING
         *
0398 D1  SD10    TM     STORE       WAIT

*SEND PAGE #
0399 C3          LB     R7D2
039A 24          RC     *           MARK PAGE # SENDING
039B 34  SD20    LD     3           GET 4 BITS FOR GAD/PAD
039C 1C 1E       IOL    #1E         SEND
039E 42          SKBI   2
039F A4          T      SD24        NOT 1ST 4 BITS
03A0 15          SKC
03A1 7E          LDI    1           1ST 4 BITS PAGE #

03A2 77          LDI    8           1ST 4 BITS GROUP #
03A3 AB          T      SD32
03A4 15  SD24    SKC
03A5 A8          T      SD30        2ND/3RD 4 BITS PAGE #
03A6 53 C0       TL     SD40        LAST 4-BITS GROUP #
03A8 41  SD30    SKBI   1
03A9 7B          LDI    4           3RD 4 BITS PAGE #
03AA 7D          LDI    2           2ND 4 BITS PAGE #
03AB 1C 07 SD32  IOL    #7          PULSE LEN
03AD 7F          LDI    0
03AE 1C 07       IOL    #7
03B0 2C          EXD    3
03B1 9B          T      SD20
         *
03B2 D1          TM     STORE       WAIT

*SEND GROUP #
03B3 C1          LB     R0D2
03B4 20          SC     *           MARK GROUP # SENDING
03B5 9B          T      SD20
                 ORG    3C0
03C0 77  SD40    LDI    8
03C1 D3          TM     PLSB
03C2 1C 13       IOL    #13         GET PER
03C4 3F          EX
03C5 7D          LDI    2
03C6 0D          AND
03C7 60          ADI    F
03C8 9C          T      SD45        INVALID GROUP
03C9 C5          LB     R7D3        PER OK
```

```
03CA  2F              EXD
03CB  1E              SKZ    *         INITIALISING
03CC  91              T      SD44
03CD  7D              LDI    2
03CE  3F              EX     *         CALL PAGE 2
03CF  53 98    SD43   TL     SD10      SEND
03D1  D5       SD44   TM     SCHRS     RESET SCH'S
                      *      .
03D2  D1       RESET  TM     STORE     WAIT

*RESET KBD # AND EXIT
03D3  7F              LDI    0
03D4  1C 17           IOL    #17       CLEAR KAC
03D6  C4              LB     R3D2
03D7  D4       RS10   TM     CLEAR
03D8  70              LDI    F
03D9  3F              EX
03DA  53 10           TL     KBX25     RETURN TO SCHEDULER

*INVALID GROUP - SET TO ZERO
03DC  C5       SD45   LB     R7D3      PER BAD
03DD  09              ADSK
03DE  8F              T      SD43      INITING - RESEND PGE 1
03DF  1F              DECB
03E0  7C              LDI    3         BAD GRP - SEND GRP 0 PGE 3
03E1  7F       SD60   LDI    0
03E2  38              EX     7
03E3  7F              LDI    0
03E4  28              EXD    7
03E5  A1              T      SD60
03E6  8F              T      SD43
                      *
                      *
                      *
                      END
```

Figure 24:
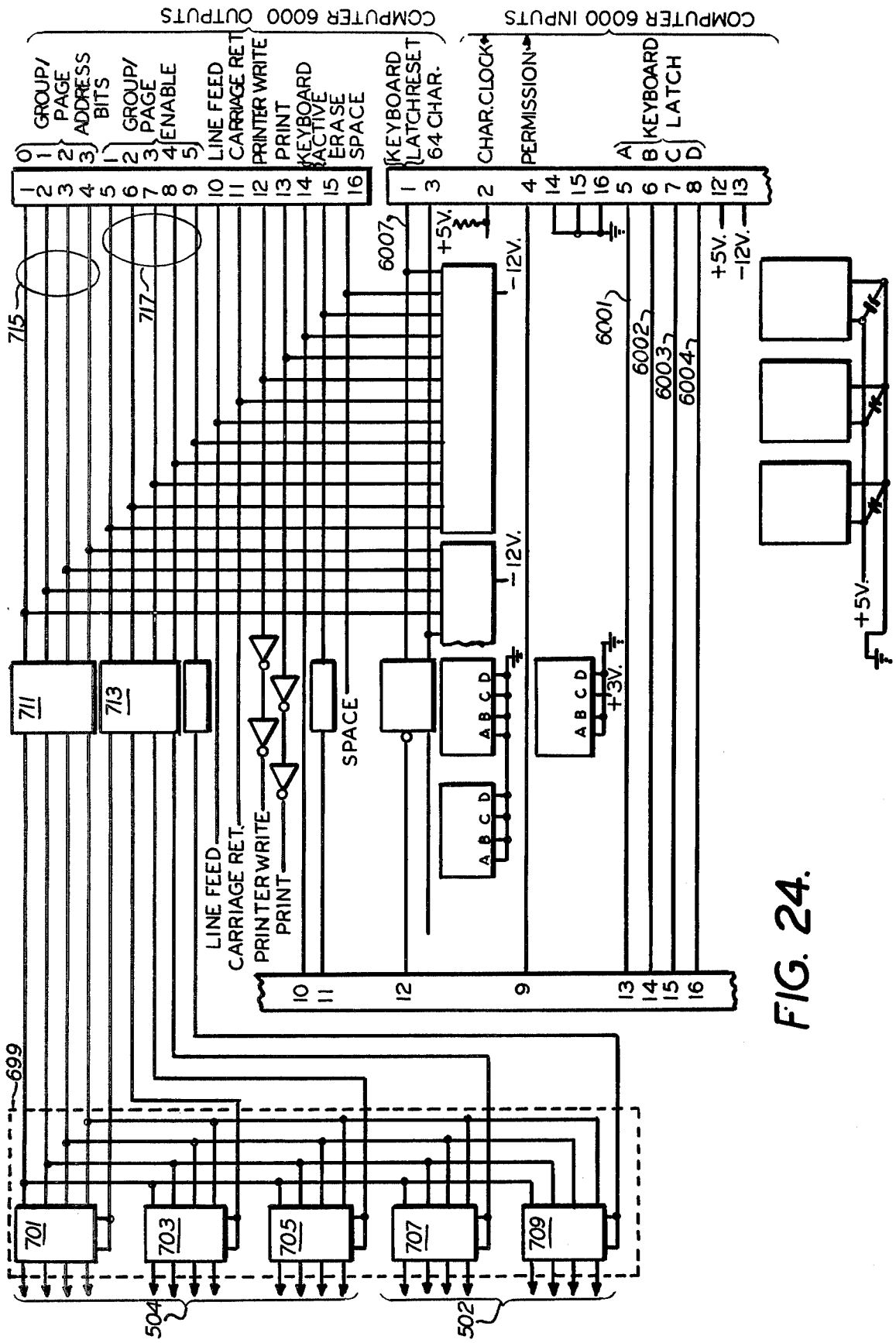
FIG. 24 is a block diagram, partially in schematic, of the various interface connections between the microprocessor and the keyboard in the preferred improved receiver of the present invention.
Figure 26:
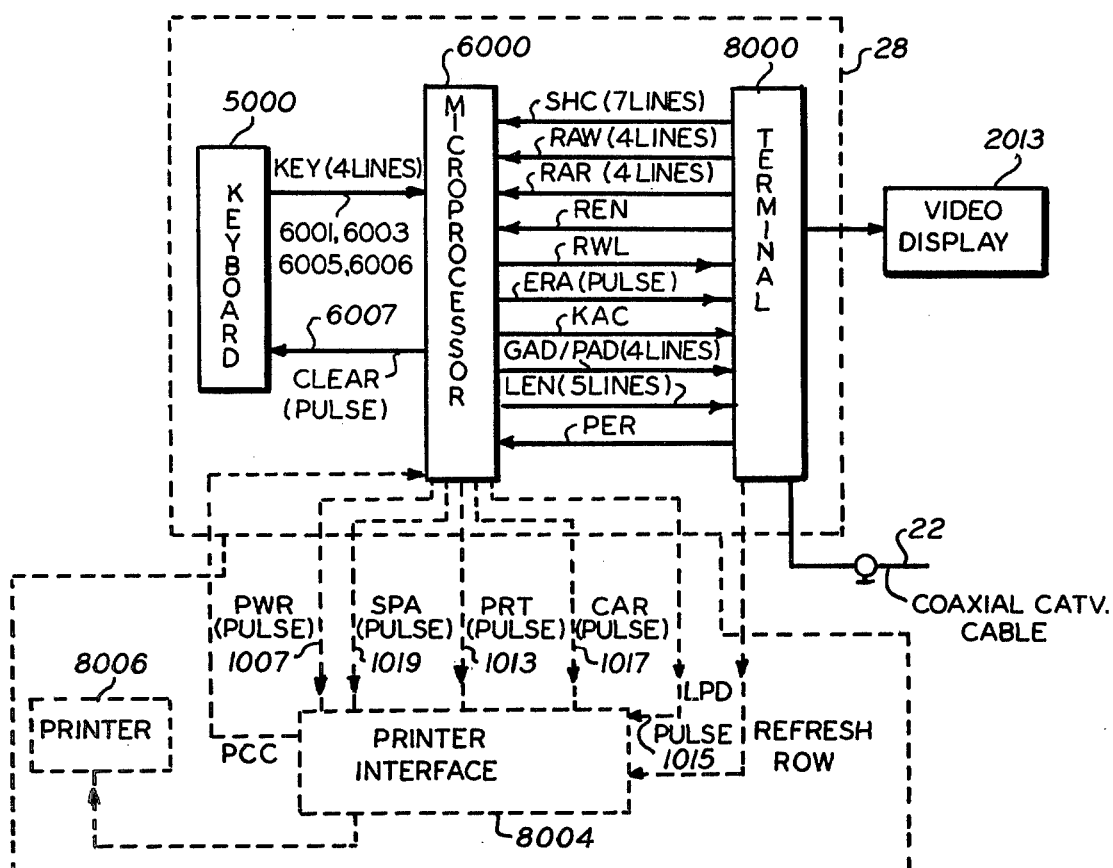
FIG. 26 is a block diagram of the preferred improved receiver of the present invention including a functional indication of the various control signals utilized therein.
Figure 27:
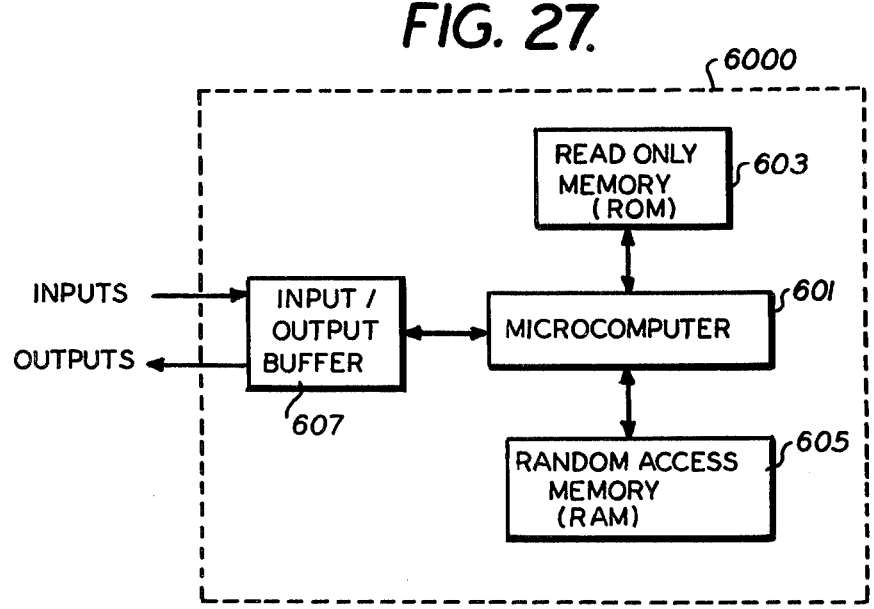
FIG. 27 is a block diagram of the microprocessor portion of the preferred improved receiver of the present invention illustrated in FIG. 26.
Figure 28:
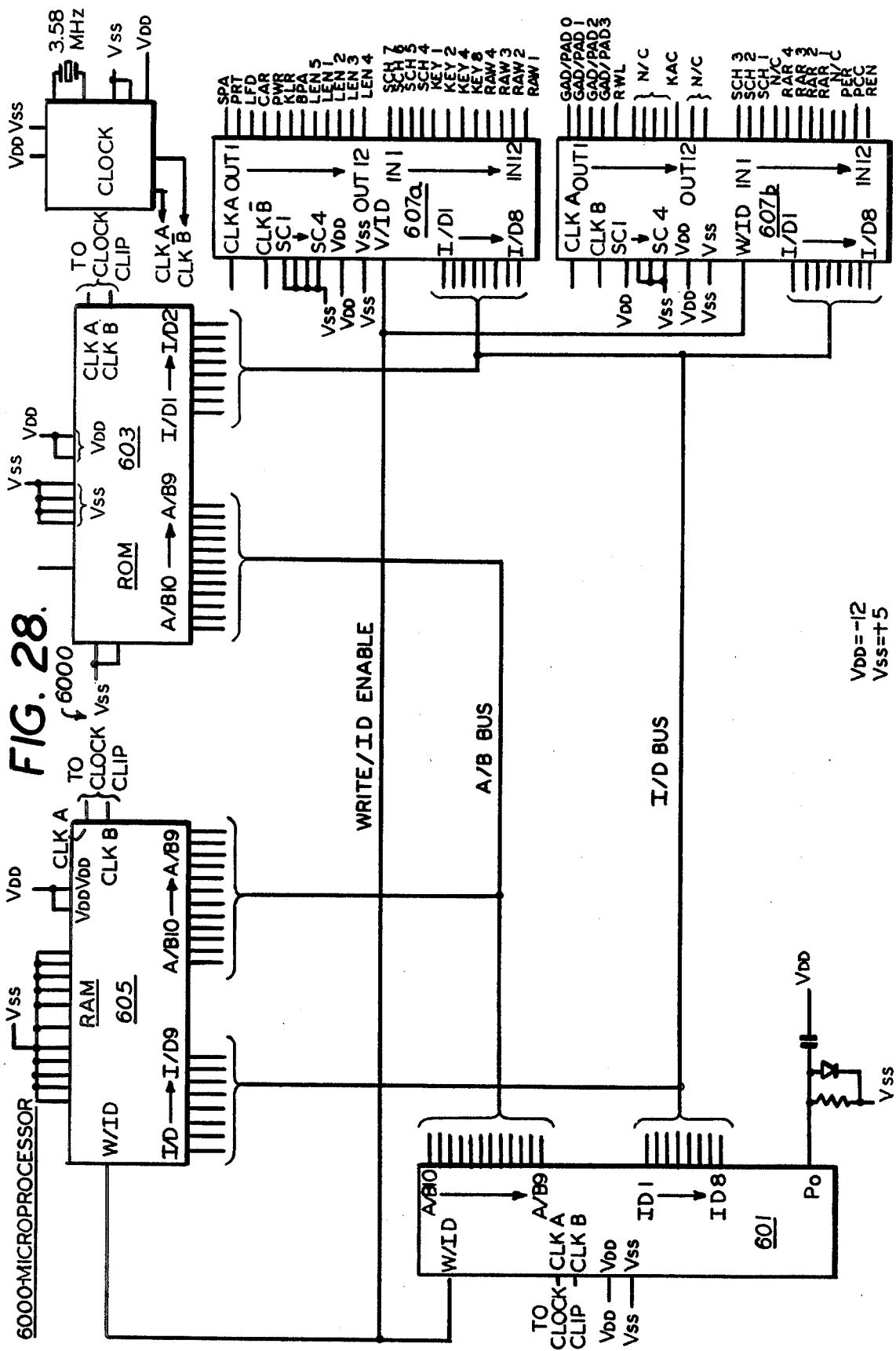
FIG. 28 is a functional block diagram similar to FIG. 27 for use in explaining an exemplary program for the microprocessor of the preferred improved receiver of the present invention.

The various inputs and outputs to the microcomputer or CPU 601 are all preferably conventionally routed through the input/output buffer 607 for interfacing the system with the microcomputer 601 and have been omitted from FIG. 27 for clarity; however, these signals as well as their function in the system for providing displayable rows of video information on video display terminal 2013 is illustrated in FIGS. 24, 26 and 28 and shall be described in greater detail hereinafter. During operation of the system, microcomputer 601 gets the instructions required from the stored program in read only memory 603 step-by-step, such as "take data from buffer 607 and put it in random access memory 605" or "take data out of random access memory 605 and provide it to buffer 607". Microcomputer 601 can also perform typical computer functional operations on the data. As shown and preferred in FIG. 26 which is a block diagram of the terminal key board and microprocessor input/output for video display row-by-row of pseudo video scan lines in the improved row grabbing terminal 28 of the present invention, the keyboard 5000 provides selection information to the microprocessor 6000, such as the group and page address, as described in our previous U.S. Pat. No. 3,889,054. The balance of the circuitry of the receiver 28 controlled by the microprocessor 6000 is generally represented by the block 8000 labeled "terminal" in FIG. 26. If desired, the input-/output buffer 607 may also include a conventional special character decoder in addition to the balance of the interface functions performed thereby so as to detect the presence of a special character. The various latchings preferably occurring within the terminal 8000 shall be described in greater detail hereinafter with reference to FIG. 24. As shown and preferred in FIG. 10, the keyboard entry line for the microprocessor 6000 from keyboard 5000 preferably comprises four lines 6001, 6003, 6005 and 6006 which are set when a key is pressed and latched and are reset to the idle state only when a clear pulse is sent via line 6007 from the microprocessor 6000. The keys which can be set are numeric keys as well as special function keys such as group, page, up, back, and call. In addition, as described in the copending U.S. patent application of Robert H. Nagel, one of the joint inventors herein, and owned by the same assignee as the present application and entitled "Information Retrieval System Having Selectable Purpose Variable Function Terminal" filed Sept. 10, 1975, and bearing U.S. Ser. No. 611,937, additional keys such as program may be provided when the system is utilized to retrieve programs or sets of instructions as opposed to or in addition to data. As shown and preferred in FIG. 26, if a group key is depressed and preceded by a number, terminal 8000 will be informed of the new group via the group address and page address line GAD/PAD and LEN lines, with the page number preferably reset to zero. If the group is not preceded by a number, preferably the only action taken would be to release directed messages by setting and clearing the KAC line and to erase the screen via a pulse on the ERA line, all functions which change the group/page accomplishing this such as call, back, up and group. The inputs from the terminal 8000 to the microprocessor 6000 are preferably the row enable line REN, the row address read line RAR, the row address write line REW, the special character line SCH, and the permission line PER. The output to the keyboard is preferably the clear or keyboard latch reset line 6007 which is pulsed when a key has been completely processed so that the key will then be reset to the idle state. The outputs to the terminal 8000 from the microprocessor 6000 preferably comprise the erase line which erases the video display 2013, the keyboard active line KAC which is set while a group/page number is being sent to the terminal 8000 so that the terminal 8000 will take no action on it until the number is completely received, the group address/page address line GAD/PAD which informs the terminal 8000 of a new page to grab, the latch enable line LEN and the row length line RWL. Suffice it to say that the microprocessor 6000 performs all data handling and execution of the permanently stored program in the read only memory 603 with the random access memory 605 preferably functioning to store data in order to accomplish the row grabbing function, the data being taken out of the random access memory 605 and provided to the input/output buffer 607 for subsequent display on the video display 2013.

Referring now to FIG. 24, the output of microprocessor 6000 preferably includes four general purpose address bits or lines 715 and five lines of enable pulses 717. Lines 717 specify which one of the plurality of latches 701, 703, 705, 707 and 709, collectively referred to by reference numeral 699, with latches 701, 703 and 705 being the page address latches, and latches 707 and 709 being the group address latches, the address bits 715 are designated for. By utilizing the four data lines 715 and five enable lines 717, up to 20 different bits of address, which is equivalent to 1,048,576 addresses, can be established. The page address output bits collectively referred to by reference numeral 504 and the group address output bits collectively referred to by reference numeral 502 are employed in the memory input control portion of the receiver 28 illustrated in FIG. 11 preferably in the same manner as described in our previous U.S. Pat. No. 3,889,054 with respect to the outputs of the keyboard counter 500 of the system described in U.S. Pat. No. 3,889,054 and will not be described in greater detail hereinafter since such description is specifically incorporated by reference herein.

Referring to the aforementioned exemplary program written in PPS-4 Assembler language, as was previously mentioned, a typical microprocessor 6000 arrangement which is controlled by the aforementioned program is illustrated in FIG. 28 with the various pin number designations utilized by Rockwell International for the read only memory, random access memory, CPU or microcomputer, and input/buffer chips 605, 603, 601, and 607a and 607b, respectively being utilized in FIG. 28 for clarity. Furthermore, and as shown and preferred in FIG. 26, if desired, the receiver terminal 28 may additionally have a computer/printer or cathode ray tube display interface for use with a CRT character generator so as to provide a "hard copy" printout of the information being displayed on video display 2013 as well as the video display thereof. However, this is optional to the improved video display terminal of the present invention and need not be included unless such "hard copy" printout is desired. In such an instance, a printer interface 8004 and conventional printer 8006 would be required and would preferably be controlled by the microprocessor 6000 in a manner to be described in greater detail hereinafter. It should be noted that if such printing function is not desired then the functions of the terminal 28 and microprocessor 6000 relating thereto may be omitted; however, for purposes of completeness the programmed terminal will be described, as illustrated in the aforementioned program, assuming such printer and printing function is included.

Referring once again to FIGS. 26 and 28 and the aforementioned program, in order to facilitate the understanding of the functioning of the illustrative conventional program in the system of the present invention, the following detailed description of the inputs from the keyboard 5000, the inputs from the printer interface 8004, the inputs from the terminal 8000, the outputs to the keyboard 5000, the outputs to the printer interface 8004, the outputs to the terminal 8000, the input/output buffer assignments, the random access memory or RAM allocations, the register allocations, and the read only memory or ROM map is provided by way of example below.

| | Inputs (from keyboard 5000) |
|---|---|
| (a) | Keyboard entry KEY 4 lines |
| | Set when a key is pressed and latched. Reset to the idle state only when a pulse sent on KLR. |
| | Settings are as follows: |
| | 0–9 for numeral key. Consecutive numeral keys pressed will build a number (leading zeros automatically provided). Leading digits which |

-continued

|   |   |
|---|---|
|   | cause the number to become too big for the function will be ignored - eg, if 255 is the biggest number allowed for a group, and the number 256 is inserted, when the GROUP key is pressed, this will be truncated to 56. |
|   | $A_{16}$ for GROUP key. If this is preceded by a number, the terminal will be informed of the new group via GAD/PAD and LEN lines, with page number reset to zero. If not preceded by a number, the only action taken will be to release directed messages by setting and clearing KAC and to erase the screen via a pulse on the ERA line (all functions which change the group/page do this - i.e., CALL, BACK, UP and GROUP). Biggest numbers are 127 for 6-bit characters, 1023 for 7-bit characters. |
|   | $B_{16}$ for PRINT key. There are two print modes - mode A is initiated by pressing the PRINT key preceded by a number between 1 and 16 (when truncated to = 16), or by pressing the PRINT key with no preceding number when not already in mode A or B. The former will cause the specified row of the displayed page to be printed, preceded and terminated by a line feed, carriage return. |
|   | The latter will cause the complete page to be printed, preceded by a line feed, carriage return, and each row terminated by a line feed, carriage return. Several rows can be marked for printing before the first has been fully printed by repeating the row print command. |
|   | Mode A is terminated by the printing initiated above being completed, or by pressing the PRINT key with no preceding number when already in Mode A or B (this also terminates Mode B), or by doing an operation which sends a new CAD/PAD identifier pulse (i.e., pressing valid GROUP, CALL, UP, BACK) or by starting Mode B. |
|   | Mode B is initiated by pressing the PRINT key preceded by the number 0 (when truncated). This prints certain information on receipt of certain SCH's (see below). It is terminated by pressing the PRINT key preceded by a non-zero number (which initiates Mode A), or by pressing the PRINT key with no preceding number when already in Mode A or B (this also terminates Mode A). |
|   | $C_{16}$ for UP key. Any preceding number is ignored. The page number is incremented and the terminal informed via GAD/PAD and LEN lines with the group number unchanged. The screen is first cleared by an ERA pulse. If the page number is already at its highest limit (1023 for 6-bit characters, 4095 for 7-bit characters) the key pressing is ignored except for the screen being cleared, and KAC being set and cleared to release directed messages. |
|   | $D_{16}$ for BACK key. As UP except the page number is decremented, and no action is taken if the page number is already zero. |
|   | $E_{16}$ for CALL key. If this is not preceded by a number, zero is assumed. Else, the number is truncated to $\leq 1023$ if the central computer is transmitting 6-bit characters (determined by SCH values - see below), or $\leq 4095$ if 7-bit characters are transmitted. The page number is reset to this and the terminal informed in GAD/PAD and LEN lines, with the group number unchanged. The screen is first cleared by an ERA pulse. |
|   | $F_{16}$ when in idle state. When any key is pressed, that key is not processed unless it is held constant for a minimum of 1 millisecond, to provide bounce protection. |
|   | As KEY is not reset to idle state unless the key has been released and KLR has been pulsed, KEY is not processed unless it is different from the last KEY processed, although KLR will be periodically pulsed. |
|   | Inputs (from printer interface 8004) |
| (b) | Printer character clock PCC 1 line |
|   | Runs at the printer rate (10 cps). High for 27 milliseconds (3-bit times) during which stop and idle bits are sent to printer and when interface can receive a pulse (SPA, LFD, CAR or PRT) from the PPS. Low for 73 milliseconds during which a character is sent to the printer. Used to determine when to send one of the above pulses to the interface, and also as a count after a PRT pulse is issued to determine when a row has been printed. |
|   | Inputs (from terminal 8000) |
| (c) | Row enable REN 1 line |

|     |     |
| --- | --- |
|     | Runs at the row rate of the terminal. 1 row = 13 scan lines = 13*63 microseconds (except during vertical retrace ≃ 5 milliseconds). Low while RAR changing and therefore invalid (especially during vertical retrace). High when RAR valid. |
| (d) | Row address (read) RAR 4 lines |
|     | When REN is high, contains the address (0 → 15) of the row currently being read from memory and displayed on the screen, and available for transmission to the printer interface. The printer interface must be told to accept the row, if it is the correct one, within 3 scan lines (-3*63 microseconds) of RAR changing, by a PWR pulse. |
| (e) | Row address (write) RAW 4 lines |
|     | Contains the address (0 → 15) of the last row written to memory after being grabbed from the cable. It is latched onto this and will not change until a new row is read. As rows can preferably only be written during the 3 blank scan lines at the end of a row, this will only change 2 scan lines (110μsec = 22 cycles) before RAR changes. RAW will therefore be constant for a minimum of 10 scan lines after RAR changes. |
| (f) | Special character SCH 7 lines |
|     | Each row written (see RAW) has an SCH attached to it. This is changed at the same time as RAW and latched. Characters transmitted by the central computer are either 6 or 7 bits. To enable the PPS to know which, at least one row on Group 0, Page 0 will be transmitted with an SCH indicating which by its most significant bit (= 0 = > 6-bit chars, =1= > 7-bit). As group and page are automatically set to zero on power up, the PPS will know, from the very first page grabbed, what limits to set for page and group. Apart from this SCH, at the moment all other SCH's have individual meanings as follows: |
|     | 0 Reset. Set to 0 by the terminal on power up. Real SCH's are zero when no action is to be taken, or when action started by an SCH is to be repeated. To ensure that action on any SCH is taken, the central computer will repeat it on the particular row several times. So to ensure a desired single operation is not repeated, the PPS will only act on an SCH which has changed on that row. Therefore, to repeat a similar operation, the central computer must send a zero SCH on the row before repeating the non-zero SCH. When a new page is selected, the PPS will act on the first SCH on each row, and then only when an SCH for a row changes. |
|     | 1 Row print (select). The row specified by RAW is printed only if in print mode B. |
|     | 2 Page print (select). The page displayed is printed only if in print mode B. |
|     | 3 Row print override. The row specified by RAW is printed regardless of print mode. |
|     | 4 Page start. Not used for any specific PPS function. |
|     | 8 64 character row. The row specified by RAW is a 64 character row. If this row is printed later on, the PPS will wait for 64 clock pulses after issuing a PRT pulse before it sends the terminating LFD, CAR pulses. Receipt of this SCH sets RWL to 1. |
|     | $10_{16}$ 32 character row. The row specified by RAW is a 32 character row. If this row is printed later on, the PPS will send 16 SPA pulses (to space the row in the middle of the page), then a PRT pulse. After 32 clock pulses, it sends the terminating LFD, CAR pulses. Receipt of this SCH sets RWL to 0. |
|     | $18_{16}$ Erase. The PPS sends an ERA pulse to the terminal. |
| (g) | Permission PER 1 line |
|     | After a new group number is sent to the terminal, this line is tested. If low, the terminal is not allowed to receive that group, so the group number is reset to zero (the page number will already be zero), and reset to the terminal. The line is valid at any time, even when KAC is still set. |
|     | <u>Outputs</u> (to keyboard 5000) |
| (a) | Keyboard latch reset KLR 1 line |
|     | Pulsed when a key has been completely processed. KEY will then be reset to the idle state. |
|     | <u>Outputs</u> (to printer interface 8004) |
| (b) | Printer write PWR 1 line |
|     | When a print is initiated, RAR is sampled until it equals the next row to be printed. PWR is pulsed within 189 microseconds of it changing, so the interface can write the row into its memory for printing on the PRT pulse. |

-continued

| | | | |
|---|---|---|---|
| (c) | Space SPA 1 line | | |

(c)      Space SPA 1 line
        On a 32 character row print, 16 leading spaces
        are printed, by sending this pulse once during each
        clock cycle when PCC is high for 16 times.

(d)      Line feed LFD 1 line
        To print line feed, send LFD pulse while PCC
        high.

(e)      Carriage return CAR 1 line
        To print carriage return, send CAR pulse while
        PCC high.

(f)      Print PRT 1 line
        To print the row currently held in the printer
        interface buffer, send PRT pulse while PCC high and
        wait 32 or 64 clock times before issuing any other pulse
        to the interface.

<u>Outputs</u> (to terminal 8000)

(g)      Erase ERA 1 line
        Erases screen. Pulse when SCH $18_8$ received,
        or when a group/page number is sent to the terminal, or
        when GROUP key is pressed with no preceding number.

(h)      Keyboard active KAC 1 line
        Set while a group/page number is being sent to
        the terminal, so the terminal takes no action on it until
        the number is completely received. Will always be preceded
        by an ERA pulse. Also ensures directed messages
        are released, so set and cleared for any pressing of
        GROUP, CALL, BACK or UP, even if no new group/page
        number is sent.

I/O Assignments (bit 0 = LSB, bit 3 = MSB)

| | | | | |
|---|---|---|---|---|
| I/O $0_{(607a)}$ | GRP A | (A) | READ | SCH bits 0–3 |
| | | (E) | SET | SPA (bit 0), PRT (bit 1), LFD (bit 2), CAR (bit 3) |
| | GRP B | (9) | READ | KBD |
| | | (D) | SET | PWR (bit 0), KLR (bit 1), ERA (bit 2), LEN bit 4 (bit 3) (Only used for pulses via TM PLSB.) |
| | GRP C | (3) | READ | RAW |
| | | (7) | SET | LEN bits 0–3 |
| I/O 1(607b) | GRP A | (1A) | READ | SCH bits 4–6 (bits 0–2). Bit 3 always 0. |
| | | (1E) | SET | GAD/PAD |
| | GRP B | (19) | READ | RAR |
| | | (10) | SET | RWL (bit 0) (Any change of bits 1–3 must leave RWL unaltered). |
| | GRP C | (13) | READ | PER (bit 1), PCC (bit 2), REN (bit 3) |
| | | (17) | SET | KAC (bit 1) (Any bit set excludes others from being set.) |

(i)      Group address/Page address GAD/PAD 4 lines
        To inform the terminal of a new page to grab,
        the page's identifier is sent in 5 pulses of 4 lines
        each. After the identifier is assembled in the PPS,
        the first 4 bits will be set on these lines, and LEN
        line 1 is pulsed. Then the second 4 bits are set, and
        LEN line 2 is pulsed, and so on until all 20 bits are
        sent. The identifier is constructed from the group/page
        number as follows:

(i)    using 6-bit characters
               bits 0 → 9     = page number
               bits 10/11     = 0
               bits 12 → 18     = group number
               bit 19     = 0

(ii)    using 7-bit characters
               bits 0 → 9     = page number
               bits 12 → 19     = group number bits 0 → 7
               bits 10/11     = group number bits 8/9

(j)      Latch enable LEN 5 lines
        Only 1 line pulsed at any one time. If line n
        is pulsed, the terminal will take the 4 GAD/PAD lines
        as the nth 4 bits of the new group/page identifier (20
        bits).

(k)      Row length RWL 1 line
        Latched on 1 for 64 character rows, 0 for
        32 character rows. Set according to the last SCH of
        8 or $10_{16}$.

RAM (605) allocation (RxDY = RAM address xy)
     (all initially zero unless otherwise stated)

R0 D0/1/2     Group # [3rd digit - bits 8/9 - only used as temporary storage, as bits 8/9 group # normally held in page #]

R7 D0/1/2     Page # [bits 10/11⇒bits 8/9 group #] - Also used

-continued

| | |
|---|---|
| | for binary # during decimal to binary conversion. |
| R3 D0/1/2/3 | Keyboard # (decimal) R3D0 = $F_{16}$ => no number yet. R3D0 = most significant digit. |
| R4 D0/1/2/3 | Workspace. Used for current high limit and during decimal to binary conversion. |
| R8 D0/1/2/3 | Group # high limit (decimal). Initially 0, 1, 2, 7. |
| R9 D0/1/2/3 | Page # high limit (decimal). Initially 1, 0, 2, 3. |
| R6 D0/1/2 | KBD routine suspend address - used by STORE S/R. Initially complement of address of KBYX (C, F, F). |
| R1/R2 | Complement of last SCII on each row. (R1 = bits 0-3, R2 = bits 4-7) |
| R5 | Row status for each row:<br>Bit 3 set = > print this row<br>Bit 2 set = > print leading CRLF |
| R3 D5 | Current row - set to row being searched for, or row being printed. |
| R6 D5 | Row count. # of rows searched for without being printed. |
| R4 D5 | Searching for row<br>= 0 = > yes<br>= 1 = > no   Initially 1 |
| R3/R4 D6 | 6-bit count for printing. Used when printer pulse occurs and printing in progress.<br>If = 0, next o/p is shifted left and if ≠ 0, that pulse is sent (if = 2 when shifted, new count is set also).<br>If when shifted, next o/p = 0, then next row to print is searched for.<br>If ≠ 0, next o/p is masked with mask and that pulse sent after the count is decremented. |
| R0 D7 | Row length. = F = > 64 char rows. = E = > 32 char rows. Set by last SCH of 8 or $10_{16}$. |
| R3 D7 | Next o/p<br>= 1 = > SPA]   ≠ 0 = > printing in progress<br>= 2 = > PRT]   = 0 = > no printing<br>= 4 = > LFD]<br>= 8 = > CAR]<br>This digit is sent on I/O 0 group A as a pulse after being masked or shifted as above. |
| R4 D7 | Mask<br>= 0 = >  Do not send SPA or PRT pulse unless count = 0 (then no mask takes place). 64 character rows (set when row to be printed)<br>= 1 = >  Do not send PRT pulse unless count = 0. 32 character rows<br>[Remember when count = 0, shift left of next o/p occurs before pulse.] |
| R3 D8 | Last PCC value (in bit 2). |
| R4 D8 | 4 (constant mask for above). Initially 4 |
| R0 D9 | Current KBD character. |

Register Allocation

| | |
|---|---|
| FF1 | = 1 = >  Print mode A (KBD printing) |
| FF2 | = 1 = >  Print mode B (SCH printing) |
| X | Temporary working space |
| R3 D9 | KBD count<br>= 0 = >  KBD character can be processed<br>≠ 0 = >  No. of program loops to go before KBD character is accepted (bounce protection) |
| R4 D9 | Complement of last KBD character |
| R3 D10 | Complement of last RAR |
| R4 D15 | Workspace used to access each digit in binary to decimal conversion |

ROM (608) Map

| Page | | Description | | Spare Words |
|---|---|---|---|---|
| 0 (00) | | Initialization | (63) | 1 |
| 1 (40) | | Check RAR/SCH/RAW | (43) | |
| | | Check RAR | (17) | 5 |
| | Scheduler | Check PCC | (61) | |
| 2 (80) | | Go to KBD check | (1) | |
| | | Return to start of scheduler | (2) | 0 |
| 3 (C0) | | RAM addresses (1st 16 words) | (16) | 0 |
| | | S/R addresses (last 48 words) | (26) | 22 |
| 4 (100) | | Go to SCH decoder | (2) | |
| | | Switch S/R | (7) | |
| | | Binary shift left S/R | (7) | |
| | | Stop printing S/R | (7) | |
| | | Pulse I/O 0 group B S/R | (6) | |
| | | Suspend S/R | (6) | |
| | | KBD decoder S/R | (23) | 6 |

-continued

| | | | |
|---|---|---|---|
| 5 (140) | Get row S/R | (35) | |
| | SCH row print [3 S/R's] | (27) | 2 |
| 6 (180) | SCH page print [2 S/R's] | (19) | |
| | SCH erase [2 S/R's] | (8) | |
| | SCH row length [2 S/R's] | (10) | |
| | SCH character length S/R | (10) | |
| | Clear 3 digits S/R | (7) | 2 |
| | Reset special characters | (8) | |
| 7 (1C0) | KBD numeral S/R | (7) | |
| | KBD up S/R | (28) | |
| | KBD back S/R | (21) | |
| | Go to KBD call | (2) | |
| | Go to KBD group | (2) | |
| | Go to KBD print | (2) | 2 |
| 8 (200) | SCH decoder switch jump | (1) | 63 |
| 9] (240) | SCH decoder table | (128) | 0 |
| 10] | | | |
| 11 (2C0) | KBD print S/R | (56) | 8 |
| 12 (300) | Check KBD | (23) | |
| | RAR check - print row | (36) | |
| | RAR check - get row | (2) | 3 |
| 13 (340) | KBD group S/R | (11) | |
| | KBD call S/R (Pt 1) | (50) | 3 |
| 14 (380) | KBD call S/R (Pt 2) | (57) | 7 |
| 15 (3C0) | KBD call S/R (Pt 3) | (60) | 4 |

It is of course understood that the above program and program description is merely provided by way of example and other programs and program arrangements could be utilized to accomplish the row grabbing video display function of the present invention without departing from the spirit and scope thereof. In addition, as previously mentioned, if desired a conventional keyboard control system such as described in our previous U.S. Pat. No. 3,889,054 could be utilized in the improved row grabbing system of the present invention in which instance the microprocessor 6000 and the associated programming required therefor would be omitted. It should be noted that with respect to FIG. 10 which illustrates the keyboard 5000, the keyboard key switches 823 and associated lines 823a through 823d with their respective associated flip-flop latches 824, 825, 826 and 827, respectively, which are cleared by the signal present on path 6007, are preferably identical in operation with that previously described in our previous U.S. Pat. No. 3,889,054 which description is specifically incorporated by reference herein.

Figure 12:
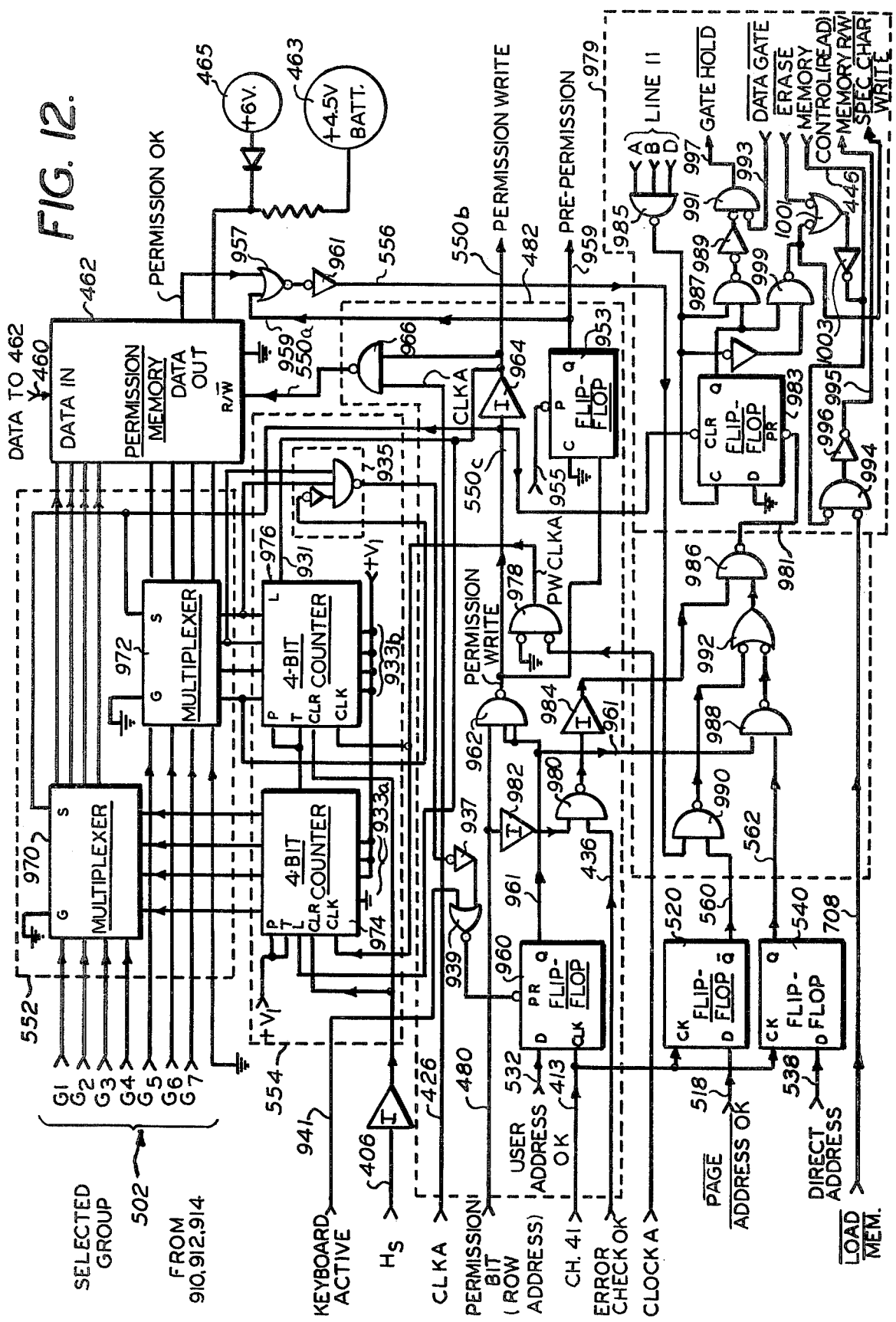
FIG. 12 is a logic diagram, partially in schematic, of the portion of the memory input control portion of the improved receiver illustrated in FIG. 7.
Figure 13:
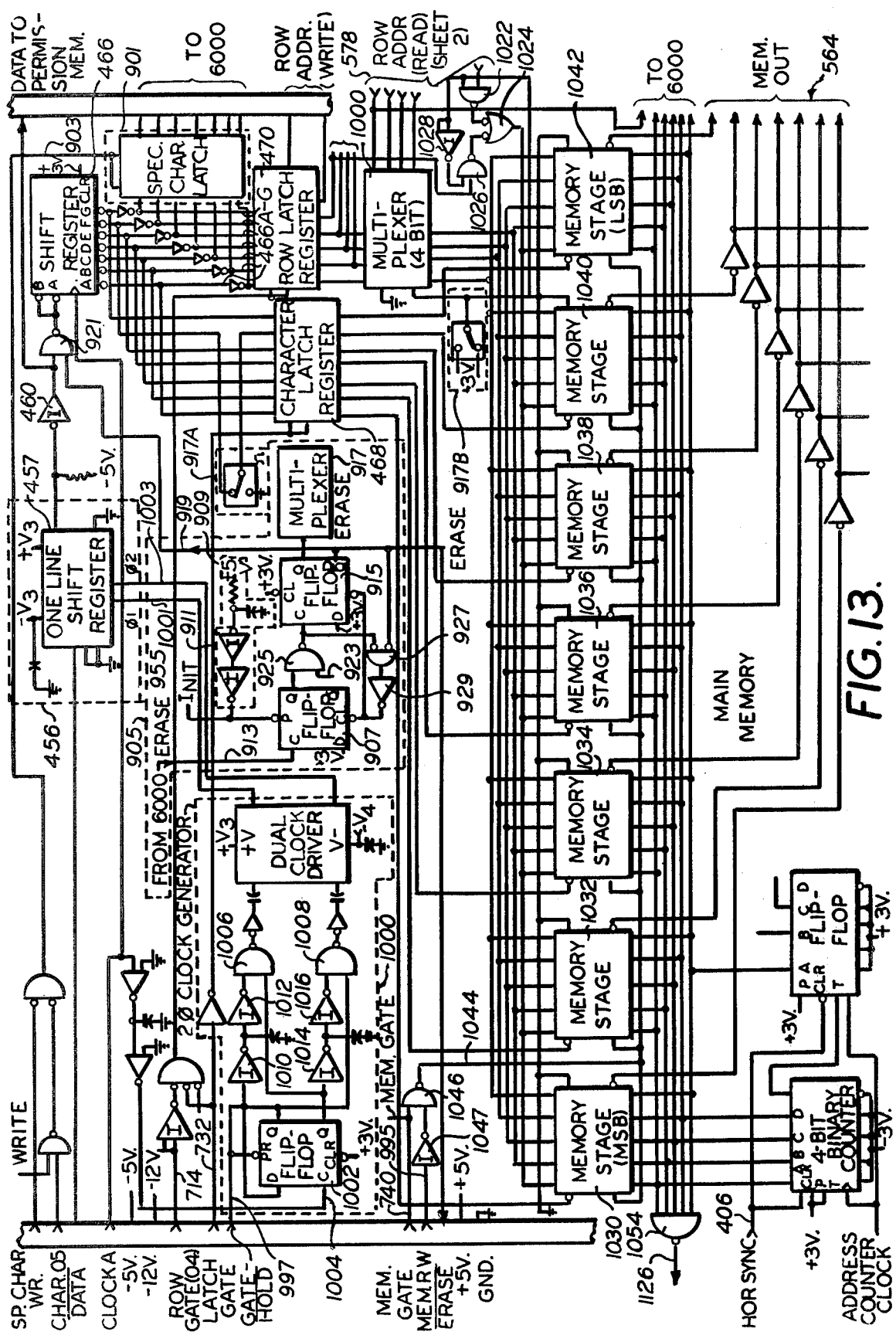
FIG. 13 is a logic diagram, partially in schematic, of the memory and output processing portion of the improved receiver illustrated in FIG. 5.

Similarly, referring to FIG. 13 which illustrates a portion of the improved memory output processor portion of the receiver 28 of the present invention, this portion is preferably identical with that described in our previous U.S. Pat. No. 3,889,054 with the exception of the erase circuit and the special character latching functions utilized with 32-or-64 character selection, to be decribed in greater detail hereinafter with reference to FIG. 13. Identical reference numerals are utilized for identical functioning components in FIG. 13 with those previously described in our previous U.S. Pat. No. 3,889,054 with reference to FIG. 12 of that patent which description was specifically incorporated by reference herein and will not be repeated. It should be noted that reference numeral 901 represents a special character latch, with the fifth character preferably being the special character, and, accordingly, latch 901 is strobed via path 903 during the fifth character. Any time a new valid pseudo video scan line is received, the special character, which is as previously mentioned preferably the fifth character, of that pseudo video scan line is entered into latch 901. The output of latch 901 is preferably provided to microprocessor 6000, as represented by the symbol "SCH" to provide an input thereto. Preferably, microprocessor 6000 does not act on all special characters such as for example not acting with respect to 32-or-64 character selection, although, if desired, the microprocessor could also be programmed to accomplish this.

ERASE CIRCUIT

Now considering the improved erase circuit portion 905 of the memory and output processor portion illustrated in FIG. 13, the erase circuit 905 provides a means for making the screen of the video display device 2013 go blank. This is desirable at initial turn on at which time the main memory would come on with a random bit pattern which in turn would display a random assortment of characters which would be meaningless and, perhaps, confusing to the viewer. Erase is accomplished by loading all character locations in memory which comprises stages 1030 through 1042 preferably with an octal 40 value is the value which corresponds to a "space" in ASCII code. The erase cycle can be initiated also by the microprocessor 6000 in response to the appropriate special character assigned for the erase function or whenever a keyboard cycle takes place, if desired. The erase cycle is preferably initiated by a conventional flip-flop 907 which gets set initially when power is on as a result of an RC charging network 909 through inverters 911 connected to the preset input of flip-flop 907. Flip-flop 907 can also preferably get set by microprocessor 6000 via the clock input provided via path 913 from microprocessor 6000. Once set, flip-flop 907 preferably enables a conventional two input NAND gate 925 which also receives the vertical sync pulse via path 923. Therefore, the first vertical sync pulse that occurs after flip-flop 907 is set appears as a negative pulse at the clock input of a second flip-flop 915 to which the output of gate 925 is connected. Flip-flop 915 is clocked to its set state preferably at the trailing edge of the vertical sync pulse. When set, the output of flip-flop 915 preferably switches a conventional multiplexer 917 such as a Texas Instruments SN 74157N, which accomplishes the switching necessary to load the memory octal 40 values; specifically, switch 917a and 917b illustratively shown separate in FIG. 13 actually comprise the multiplexer 917 with switch 917a of multiplexer 917 loading a logic one into the correct bit position of character latch register 468 whose operation is described in detail in our previous U.S. Pat. No. 3,889,054, to obtain octal 40 therefrom. All of the other bits are preferably set to 0 via path 919 which is connected to the inverted output of flip-flop 915 with the signal present thereon turning off the input to shift register 466 previously described in detail in our previous U.S. Pat. No. 3,889,054, via a conventional two input NAND gate 921 whose inputs are the output of shift register 457, which is also previously described in our U.S. Pat. No. 3,889,054, and the inverted output of flip-flop 915. As a result, all logic zeros are present at the outputs of shift register 466 which logic zeros are provided to the inputs of character latch register 468 except for the previously mentioned single bit. Switch 917b of multiplexer 917 switches multiplexer 1020, which is described in detail in U.S. Pat. No. 3,889,054, so that the read row addresses are applied to the memory stages 1030 through 1042 even though the memory stages 1030 through 1042 are in the write mode during the erase cycle. This insures that all memory locations are addressed during erase. Termination of the erase cycle is preferably accomplished by the second vertical sync pulse that occurs after flip-flop 907 has been set. The second vertical sync pulse clocks flip-flop 915 back to its original state and also clears flip-flop 907 via another conventional two input NAND gate 927 whose output is provided to the clear input of flip-flop 907 through an inverter 929. Thus, both flip-flops 907 and 915 are returned to their original state. The period of the erase cycle is thus preferably one vertical field period, this time being adequate to insure that all memory stage locations 1030 through 1042 have been addressed. As was previously mentioned the balance of the circuitry illustrated in FIG. 13 is adequately described in detail in our previous U.S. Pat. No. 3,889,054 which was specifically incorporated by reference herein.

Permission Memory Circuitry

Referring now to FIG. 12, the improved permission memory circuitry utilized in the preferred improved row grabbing terminal 28 of the present invention shall be described in greater detail. Except where otherwise specifically noted, the portions of the circuit in FIG. 12 are preferably identical with the premission memory circuitry described in our previous U.S. Pat. No. 3,889,054 with reference to FIG. 11 of that patent and identical reference numerals are utilized therefor. Thus, this description which is incorporated by reference herein will not be repeated and the following discussion of the improved permission memory circuitry will primarily be directed to the differences over the permission memory circuitry described in U.S. Pat. No. 3,889,054. In the previous permission memory circuit of U.S. Pat. No. 3,889,054, counters 974 and 976 were initially cleared to zero rather than being preloaded to a predetermined number such as 254. Thus, this previous system could possibly provide a couple of extraneous clock pulses before the first permission bit was received so that the counter was at a value of one when the first permission arrived and, accordingly, group 0 would not be available. In the improved permission memory circuit shown in FIG. 12, counters 974 and 976, which are four bit counters, constitute a 256 bit counter, although if desired a 128 bit counter could be utilized instead. This counter, which is comprised of counters 974 and 976, is preferably utilized for addressing the permission memory 462 during the permission write cycle. Counters 974 and 976 are preferably initially loaded to a predetermined value, such as preferably 254, which is accomplished by utilizing the load input 931 of counter 976 in conjunction with the preset inputs 933a and 933b of counters 974 and 976, respectively. As a result of the preload via path 931, at the beginning of a permission write cycle, the first two clock pulses advance the counter 974–976 to 0. The second clock pulse occurs just prior to the availability of the first permission bit. This timing sequence makes it possible for the first permission bit to represent group 0. thus it is possible to insure permissions for groups 0 through 127 on one pseudo video scan line. As shown and preferred in FIG. 12, 128 groups are provided via the connection of permission memory 462; however, as will be described in greater detail hereinafter, if desired, additional counters may be provided in conjunction with permission memory 462 so as to provide up to 1000 groups.

The improved permission memory circuit illustrated in FIG. 12 also enables self-termination of permission write to return the system to the normal mode if a permission line occurs at the end of a field. This is accomplished in the following manner. An inverter and NAND gate constitute a decoder 935 that generates a pulse preferably at a count, such as 192, which is greater than the number of groups, which were previously mentioned as being 128 by way of example in the arrangement illustrated in FIG. 12, and less than the number of bits in a data line to permission memory, which number of bits preferably constitutes 238 by way of example. The number 192 is preferably chosen for ease of decoding although it could be any number between 128 and 238, the criteria for these limits being defined as being greater than the number of groups and less than the number of bits in a data line to permission memory. This pulse is provided through an inverter 937 to one input of a conventional two input NOR gate 939 whose other input is the keyboard active line 941 and whose output is utilized to reset the permission flip-flop 960. Thus flip-flop 960 is guaranteed to get reset even if the completion of permission write occurs during vertical blanking. In such a case, flip-flop 960 would not otherwise get reset because the decoded character 41 pulse present on path 413 is not normally generated during vertical blanking. During a keyboard cycle, the group address is preferably not a valid signal. Therefore, the output of the permission memory 462 would not be valid. Accordingly, in order to prevent an erroneous authorization, flip-flop 960 is held in a reset state during the keyboard cycle. This is accomplished by the keyboard active line or KAC 941 which is generated by microprocessor 6000 which, as was previously described, is applied to the other input to NOR gate 939. Preferably, the improved permission memory of FIG. 12 provides permission initialization when the power is turned on, the permission memory circuit automatically selecting group 0, page 0 at such time. When the first permission line is received by receiver 28, the permission memory circuit of FIG. 12 will then preferably revert to normal operation. This initial mode, group 0, page 0 on turn on, is preferably established by flip-flop 953 which is initially preset by line 955 (FIG. 13) when power is turned on. The output of flip-flop 953 is preferably applied to a conventional NOR gate 957 via line 959 and sets the permission O.K. line 556 through an inverter 961. This asserts permission. Line or path 959, which is also preferably connected to gate 963 of the page address circuit (FIG. 11), and is termed pre-permission, also sets line 508 low. This simulates an address of page zero, group zero.

Figure 14:
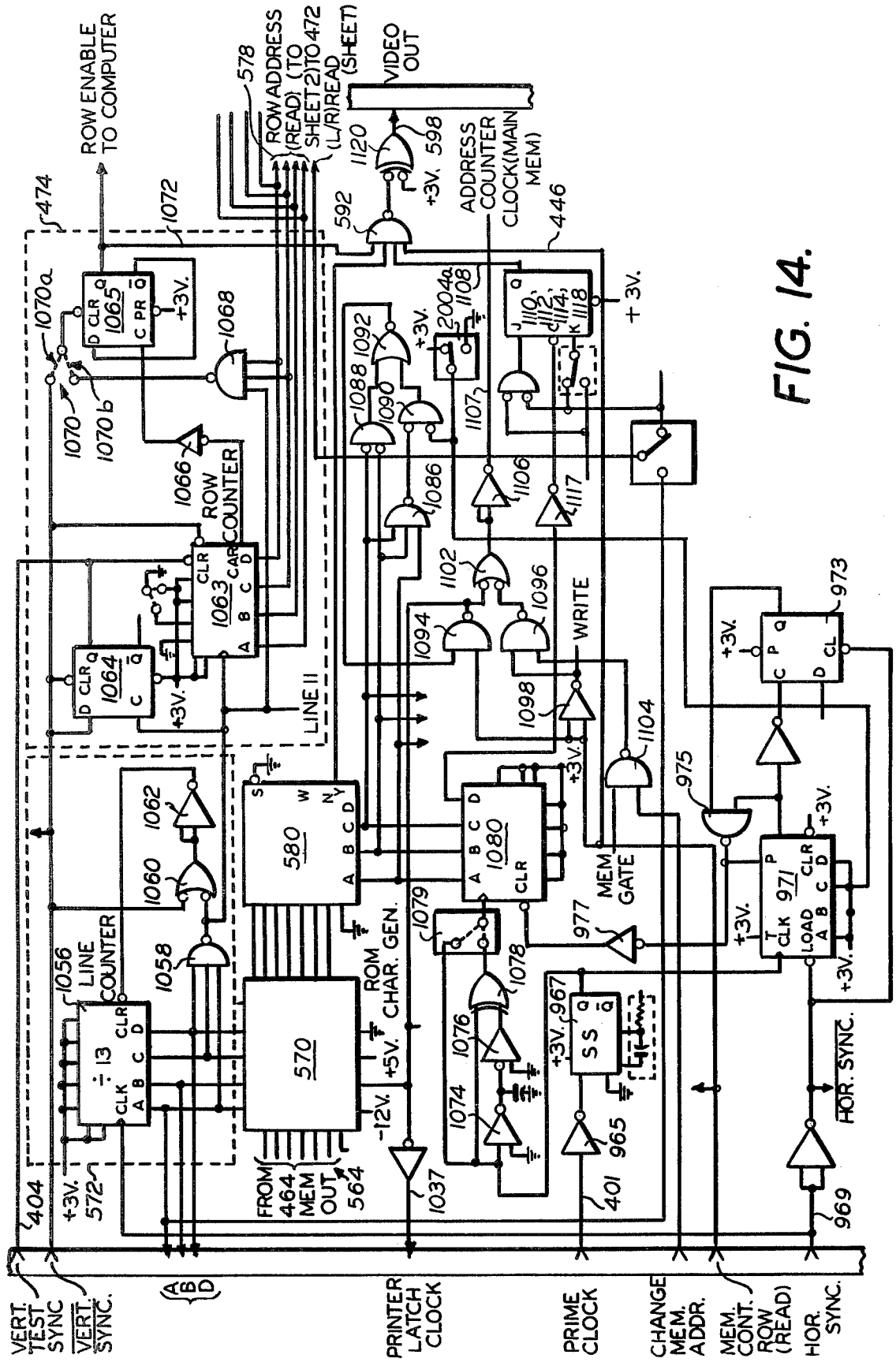
FIG. 14 is a logic diagram, partially in schematic, of another portion of the memory and output processing portion of the improved receiver illustrated in FIG. 5.

Referring now to FIG. 14, the improved permission memory update circuitry for updating the permission memory 462 (FIG. 12) is shown and will be described. As will be described in greater detail hereinafter, the purpose of the improved permission memory update circuitry is to avoid any flicker which might otherwise occur in the video display on display device 2013 during update of the permission memory as a result of such update. In the improved circuitry of FIG. 14, the previously considered clock B signal is replaced by the prime clock provided via path 401 from the voltage controlled oscillator 130 (FIG. 3). This prime clock input provided via path 401 to the permission memory update circuitry is inverted by an inverter 965 and applied to a conventional single-shot 967. Preferably, the purpose of single-shot or one-shot 967 is to generate a symmetrical square wave which is required by the conventional frequency doubler circuitry comprising inverters 1074 and 1076 and exclusive OR gate 1078. As described in our previous U.S. Pat. No. 3,889,054, inverters 1074 and 1076 provide a predetermined delay, such as 100 nanoseconds in the prime clock signal provided via path 401, this delay time preferably representing a fraction of the clock period. It is this delayed prime clock signal which is preferably supplied to one input of the two input exclusive OR gate 1078 whose other input is directly connected to the prime clock input provided at the output of single-shot 967. Exclusive OR gate 1078 preferably provides an output only during the period of time that the delayed prime clock signal overlaps the undelayed prime clock signal, which occurs twice per clock period and, as a result, two output pulses are available from gate 1078 for each input pulse. As shown and preferred in FIG. 14, the output of exclusive OR gate 1078 is fed to a conventional switch 1079 which selects between the 32 character position and the 64 character position depending on the desired character display, with the exclusive OR gate 1078 output being connected to the 64 character position and the non-doubled or direct prime clock signal being connected directly to the 32 character position of switch 1079. The output of switch 1079 is provided to the clock input of a conventional divide-by-eight counter 1080 previously described in our U.S. Pat. No. 3,889,054, such as the type manufactured by Texas Instruments under the designation SN74161N, which is a four bit binary counter connected as a divide-by-eight counter, although, if desired, a conventional divide-by-eight counter could be utilized. Thus, the frequency doubled clock signal is preferably utilized as the clock for counter 1080 only during 64 character operation while, during 32 character operation, that is 32 characters per video row versus 64 characters per video row, counter 1080 is clocked directly by the prime clock signal. The prime clock signal provided via path 401 is preferably unaffected by the permission write mode (FIG. 8). The normal horizontal sync signal provided via path 969 is preferably utilized for the horizontal timing of all of the display circuits including the memory read circuit. The horizontal sync on path 969 is also unaffected by the permission write mode as it is the normal sync during the permission write mode.

The clear signal for counter 1080 is preferably developed as follows. Counter 971 in conjunction with flip-flop 973 establishes the start of a display video row. During horizontal sync, counter 971 is preloaded to a count which depends on whether the terminal 28 is operating as a 32 or 64 characters per row terminal. When the terminal 28 is operating as a 32 character per row terminal, the preload condition for counter 971 is preferably selected as one value, such as preferably 15, and when the terminal 28 is operating in the 64 characters per row mode the preload for counter 971 is preferably selected as another value, such as preferably 11. Whichever value is selected, that value is selected so as to obtain the correct starting position on the display screen. A different preload condition is preferably required for the 32 and 64 characters per row modes because preferably a different clock frequency is required for these two modes.

At the conclusion of the horizontal sync pulse, counter 971 preferably starts counting at the prime clock rate which prime clock is provided to the clock input of counter 971 from single-shot 967. At the completion of the count, the output of the two input NAND gate 975, which has one input connected to the non-inverted output of flip-flop 973 and the other input connected in parallel to the clock input to flip-flop 973 prior to inversion thereof, goes low and stops the counting using the P inhibit input of counter 971. Preferably a predetermined count value, such as preferably a value of 31, terminates the count cycle. The negative level present at the output of gate 975 is also provided in parallel through an inverter 977 and applied to the clear input of counter 1080 which enables counter 1080 by removing the clear state and counter 1080 starts its count sequence. Thus, by utilzing the prime clock for row one and the normal horizontal sync 969 together with the improved circuitry for enabling counter 1080, the display circuits are preferably independent of the permission memory update and, thus, any flicker which might otherwise occur in the display during such update as a result thereof is minimized and preferably avoided. The balance of the circuitry associated with FIG. 14 is preferably identical with that described in our previous U.S. Pat. No. 3,889,054 with reference to FIG. 13 thereof.

Main Memory Update

Referring again now to FIG. 12, the improved main memory update circuitry shall be described in detail hereinafter. Preferably, under normal conditions when the main memory which comprises stages 1030 through 1042 (FIG. 13), is in the write mode, the outputs of these stages 1030 through 1042 are not valid. Thus, as shown and preferred in FIG. 12, update conrol circuitry 979 is provided to prevent the main memory updating or writing if a valid pseudo video scan line is received while a row is being displayed. If a valid pseudo video scan line is received while a row is being displayed, other than during the occurrence of dead space on the screen, this line will preferably be stored in shift register 457 (FIG. 13) until completion of that displayed row and the line then would be written into memory 1030 through 1042 during the dead space following the row. When a valid pseudo video scan line is received, path 981, which is connected to the output of NAND gate 986, goes low and sets a flip-flop 983 which remains set preferably until the display sweep completes the 12th line counted of a row which is equivalent to line 11 which is a preferably dead line of a row with lines 1 through 9 of the row preferably being considered active lines for a row. The information corresponding to line 11 is provided to a three input NAND gate 985 which decodes the count of 11 provided from the output of line counter 1056 (FIG. 14) and provides a negative pulse to the clock input of flip-flop 983. Flip-flop 983 is then preferably reset at the end of that pulse; that is, at the completion of the 12th line counted which is equivalent to line 11. In this regard, it should be noted that the zero line is the first line counted and, therefore, the 11th line or a count of 11 is the 12th line counted. The time during which flip-flop 983 is set preferably establishes the time during which the input data must be stored in the one line shift register 457 (FIG. 13) which preferably stores this information as long as flip-flop 983 is set plus one more line to enable for shifting out and writing into memory 1030 through 1042. Update control circuit 979 also preferably includes a two input NAND gate 987 which has one input connected in parallel to the Q or non-inverted output of flip-flop 983 and the other input connected to the output of NAND gate 985. The output of gate 987 is preferably provided through an inverter 989 to one input of another gate 991 whose other input is the data gate signal provided via path 993 from flip-flop 696 (FIG. 8). The output of gate 991 is the gate hold signal which is provided via path 997 to flip-flop 1002 (FIG. 13) and is the control line which stops the clocking of shift register 457 (FIG. 13) during the period that flip-flop 983 is set excluding the 12th line counted; in other words, the output of gate 991 via path 997 goes low when a valid pseudo video scan line is received and goes high at the beginning of the 12th line counted, which is equivalent to line 11. The output of gate 991 preferably cannot go high until the inverted data gate line 993 goes low. This continues to hold data in the serial shift register 457 (FIG. 13) preferably until the fourth character. Thus, the clocking of shift register 457 is preferably enabled at the beginning of the fourth character of the transmitted pseudo video scan line after the 12th line counted (line 11) of the displayed row is started. As was previously mentioned, the output of gate 991 is preferably applied to the preset input of flip-flop 1002 via path 997 (FIG. 13). The Q output of flip-flop 983 is also preferably connected in parallel to one input of another two input NAND gate 999 whose other input is connected through an inverter to the output of gate 985. Gate 999 preferably produces a negative level during the 12th line counted (line 11) which terminates a hold period. This 12th line counted is the time during which data is preferably written into the main memory 1030 through 1042 (FIG. 13). The low level at the output of gate 999 is preferably applied to the main memory circuit conrol (read) line 446 via a two input NOR gate 1001, whose other input is the inverted erase signal, through an inverter 1003. Gate 1001 preferably causes the memory control read line 446 to also go low during an erase cycle as a result of the inverted erase input applied thereto. As was described in our previous U.S. Pat. No. 3,889,054, the output of gate 994 which is provided through an inverter 996 preferably generates the memory pulse R/W via path 995 which is provided to the memory 1030 through 1042 through inverter 1047 and gate 1046 via path 1044 (FIG. 13). Thus, the operation of the update control circuit 979 preferably prevents any possible flicker in the display during the main memory write mode. The balance of the circuit of FIG. 12 is preferably identical with that described with reference to FIG. 11 of our previous U.S. Pat. No. 3,889,054 with the exception of the difference previously noted.

Computer/Printer CRT Display Interface

Figure 25:
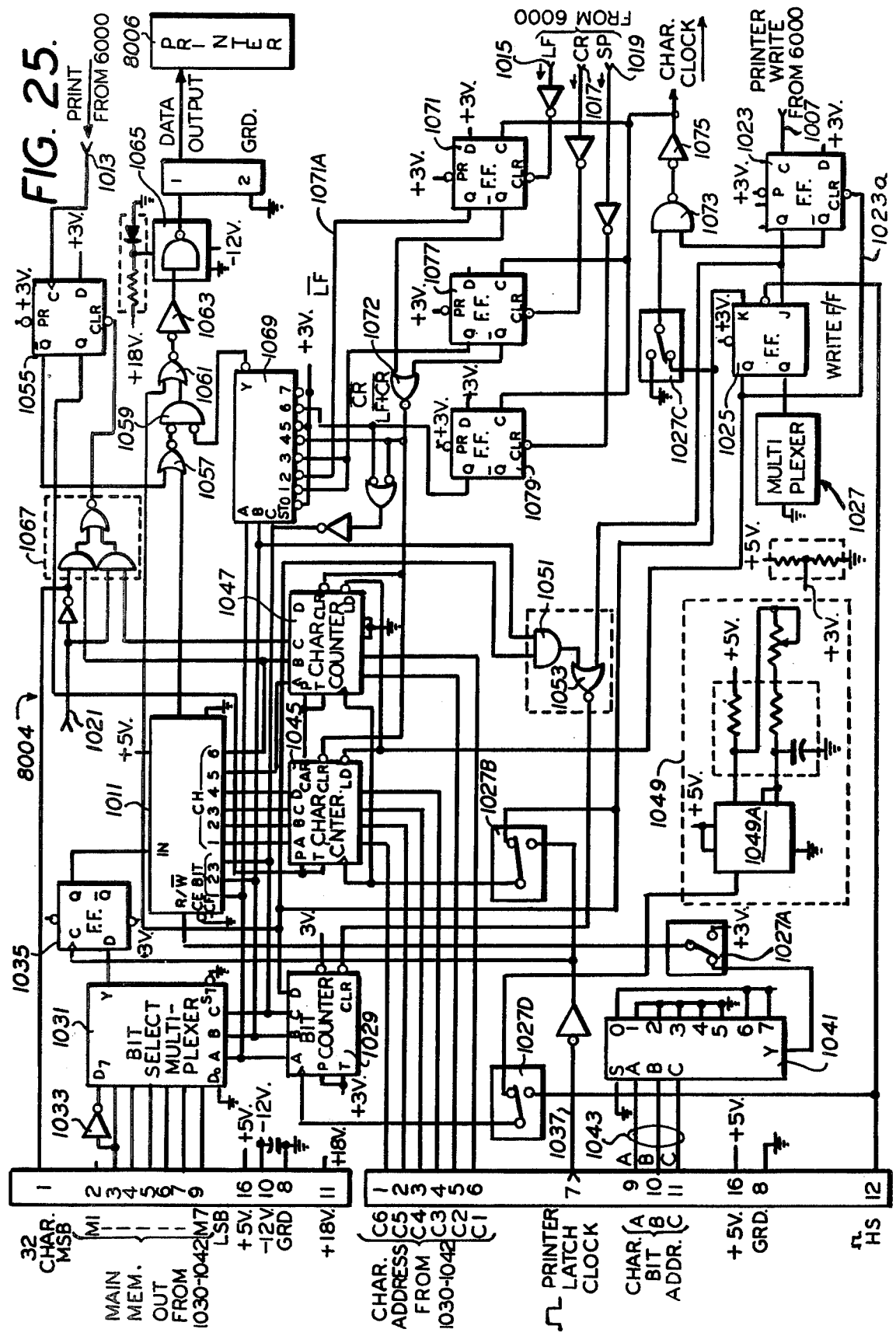
FIG. 25 is a block diagram, partially in schematic, of the computer/printer interface portion of the preferred improved receiver of the present invention illustrated in FIG. 26.

Referring now to FIGS. 24 and 25, the computer/printer CRT display interface 8004 which was generally referred to with reference to FIG. 26 with respect to the option of utilizing a printer to provide hard copy text in addition to the video display of information, and which is the subject of my copending U.S. patent application entitled "Interface For Enabling Continuous High Speed Row Grabbing Video Display With Real Time Hard Copy Print Out Thereof", filed Apr. 23, 1976, bearing U.S. Ser. No. 679,907, shall now be described in greater detail herein. As was previously mentioned, the above described system will function as an improved row grabbing terminal 28 without the additional computer/printer CRT display interface 8004 and printer 8006, if such hard copy text material is not desired, without departing from the spirit and scope of the present invention. However, assuming such hard copy text is desired, the computer/printer interface 8004 shall now be described with reference to FIGS. 24 and 25. As will be described in greater detail hereinafter, the interface 8004 preferably utilizes character information when available at a high speed rate so as to enable continuous high speed video display of the information which is normally preferably provided with the improved row grabbing terminal 28 of the present invention, as well as with our previously described row grabbing terminal described in U.S. Pat. No. 3,889,054, while also enabling real time pick off of this information for printing. The printer 8006 is preferably a conventional matrix printer, such as an Extel Model No. AF-11, whose operations are preferably controlled by the microprocessor 6000. The following function are preferably commanded by the microprocessor 6000: PRINTER WRITE, PRINT, LINE FEED, CARRIAGE RETURN, SPACE COMMAND, and the 32/64 CHARACTER COMMAND, as indicated by the control lines illustrated in FIGS. 24 and 26. The PRINTER WRITE COMMAND from the microprocessor, provided via path 1007 from microprocessor 6000, preferably causes the printer interface 8004 to write a row of characters into a buffer memory 1011 from the terminal main memory 1030 through 1042 as will be described in greater detail hereinafter. The PRINT COMMAND, provided via path 1013 from microprocessor 6000, causes the interface 8004 to output the row of characters to the printer 8006 at the proper baud rate for the printer 8006, such as at 110 baud, in serial EIA standard format including start and stop bits for the printer 8006. The LINE FEED COMMAND, provided via path 1015 from microprocessor 6000, preferably causes the interface 8004 to issue an ASCII line feed character to the printer 8006 in the same format as the characters; that is, in serial EIA standard format at the same rate, such as the 110 baud rate. The CARRIAGE RETURN COMMAND, provided via path 1017 from microprocessor 6000, preferably causes the interface 8004 to issue an ASCII carriage return character to the printer 8006 in the same format as the characters. The SPACE COMMAND, provided via path 1019 from the microprocessor 6000, preferably causes the interface 8004 to issue an ASCII space character to the printer 8006 in the same format as the characters. The 32/64 CHARACTER COMMAND, provided via path 1021 from microprocessor 6000 to interface 8004, preferably causes the interface 8004 to write into its memory 1011 the correct number of characters.

Thus, as will be described in greater detail hereinafter, the microprocessor 6000 can establish each printed page format.

Now describing the memory write mode for the interface 8004. When the interface 8004 receives a PRINTER WRITE COMMAND via path 1007, this signal is provided to the clock input of a flip-flop 1023 which is clocked to a set state. This causes a second flip-flop 1025 to subsequently be clocked to its set state by the first horizontal sync pulse occurring after flip-flop 1023 is clocked to its set state. When flip-flop 1025 is set, its $\overline{Q}$ or inverted output preferably resets or clears flip-flop 1023 via path 1023a. The set output of flip-flop 1025 preferably operates a conventional multiplexer 1027, such as a Texas Instruments SN4157N which is illustratively represented in FIG. 25 by further illustrating its various sections 1027a, 1027b, 1027c and 1027d as switches which are located in FIG. 25 in their appropriate functional positions for purposes of clarity. Thus, the operation of multiplexer 1027 preferably puts the interface 8004 into the write mode. Multiplexer section 1027d connects the horizontal sync pulse to the clock input of a conventional bit counter 1029 which will therefore advance one count for each TV line after the start of the write cycle. The write cycle preferably lasts for eight horizontal lines. During each of the eight horizontal lines, one bit from the main memory 1030 through 1042 of each character is preferably written into the buffer memory 1011. Thus, for example, for line one, no bit is selected; for line two, bit 7 for every character in line two is selected; for line three, bit 6 for every character in line three is selected; for line four, bit 5 for every character in line four is selected; for line five, bit 4 for every character in line five is selected; for line six, bit 3 for every character in line six is selected; for line seven, bit 2 for every character in line seven is selected; and for line eight, bit 2 for every character in line seven is again selected; however, it is inverted. A conventional bit select multiplexer 1031 preferably selects the appropriate main memory stage 1030 through 1042 line for each of the eight counts. During the first count, no line is selected if there are only 7 bits per character. During the second count, the memory line corresponding to the 7th bit is selected. This process continues for each line with the memory line for the second bit being selected on the seventh count. As was previously mentioned, on the eighth count the memory line for the second bit is again selected, but it is applied to multiplexer 1031 through an inverter 1033. The purpose of the above procedure is to preferably convert the standard 6 bit ASCII code from the main memory 1030 through 1042 into a 7 bit standard ASCII code which is used by the printer 8006, such conversion preferably being conventional. The output of multiplexer 1031 is preferably applied to the D input of a flip-flop 1035 which is clocked by the PRINTER LATCH CLOCK provided via path 1037 from gate 1094 (FIG. 14) and is preferably the same waveform that operates the character generator 570 (FIG. 14). Flip-flop 1035, as was previously mentioned, is a D flip-flop and, thus, the output follows the input but is delayed by an amount determined by the PRINTER LATCH CLOCK 1037. The purpose of flip-flop 1035 is to preferably provide a logic level which is stable for the full character period to the buffer memory 1011. The clocking of memory 1011 is preferably accomplished via R/W line 1039 through multiplexer section 1027a which is shown in the write position in FIG. 25, this signal being a clock signal provided by multiplexer 1041. The select inputs of multiplexer 1041 which are 1043a, 1043b and 1043c, preferably select either a low or high level to provide a clock waveform via path 1039 with a period equal to a character period. The timing of the clock waveform 1039 is preferably such that data is clocked in memory 1011 after the data has been loaded into the flip-flop 1035. Memory 1011 is preferably a one-by-1024 bit static random access memory. Thus, it preferably has one data input line and ten address lines with three of the address lines preferably being used for the bit address, allowing 8 bits per character, and six of the address lines preferably being used for the character address, allowing for up to 64 characters, one of these character address lines not being utlized when 32 character lines are to be printed as opposed to 64 character lines. The tenth address line is preferably not utilized. The bit address for memory 1011 preferably comes from the same bit counter 1029 that operates the bit select multiplexer 1031, while the character address preferably comes from a pair of conventional character counters 1045 and 1047. During the write mode of operation, the character counters 1045 and 1047 are preferably utilized simply as latches to store the character address for the main memory 1030 through 1042 and to apply it to the buffer memory 1011. The character address is strobed into the character counters 1045 and 1047 by the PRINTER LATCH CLOCK 1037. The load input to counters 1045 and 1047 is preferably held low during the write mode by flip-flop 1025. It should be noted that the bits need only be selected at the character rate not at the bit rate since a given bit number for each line in the character contains the same information to the character generator input for that character; therefore, for example, bit 1 provides the same bit 1 information for all nine lines; similarly bit 2 provides the same bit 2 information for all nine lines, etc., thus enabling the use of a lower speed circuit thereby slowing things down so that the printer can be operated at normal speed. Thus, the preferred system takes advantage of the eight-to-one differential between the bit and character rates such as, by way of example, in the 64 character mode the bit rate being 10.2 megahertz and the character rate being approximately 1.28 megahertz, while in the 32 character mode the bit rate being 5.1 megahertz and the character rate being approximately 0.64 megahertz. Summarizing the above described memory write cycle, this cycle starts with the bit counter 1029 preferably set for bit 1 which corresponds to count 0, the character counters 1045 and 1047 addressing characters 1 through 32 or 1 through 64 and writing all zeros into memory 1011. At the start of the next TV line, the bit address out of counter 1029 is advanced by one and the character counters 1045 and 1047 again address characters 1 through 32 or 1 through 64 depending on whether it is in a 32 character mode or a 64 character mode and write bit 7 into memory 1011. This preferably continues through eight counts or bits of the bit counter 1029, writing bits 6, 5, 4, 3, and 2 into memory 1011 as the line changes. At the beginning of the ninth TV line, the D output of bit counter 1029 preferably goes high to the K input of flip-flop 1025 causing flip-flop 1025 to be reset at the trailing edge of the horizontal sync pulse. The resetting of flip-flop 1025 thereby terminates the write mode with flip-flop 1023 having previously been reset after flip-flop 1025 was set.

Now describing the output mode, which with reference to FIG. 25 is a mode in which all multiplexer sections or switches are set at the R or read position, all of these sections or switches being at the W or write position in the write mode. The output mode preferably comprises the print mode, the line feed mode, the carriage return mode and the space mode. During the output mode, the bit clock is preferably generated by a conventional oscillator 1049 which preferably comprises a conventional integrated circuit oscillator such as an NE555V, which is set at a frequency of preferably 110 hertz for the 110 baud rate described above by way of example. This corresponds to a print rate of 10 characters per second using an 11 bit per character format. It should be noted, however, that the printer rate can be set at any desired value merely by changing the oscillator 1049 rate, although the presently preferred printer rate is 110 baud. An 11 bit format preferably consists of one start bit, 7 character bits, one parity bit, which is preferably not utilized, and 2 stop bits. During the output mode, multiplexer 1027 is preferably not activated and the output of oscillator 1049 is preferably applied through multiplexer section 1027d to the clock input of bit counter 1029, which counter can preferably count up to 16 for the example given, although counter 1029 preferably operates in a count 11 mode. Thus, preferably when the output of counter 1029 is equal to binary 10, a gate 1051 connected thereto acts as a decoder and applies a negative level to the clear input of counter 1029 through a two input NOR gate 1053 whose other input is connected to the J output of J-K flip-flop 1025. Preferably, counter 1029 has a synchronous clear so that it is cleared to zero on the next clock following count 11. In addition during the output mode, counter 1029 preferably establishes the bit sequence of the serial line to the printer 8006 with the counter 1029 count value 0, corresponding to count one, establishing the printer start bit and with counter values 1 through 7, corresponding to counts two through eight, establishing the data bits, count values 9 and 10, corresponding to counts 10 and 11, establishing the printer stop bits, and with count value 8, corresponding to count 9, preferably not being utilized.

With reference to the print mode, microprocessor 6000 preferably initiates a print cycle, as was previously mentioned, by pulsing line 1013. This pulse, provided via path 1013, is the PRINT COMMAND and clocks a flip-flop 1055 to its set state. The set output of flip-flop 1055 is preferably applied to the enable inputs P and T of character counter 1045 which then advances when clocked by the D output of bit counter 1029. Thus, character counter 1045 advances at count value 8 of the bit counter 1029 which is the D output of counter 1029. As a result, the memory 1011 is addressed sequentially through the bit and character values that constitute one row. Thus, the output of memory 1011 is a serial bit stream when bits 1 through 8 of character 1 first appear with bits 1 through 8 of subsequent characters following. In each case, bit 1 is a zero level and bits 2 through 8 are the bit values of the character retrieved from memory 1011. The output of memory 1011 is preferably applied to one input of a two input NOR gate 1057, the other input thereto preferably being provided from the reset output of flip-flop 1055 which is low during the print mode. Thus the output of gate 1057 is the inverted bit stream from memory 1011, this inverted bit stream preferably being applied to one input of a negative NAND gate 1059, the other input thereto being low during the print mode so that the non-inverted bit stream is present at the output of gate 1059. The output of gate 1059 is provided as one input to a two input NOR gate 1061, the other input thereto being the D output of bit counter 1029 which is preferably high during bits 9, 10 and 11. Thus, the output of gate 1061 is inverted data including the printer start bit during bits 1 through 8, but is a steady low level during bits 9, 10 and 11. The output of gate 1061 is preferably inverted by an inverter 1063 to provide the final serial output through a level changer 1065 to the printer 8006. The output of inverter 1063 preferably has a high level during bit 1, which is the printer start bit, and follows the data during bits 2 through 8, with this output being low during bits 9, 10 and 11. This corresponds to the prescribed preferred EIA format for a 0 start bit and two 1 start bits. Level changer 1065, which is also a line driver, preferably generates an output signal such as, by way of example, with +12 volts representing binary 0 and −12 volts representing binary 1, these levels being prescribed by the EIA serial line interface standard. At the end of the row, a decoder 1067 preferably provides a negative level to reset flip-flop 1055 with the decoder 1067 preferably being programmed via line or path 1021 from the microprocessor 6000 by setting the appropriate input levels to provide a negative output in the case of a 64 character format at count value 64, which is at the beginning of count 65 of the character counter 1047, and to provide a negative output in the 32 character mode at count value 32, which is at the beginning of count 33 of character counter 1047. This resetting of flip-flop 1055 preferably terminates the print mode.

The microprocessor 6000 can also preferably command a single special function character such as for example LINE FEED, CARRIAGE RETURN or SPACE. Preferably, if the microprocessor 6000 wants a repeated special function character, it must recommand the character after adequate time, such as for example, 0.1 seconds for a 110 baud rate, has elapsed for the first special function character to have been issued to the printer 8006. A multiplexer 1069, such as a Texas Instruments SN74151AN, is provided which preferably functions as a programmable character generator to provide the proper bit sequence that corresponds to the special character which has been requested. The microprocessor 6000 commands a line feed preferably by pulsing line 1015 with the LINE FEED COMMAND. This clears flip-flop 1071 which is normally in a set state with flip-flop 1071 setting a low level at bit input 2 of multiplexer 1069 via path 1071a, and also sets bit input 4 low via NOR gate 1072, all other bit inputs to multiplexer 1069 preferably being high. Multiplexer 1069 preferably sequentially switches the bit inputs 0 through 7 to the output Y under control of the inputs A, B, C from bit counter 1029. As a result, a serial output is applied from multiplexer 1069 to one input of gate 1059. At this time, the other input to gate 1059 is preferably a steady low level so that the single character bit stream is provided to the NOR gate 1061. This bit stream is preferably combined with the stop bits and is applied to the output line to printer 8006 from level changer and line driver 1065 in the same manner as previously described with respect to the print mode. At the completion of one special character, flip-flop 1071 is preferably reset by the D output of bit counter 1029 via multiplexer section or switch 1027c, NAND gate 1073 and inverter 1075, with the output of inverter 1075 preferably being connected in parallel to also provide the character clock for the microprocessor 6000. This preferably completes a line feed cycle.

When a CARRIAGE RETURN COMMAND is requested by the microprocessor 6000, it pulses line 1017 and clears flip-flop 1077 which then sets bit input numbers 1, 3 and 4 low to multiplexer 1069, multiplexer 1069 then generating a single character return ASCII code in the manner as previously described with respect to the LINE FEED code. Flip-flop 1077 is also preferably reset in the same manner as previously described with respect to the LINE FEED by the next character clock from inverter 1075.

When the microprocessor 6000 commands a space by providing the SPACE COMMAND by pulsing line 1019, flip-flop 1079 is cleared which then sets bit input number 6 low to multiplexer 1069 causing multiplexer 1069 to then generate a single space ASCII code in the same manner as previously described with respect to LINE FEED. Flip-flop 1079 is also preferably reset in the same manner as previously described with respect to LINE FEED by the next character clock provided from inverter 1075.

It should be noted that preferably the character counters 1045 and 1047 are cleared during either a line feed or carriage return by the low level from NOR gate 1072. Thus, one row cannot follow another to printer 8006 unless a LINE FEED or CARRIAGE RETURN is issued. However, normally microprocessor 6000 will generate such a CARRIAGE RETURN and LINE FEED between each row. Thus, the interface 8004 enables the microprocessor 6000 to make the following types of decisions: what row to be printed, how many rows, whether to print a 32 or 64 character row, how much marginal space for the row and whether or not extra spaces are to be placed between rows. These decisions are based on keyboard inputs from the operator provided to the microprocessor 6000, and inputs from the transmitted data in the form of special characters, directed messages or override messages provided to the microprocessor 6000. Due to all of the above, the computer/printer interface 8004 enables a system to have the following capabilities: the operator can print a complete page of displayed information or any selected row or group of rows of displayed information; it provides the capability to print an override message, such as an emergency message, without operator involvement as is also true with respect to a directed message; it permits the operator to select a special print mode wherein a row or page which he has selected will be reprinted whenever data on the selected row or page is changed with operator involvement not being required after initial selection of the mode, this operation being activated by a one time per update special character on the updated row; and special messages such as override messages can be emphasized by using extra line feeds between rows.

Figure 29:
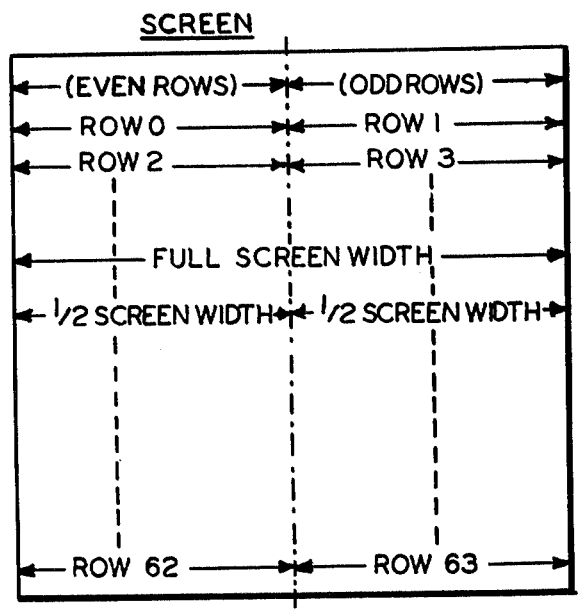
FIG. 29 is a diagrammatic illustration of a video display screen for providing 32 and/or 64 character display selection.
Figure 30:
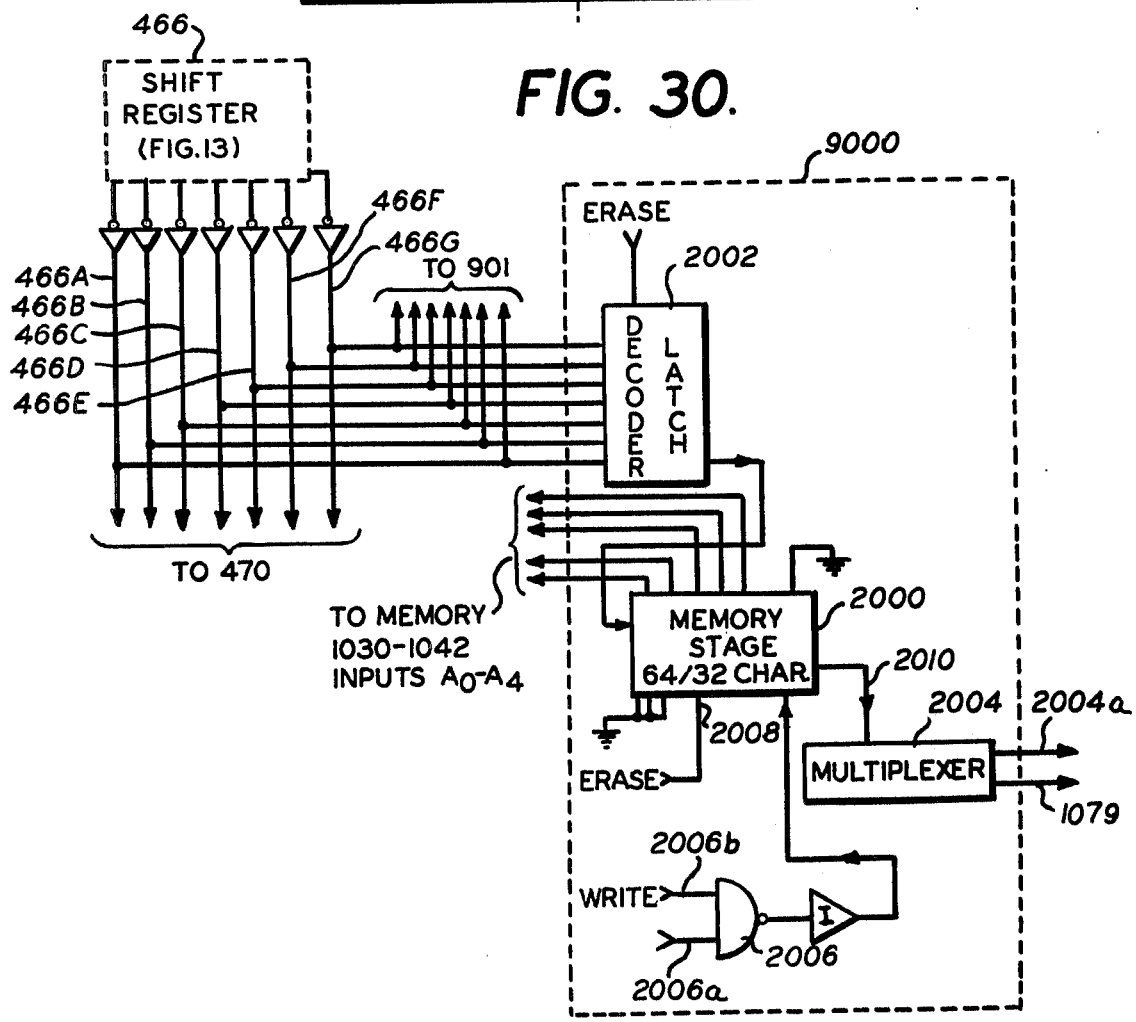
FIG. 30 is a fragmentary block diagram, partially in schematic, of an additional portion of the memory and output processing portion of the receiver illustrated in FIG. 13 for providing 32 and/or 64 character selection.

Lastly, referring now to FIGS. 29 and 30, with FIG. 30 being a modification to a portion of FIG. 13, a preferred circuit 9000 for providing a row-by-row determination of 64 character or 32 character display of a row in the system of the present invention shall be described. This circuit 9000 may be omitted without departing from the spirit and scope of the present invention if such row-by-row determination of 64 or 32 character display is not desired. As shown and preferred in FIG. 29, assuming such a 64 or 32 character row-by-row determination is desired, the display screen for the display device 2013 is preferably considered as comprising two half screen widths with the left hand half of the screen preferably displaying even rows which are rows 0 through 62, and with the right hand half of the screen preferably displaying odd rows, which are rows 1 through 63. It should be noted that during normal display as previously described, a row is defined as being contained in the full screen width; however, in the instance of a row-by-row determination of 64 or 32 character display, it is preferable to consider half of the screen as comprising a row with each row in this instance comprising half a message for the pseudo video scan line. Preferably, in determining whether to provide a 32 or 64 character display for a given row, if 32 characters are contained in the even row, that is rows 0, 2, 4, 6, etc., up to row 62, then only the even row is displayed for the full screen width irrespective of the presence of an odd row in memory. If, however, there are 64 characters contained in the even row, then both the odd and the even row are displayed. In the preferred circuit arrangement 9000, no weight is given to the presence of a 64 or 32 character bit in the odd row, only the presence of this bit in the even row being considered. As will further be explained in greater detail, the control of the clock rate determines whether a 32 character or 64 character row is displayed, the memory being read twice as fast for display of a 64 character row as for a normal 32 character row, although the write speed for both a 32 and a 64 character row is the same because of the same speed of transmission in the preferred system of the present invention which receives row-by-row or pseudo video scan line-by-pseudo video scan line. In the system described in our previous U.S. Pat. No. 3,889,054, the 32 or 64 character determination was based on a page-by-page basis and each row had to have a 32 character or 64 character bit according to the page sent or the display screen would flash between 32 character and a 64 character display effecting the readability of the display. As shown and preferred in FIG. 30, the memory 1030 through 1042 preferably includes another memory stage 2000 for purposes of determining whether the row is to be a 64 or 32 character row display, memory 2000 only looking at the row position and not at the character position. Preferably, the even row message which is contained in row 0, 2, etc., through row 62, includes the 64/32 character bit. When the characters are loaded into memory 1030 through 1042 for the even row, from shift register 466 (FIG. 13), a decoder latch 2002 preferably decodes the 64/32 character bit which is then loaded or written into memory stage 2000. The row position in memory stage 2000 is determined by row latch 470 through multiplexer 1020. The character position of memory stage 2000 is preferably ignored. On read out, the 64/32 character bit from memory stage 2000 is then preferably read into multiplexer 2004 which then makes a switch connection to gate 1090 (FIG. 14) via path 2004a (FIG. 14) and to divide-by-eight counter 1080 via path 1079 (FIG. 14) to double the clock frequency of the prime clock to provide for the 64 character row by proper timing. For a 32 character row, multiplexer switch 2004 is left in the normal position with no output being provided via 2004a and 1079 which, as shown in FIG. 14, are in the 32 character position, so that only the prime clock non-doubled output is provided for 32 character row timing.

Now describing the adjacent odd row message gating although if desired, the odd row gating can be omitted if the odd row is not transmitted with a 32/64 character bit. Furthermore, the 32/64 character bit in the odd row message can be discarded in other conventional ways than to be described hereinafter if desired. As shown and preferred, when the odd bit of row latch 470 through multiplexer 1020 is on, indicating the presence of an odd row, which information is provided via path 2006a to a two input NAND gate 2006, and the system is loading or writing into memory 1030 through 1042 and stage 2000, as indicated by the presence of a write signal via path 2006b to gate 2006, the memory location for the odd row in memory stage 2000 is preferably changed to an unused memory location and the output of memory stage 2000 to multiplexer switch 2004 remains the same as for the previous even row message in that line. The ignoring of the first bit in the digital output of multiplexer 1020 (FIG. 13) will always provide the even row input to memory stage 2000. This is accomplished by preferably grounding the first bit row input to memory stage 2000 from multiplexer 1020. In order to ignore the 64/32 character bit when reading the odd row, then when writing the odd row, the 32/64 character bit is preferably put in an unused location by enabling this unused location in memory stage 2000 through gate 2006 whose input is the first bit position from row latch register 470, which is always preferably a 1 for the odd numbers and a 0 for the even numbers. Therefore, gate 2006 is enabled only when the input provided via path 2006a is a 1 and the write mode, also indicated by a 1, is provided via 2006b or, in other words, only for an odd row.

Lastly, discussing erase of memory stage 2000, when the normal erase is provided to the memory 1030 through 1042, preferably a common space character is put in all positions of the memory. When the 64 character row is erased, in order to insure that this row remains a 64 character row or, similarly, for a 32 character row, in order to insure it remains a 32 character row, in erasing the memory location in memory stage 2000 this memory location is positioned to an unused location without erasing the previously loaded memory bit 2010 from memory stage 2000, the erase signal via path 2008 together with the row input determining the location in memory 2000.

It should be noted that the description of the balance of the circuitry disclosed herein relating to the row grabbing system 10 which is common to our previous U.S. Pat. No. 3,889,054, and which has not been repeated herein, is specifically incorporated by reference herein and the identical reference numerals therefor are utilized herein for clarity. Furthermore, any other disclosed circuitry not specifically described in detail herein is conventional and readily understandable by one of ordinary skill in the art without further explanation and, accordingly, will not be described in further detail. In addition, it is to be understood that all logic described herein is conventional unless otherwise specified.

By utilizing the improved row grabbing system of the present invention in which grabbed frames may be updated on a row-by-row basis, conventional television transmission techniques and distribution equipment can be utilized for transmission and reception of data which has been packed into pseudo video scan lines which look like a conventional TV scan line to television equipment but contain a complete packet of information suitable for display of an entire row of video information with enhanced noise immunity to any jitter or noise present on each received pseudo video scan line being processed as well as clock phase correction for the receiver terminal on every data transition of the received pseudo video scan line whereby the received information will be essentially noise insensitive. Furthermore, by utilizing the preferred distortion compensation circuit of the present invention, both zero-to-one and one-to-zero transition signal distortions in which the zeroes and/or ones of an input digital signal, such as a pseudo video scan line, do not always return to the same level, can be compensated for to provide a compensated output digital signal in which all ones and all zeroes are of the same respective levels.

It is to be understood that the above described embodiments of the invention are merely illustrative of the principles thereof and that numerous modifications and embodiments of the invention may be derived within the spirit and scope thereof.

What is claimed is:

1. An apparatus for compensating for signal distortions in an input digital signal comprising a plurality of ones and zeros defining an information content for said input digital signal, said input digital signal having associated peak-to-peak signal levels, respectively, defining said ones and zeros wherein said signal distortions in said input digital signal comprise said respective peak-to-peak signal levels associated with at least some of said plurality of ones and zeros comprising said input digital signal differing from said respective peak-to-peak signal levels associated with others of said plurality of ones and zeros comprising said input digital signal, said peak-to-peak signal levels of said input digital signal resulting from zero-to-one and one-to-zero transitions in said input digital signal, said compensating apparatus providing a compensated output digital signal from said distorted input digital signal having the same information content as said input digital signal defined information content, said plurality of ones and said plurality of zeros comprising said compensation output digital signal all having the same respective peak-to-peak signal levels varying about a common base level, said compensating apparatus comprising means for tracking said zero-to-one and one-to-zero transitions in said input digital signal, first means operatively connected to said tracking means and responsive to each tracked zero-to-one transition in the peak-to-peak signal level of said input digital signal for clamping the level of said zero-to-one transition at a first predetermined signal level irrespective of any continued rise in said level of said distorted input digital signal zero-to-one transition and maintaining said clamped zero-to-one transition at said first predetermined signal level until the presence of a subsequent one-to-zero transition in said distorted input digital signal is detected whereby said signal level becomes unclamped, said tracking means tracking said subsequent one-to-zero transition in said unclamped signal, and second means operatively connected to said tracking means and responsive to said tracked subsequent one-to-zero transition for said unclamped signal for reclamping the level of said tracked subsequent one-to-zero transition at a second predetermined signal level irrespective of any continued fall in said level of said distorted input digital signal subsequent one-to-zero transition until the presence of a subsequent zero-to-one transition in said distorted input digital signal is detected whereby said signal level of said reclamped signal again becomes unclamped, whereby said compensated output digital signal is provided from said distorted input signal.

2. A compensating apparatus in accordance with claim 1 wherein said tracking means tracks said subsequent zero-to-one transition in said again unclamped signal and said zero-to-one transition responsive means is responsive to said tracked subsequent zero-to-one transition for providing said clamping thereof at said first predetermined signal level until another subsequent one-to-zero transition in said distorted input digital signal is detected, whereby said signal level once again becomes unclamped, said tracking means and said first and second clamping means cyclically clamping and unclamping said distorted input digital signal at said respective first and second predetermined levels in accordance with the occurrence of the respective zero-to-one and one-to-zero transitions in the peak-to-peak signal level of said distorted input digital signal for providng said compensated output digital signal.

3. A compensating apparatus in accordance with claim 1 wherein said second predetermined signal level is the negative of said first predetermined signal level, said compensated output digital signal plurality of ones and zeros varying in level about a zero common base level.

4. A compensating apparatus in accordance with claim 1 wherein said first predetermined signal level is a first predetermined value above said common base level, and said second predetermined signal level is a second predetermined value below said common base level, said first and second predetermined values being equal in magnitude.

5. A compensating apparatus in accordance with claim 1 wherein said distorted input digital signal comprises a distorted input digital video signal and said compensated output digital signal comprises a compensated output digital video signal.

6. A compensating apparatus in accordance with claim 5 wherein said input digital video signal comprises a pseudo video scan line having a television video scan line format and capable of comprising a complete self-contained packet of digital information sufficient to provide an entire video displayable row of video data characters, said pseudo video scan line having an associated transmission time equivalent to said television video scan line.

7. A compensating apparatus in accordance with claim 6 wherein said pseudo video scan line comprises a composite video signal.

8. A compensating apparatus in accordance with claim 6 wherein said packet of digital information comprises at least address information for said displayable row and data information for said displayable characters in said displayable row.

9. A compensating apparatus in accordance with claim 1 where said first predetermined signal level clamping means comprises first diode means and said first predetermined signal level is substantially the threshold voltage of said first diode means.

10. A compensating apparatus in accordance with claim 9 wherein said second predetermined signal clamping means comprises second diode means and said second predetermined signal level is substantially the threshold voltage of said second diode means.

11. A compensating apparatus in accordance with claim 10 wherein said tracking means comprises capacitive means.

12. A compensating apparatus in accordance with claim 11 further comprising means for providing a compensating charge voltage to the clamped signal for compensating for any decay in said clamped signal resulting from the occurrence of successive ones in said input digital signal and to the reclamped signal for compensating for any decay in said reclamped signal resulting from the occurrence of successive zeros in said input digital signal.

13. A compensating apparatus in accordance with claim 12 wherein said decay compensating means comprises a resistive-capacitive network means.

14. A compensating apparatus in accordance with claim 1 wherein said tracking means comprises capacitive means.

15. A compensating apparatus in accordance with claim 14 further comprising means for providing a compensating charge voltage to the clamped signal for compensating for any decay in said clamped signal resulting from the occurrence of successive ones in said input digital signal and to the reclamped signal for compensating for any decay in said reclamped signal resulting from the occurrence of successive zeros in said input digital signal.

16. A compensating apparatus in accordance with claim 15 wherein said decay compensating means comprises a resistive-capacitive network means.

17. A compensating apparatus in accordance with claim 1 wherein said second predetermined signal level clamping means comprises diode means and said second predetermined signal level is substantially the threshold voltage of said diode means.

18. A compensating apparatus in accordance with claim 10 wherein said first and second diode means comprise silicon diode means.

19. A compensating apparatus in accordance with claim 9 wherein said first diode means is a silicon diode means, said first predetermined signal level having a magnitude of substantially 0.7 volts.

20. A compensating apparatus in accordance with claim 19 wherein said second predetermined signal level clamping means comprises second silicon diode means and said second prdetermined signal level is substantially the threshold voltage of said silicon diode means and has a magnitude of substantially −0.7 volts, said common base level being 0 volts.

21. A compensating apparatus in accordance with claim 2 wherein said first predetermined signal level is a first predetermined value above said common base level, and said second predetermined signal level is a second prdetermined value below said common base level, said first and second predetermined values being equal in magnitude.

22. A compensating apparatus in accordance with claim 2 wherein said distorted input digital signal comprises a distorted input digital video signal and said compensated output digital signal comprises a compensated output digital video signal.

23. A compensating apparatus in accordance with claim 22 wherein said input digital video signal comprises a pseudo video scan line having a television video scan line format and capable of comprising a complete self-contained packet of digital information sufficient to provide an entire video displayable row of video data characters, said pseudo video scan line having an associated transmission time equivalent to said television video scan line.

24. A compensating apparatus in accordance with claim 23 wherein said pseudo video scan line comprises a composite video signal.

25. A compensating apparatus in accordance with claim 23 wherein said packet of digital information comprises at least address information for said displayable row and data information for said displayable characters in said displayable row.

26. An apparatus for compensating for signal distortions in an input digital signal comprising a plurality of ones and zeroes defining an information content for said input digital signal, said input digital signal having associated peak-to-peak signal levels respectively defining said ones and zeroes wherein said signal distortions in said input digital signal comprise said respective peak-to-peak signal levels associated with at least some of said plurality of ones and zeroes comprising said input digital signal differing from said respective peak-to-peak signal levels associated with others of said plurality of ones and zeroes comprising said input digital signal, said peak-to-peak signal levels of said input digital signals resulting from zero-to-one and one-to-zero transitions in said input digital signal, said compensating apparatus providing a compensated output digital signal from said distorted input digital signal having the same information content as said input digital signal defined information content, said plurality of ones and said plurality of zeroes comprising said compensated output digital signal all having the same respective peak-to-peak signal levels varying about a common base level, said compensating apparatus comprising means for tracking said zero-to-one and one-to-zero transitions in said input digital signal, first means operatively connected to said tracking means and response to each tracked one-to-zero transition in the peak-to-peak signal level of said input digital signal for clamping the level of said one-to-zero transition at a first predetermined signal level irrespective of any continued fall in said level of said distorted input digital signal one-to-zero transition and maintaining said clamped one-to-zero transition at said first predetermined signal level until the presence of a subsequent zero-to-one transition in said distorted input digital signal is detected whereby said signal level becomes unclamped, said tracking means tracking said subsequent zero-to-one transition in said unclamped signal, and second means operatively connected to said tracking means and responsive to said tracked subsequent zero-to-one transition for said unclamped signal for reclamping the level of said tracked subsequent zero-to-one transition at a second predetermined signal level irrespective of any continued rise in said level of said distorted input digital signal subsequent zero-to-one transition until the presence of a subsequent one-to-zero transition in said distorted input digital signal is detected whereby said signal level of said reclamped signal again becomes unclamped, whereby said compensated output digital signal is provided from said distorted input signal.

27. A compensating apparatus in accordance with claim 26 wherein said tracking means tracks said subsequent one-to-zero transition in said again unclamped signal and said one-to-zero transition responsive means is responsive to said tracked subsequent one-to-zero transition for providing said clamping thereof at said first predetermined signal level until another subsequent zero-to-one transition in said distorted input digital signal is detected whereby said signal level once again becomes unclamped, said tracking means and said first and second clamping means cyclically clamping and unclamping said distorted input digital signal at said respective first and second predetermined levels in accordance with the occurrence of the respective one-to-zero and zero-to-one transitions in the peak-to-peak signal level of said distorted input digital signal for providing said compensated output digital signal.

28. In a real time frame grabbing video display terminal for substantially instantaneously providing a continuous direct video display of a selectable predetermined video frame of information on a video display means from continuously receivable information remotely provided over a transmission media, said continuously receivable information comprising a plurality of pseudo video scan lines, each of said pseudo video scan lines having a television video scan line format and capable of comprising a complete self-contained packet of digital information sufficient to provide an entire displayable row of video data characters, said pseudo video scan line having an associated transmission time equivalent to said television video scan line, said packet of digital information comprising at least address information for said displayable row and data information for said displayable characters in said displayable row, said pseudo video scan line being a composite video signal, said terminal comprising microcomputer means for controlling the operation thereof, said microcomputer means being operatively connected to said transmission media for receiving said continuously receivable information and selection means operatively connected to said microcomputer means for variably selecting said predetermined video frame to be continuously displayed; the improvement comprising an apparatus for compensating for signal distortions in said received pseudo video scan line, said received pseudo video scan line comprising a plurality of ones and zeroes defining said digital information, said received pseudo video scan line having associated peak-to-peak signal levels respectively defining said ones and zeroes wherein said signal distortios in said received pseudo video scan line comprise said respective peak-to-peak signal levels associated with at least some of said plurality of ones and zeroes comprising said received pseudo video scan line differing from said respective peak-to-peak signal levels associated with others of said plurality of ones and zeroes comprising said received pseudo video scan line, said peak-to-peak signal levels of said received pseudo video scan line resulting from zero-to-one and one-to-zero transitions in said received pseudo video scan lines, said compensating apparatus providing a compensated output pseudo video scan line from said distorted received pseudo video scan line having the same information as said received pseudo video scan line defined information, said plurality of ones and said plurality of zeroes comprising said compensated pseudo video scan line all having the same respective peak-to-peak signal levels varying about a common base level, said compensating apparatus comprising means for tracking said zero-to-one and one-to-zero transitions in said received pseudo video scan line, first means operatively connected to said tracking means and responsive to each tracked zero-to-one transition in the peak-to-peak signal level of said received pseudo video scan line for clamping the level of said zero-to-one transition at a first predetermined signal level irrespective of any continued rise in said level of said distorted received pseudo video scan line zero-to-one transition and maintaining said clamped zero-to-one transition at said first predetermined signal level until the presence of a subsequent one-to-zero transition in said distorted received pseudo video scan line is detected whereby said signal level becomes unclamped, said tracking means tracking said subsequent one-to-zero transition in said unclamped signal, and second means operatively connected to said tracking means and responsive to said tracked subsequent one-to-zero transition for said unclamped signal for reclamping the level of said tracked subsequent one-to-zero transition at a second predetermined signal level irrespective of any continued fall in said level of said distorted received pseudo video scan line subsequent one-to-zero transition until the presence of a subsequent zero-to-one transition in said distorted received pseudo video scan line whereby said signal level of said reclamped signal again becomes unclamped, whereby said compensated pseudo video scan line is provided from said distorted received pseudo video scan line for providing said continuous direct video display.

29. An improved terminal in accordance with claim 28 wherein said compensating apparatus tracking means tracks said subsequent zero-to-one transition in said again unclamped signal and said zero-to-one transition responsive means is responsive to said tracked subsequent zero-to-one transition for providing said clamping thereof at said first predetermined signal level until another subsequent zero-to-one transition in said distorted received pseudo video scan line is detected whereby said signal level once again becomes unclamped, said tracking means and said first and second clamping means cyclically clamping and unclamping said distorted received pseudo video scan line at said respective first and second predetermined levels in accordance with the occurrence of the respective zero-to-one and one-to-zero transitions in the peak-to-peak signal level of said distorted received pseudo video scan line for providing said compensated pseudo video scan line.

30. An improved terminal in accordance with claim 28 wherein said compensating apparatus first predetermined signal level is a first predetermined value above said common base level, and said second predetermined signal level is a second predetermined value below said common base level, said first and second predetermined values being equal in magnitude.

31. An improved terminal in accordance with claim 28 wherein said compensating apparatus first predetermined signal level clamping means comprises first diode means and said first predetermined signal level is substantially the threshold voltage of said first diode means.

32. An improved terminal in accordance with claim 31 wherein said compensating apparatus second predetermined signal level clamping means comprises second diode means and said second predetermined signal level is substantially the threshold voltage of said second diode means.

33. An improved terminal in accordance with claim 32 wherein said compensating apparatus tracking means comprises capacitive means.

34. An improved terminal in accordance with claim 33 wherein said compensating apparatus further comprises means for providing a compensating charge voltage to the clamped signal for compensating for any decay in said clamped signal resulting from the occurrence of successive ones in said received pseudo video scan line and to the reclamped signal for compensating for any decay in said reclamped signal resulting from the occurrence of successive zeros in said received pseudo video scan line.

35. An improved terminal in accordance with claim 28 wherein said compensating apparatus tracking means comprises capacitive means.

36. An improved terminal in accordance with claim 35 wherein said compensating apparatus further comprises means for providing a compensating charge voltage to the clamped signal for compensating for any decay in said clamped signal resulting from the occurrence of successive ones in said received pseudo video scan line and to the reclamped signal for compensating for any decay in said reclamped signal resulting from the occurrence of successive zeros in said received pseudo video scan line.

37. In a real time frame grabbing video display terminal for substantially instantaneously providing a continuous direct video display of a selectable predetermined video frame of information on a video display means from continuously receivable information remotely provided over a transmission media, said continuously receivable information comprising a plurality of pseudo video scan lines, each of said pseudo video scan lines having a television video scan line format and capable of comprising a complete self-contained packet of digital information sufficient to provide an entire displayable row of video data characters, said pseudo video scan line having an associated transmission time equivalent to said television video scan line, said packet of digital information comprising at least address information for said displayable row and data information for said displayable characters in said displayable row, said pseudo video scan line being a composite video signal, said terminal comprising microcomputer means for controlling the operation thereof, said microcomputer means being operatively connected to said transmission media for receiving said continuously receivable information and selection means operatively connected to said microcomputer means for variably selecting said predetermined video frame to be continuously displayed; the improvement comprising an apparatus for compensating for signal distortions in said received pseudo video scan line, said received pseudo video scan line comprising a plurality of ones and zeroes defining said digital information, said received pseudo video scan line having associated peak-to-peak signal levels respectively defining said ones and zeroes wherein said signal distortions in said received pseudo video scan line comprise said respective peak-to-peak signal levels associated with at least some of said plurality of ones and zeroes comprising said received pseudo video scan line differing from said respective peak-to-peak signal levels associated with others of said plurality of ones and zeroes comprising said received pseudo video scan line, said peak-to-peak signal levels of said received pseudo video scan line resulting from zero-to-one and one-to-zero transitions in said received pseudo video scan lines, said compensating apparatus providing a compensated output pseudo video scan line from said distorted received pseudo video scan line having the same information as said received pseudo video scan line defined information, said plurality of ones and said plurality of zeroes comprising said compensated pseudo video scan line all having the same respective peak-to-peak signal levels varying about a common base level, said compensating apparatus comprising means for tracking said zero-to-one and one-to-zero transitions in said received pseudo video scan line, first means operatively connected to said tracking means and responsive to each tracked one-to-zero transition in the peak-to-peak signal level of said received pseudo video scan line for clamping the level of said one-to-zero transition at a first predetermined signal level irrespective of any continued fall in said level of said distorted received pseudo video scan line one-to-zero transition and maintaining said clamped one-to-zero transition at said first predetermined signal level until the presence of a subsequent zero-to-one transition in said distorted received pseudo video scan line is detected whereby said signal level becomes unclamped, said tracking means tracking said subsequent zero-to-one transition in said unclamped signal, and second means operatively connected to said tracking means and responsive to said tracked subsequent zero-to-one transition for said unclamped signal for reclamping the level of said tracked subsequent zero-to-one transition at a second predetermined signal level irrespective of any continued rise in said level of said distorted received pseudo video scan line subsequent zero-to-one transition until the presence of a subsequent one-to-zero transition in said distorted received pseudo video scan line is detected whereby said signal level of said reclamped signal again becomes unclamped, whereby said compensated pseudo video scan line is provided from said distorted received pseudo video scan line for providing said continuous direct video display.

38. An improved terminal in accordance with claim 37 wherein said compensating apparatus tracking means tracks said subsequent one-to-zero transition in said again unclamped signal and said one-to-zero transition responsive means is responsive to said tracked subsequent one-to-zero transition for providing said clamping thereof at said first predetermined signal level until another subsequent zero-to-one transition in said distorted received pseudo video scan line is detected whereby said signal level once again becomes unclamped, said tracking means and said first and second clamping means cyclically clamping and unclamping said distorted received pseudo video scan line at said respective first and second predetermined levels in accordance with the occurrence of the respective one-to-zero and zero-to-one transitions in the peak-to-peak signal level of said distorted received pseudo video scan line for providing said compensated pseudo video scan line.

39. In a real time frame grabbing system for substantially instantaneously providing a continuous video display of a selectable predetermined video frame of information on a video display means from continuously transmittable video information comprising means for transmitting said video information as a plurality of pseudo video scan lines, each of said pseudo video scan lines having a television video scan line format and capable of comprising a complete self-contained packet of digital information sufficient to provide an entire displayable row of video data characters, said pseudo video scan line having an associated transmission time equivalent to said television video scan line, said packet of digital information comprising at least address information for said displayable row and data information for said displayable characters in said displayable row, each of said pseudo video scan lines further comprising a horizontal sync signal at the beginning thereof, said horizontal sync signal providing a record separator between adjacent pseudo video scan lines, said transmitting means further comprising means for providing a vertical sync signal after a predetermined plurality of pseudo video scan lines have been transmitted, said pseudo video scan line being a composite video signal, said system further comprising television signal distribution means for distributing said transmitted composite pseudo video scan line signals to said video display means for providing said continuous video display and receiver means operatively connected between said television signal distribution means and said video display means for processing said distributed composite pseudo video scan line signals and capable of providing a displayable video row signal to said video display means from each of said pseudo video scan line signals pertaining to said selected frame for providing said continuous video display; the improvement comprising an apparatus for compensating for signal distortions in said received pseudo video scan line, said receiver means comprising said compensating apparatus, said pseudo video scan line comprising a plurality of ones and zeroes defining said digital information, said received pseudo video scan line having associated peak-to-peak signal levels respectively defining said ones and zeroes wherein said signal distortions in said received pseudo video scan line comprise said respective peak-to-peak signal levels associated with at least some of said plurality of ones and zeroes comprising said received pseudo video scan line differing from said respective peak-to-peak signal levels associated with others of said plurality of ones and zeroes comprising said received pseudo video scan line, said peak-to-peak signal levels of said received pseudo video scan line resulting from zero-to-one and one-to-zero transitions in said received pseudo video scan line, said compensating apparatus providing a compensated output pseudo video scan line having the same information as said received pseudo video scan line defined information, said plurality of ones and said plurality of zeroes comprising said compensated pseudo video scan line all having the same respective peak-to-peak signal levels varying about a common base level, said compensating apparatus comprising means for tracking said zero-to-one and one-to-zero transitions in said received pseudo video scan line, first means operatively connected to said tracking means and responsive to each tracked zero-to-one transition in the peak-to-peak signal level of said received pseudo video scan line for clamping the level of said zero-to-one transition at a first predetermined signal level irrespective of any continued rise in said level of said distorted received pseudo video scan line zero-to-one transition and maintaining said clamped zeroone transition at said first predetermined signal level until the presence of a subsequent one-to-zero transition in said distorted received pseudo video scan line is detected whereby said signal level becomes unclamped, said tracking means tracking said subsequent one-to-zero transition in said unclamped signal, and second means operatively connected to said tracking means and responsive to said tracked subsequent one-to-zero transition for said unclamped signal for reclamping the level of said tracked subsequent one-to-zero transition at a second predetermined signal level irrespective of any continued fall in said level of said distorted received pseudo video scan line subsequent one-to-zero transition until the presence of a subsequent zero-to-one transition in said distorted received pseudo video scan line is detected whereby said signal level of said reclamped signal again becomes unclamped, whereby said compensated pseudo video scan line is provided from said distorted received pseudo video scan line for providing said continuous video display.

40. An improved system in accordance with claim 39 wherein said compensating apparatus tracking means tracks said subsequent zero-to-one transition in said again unclamped signal and said zero-to-one transition responsive means is responsive to said tracked subsequent zero-to-one transition for providing said clamping thereof at said first predetermined signal level until another subsequent one-to-zero transition in said distorted received pseudo video scan line is detected whereby said signal level once again becomes unclamped, said tracking means and said first and second clamping means cyclically clamping and unclamping said distorted received pseudo video scan line at said respective first and second predetermined levels in accordance with the occurrence of the respective zero-to-one and one-to-zero transitions in the peak-to-peak signal level of said distorted received pseudo video scan line for providing said compensated pseudo video scan line.

41. In a real time frame grabbing system for substantially instantaneously providing a continuous video display of a selectable predetermined video frame of information on a video display means from continuously transmittable video information comprising means for transmitting said video information as a plurality of pseudo video scan lines, each of said pseudo video scan lines having a television video scan line format and capable of comprising a complete self-contained packet of digital information sufficient to provide an entire displayable row of video data characters, said pseudo video scan line having an associated transmission time equivalent to said television video scan line, said packet of digital information comprising at least address information for said displayable row and data information for said displayable characters in said displayable row, each of said pseudo video scan lines further comprising a horizontal sync signal at the beginning thereof, said horizontal sync signal providing a record separator between adjacent pseudo video scan lines, said transmitting means further comprising means for providing a vertical sync signal after a predetermined plurality of pseudo video scan lines have been transmitted, said pseudo video scan line being a composite video signal, said system further comprising television signal distribution means for distributing said transmitted composite pseudo video scan line signals to said video display means for providing said continuous video display and receiver means operatively connected between said television signal distribution means and said video display means for processing said distributed composite pseudo video scan line signals and capable of providing a displayable video row signal to said video display means from each of said pseudo video scan line signals pertaining to said selected frame for providing said continuous video display; the improvement comprising an apparatus for compensating for signal distortions in said received pseudo video scan line, said receiver means comprising said compensating apparatus, said pseudo video scan line comprising a plurality of ones and zeros defining said digital information, said received pseudo video scan line having associated peak-to-peak signal levels respectively defining said ones and zeroes wherein said signal distortions in said received pseudo video scan line comprise said respective peak-to-peak signal levels associated with at least some of said plurality of ones and zeroes comprising said received pseudo video scan line differing from said respective peak-to-peak signal levels associated with others of said plurality of ones and zeroes comprising said received pseudo video scan line, said peak-to-peak signal levels of said received pseudo video scan line resulting from zero-to-one and one-to-zero transitions in said received pseudo video scan line, said compensating apparatus providing a compensated output pseudo video scan line from said distorted received pseudo video scan line having the same information as said received pseudo video scan line defined information, said plurality of ones and said plurality of zeroes comprising said compensated pseudo video scan line all having the same respective peak-to-peak siganl levels varying about a common base level, said compensating apparatus comprising means for tracking said zero-to-one and one-to-zero transitions in said received pseudo video scan line, first means operatively connected to said tracking means and responsive to each tracked one-to-zero transition in the peak-to-peak signal level of said received pseudo video scan line for clamping the level of said one-to-zero transition at a first predetermined signal level irrespective of any continued fall in said level of said distorted received pseudo video scan line one-to-zero transition and maintaining said clamped one-to-zero transition at said first predetermined signal level until the presence of a subsequent zero-to-one transition in said distorted received pseudo video scan line is detected whereby said signal level becomes unclamped, said tracking means tracking said subsequent zero-to-one transition in said unclamped signal, and second means operatively connected to said tracking means and responsive to said tracked subsequent zero-to-one transition for said unclamped signal for reclamping the level of said tracked subsequent zero-to-one transition at a second predetermined signal level irrespective of any continued rise in said level of said distorted received pseudo video scan line subsequent zero-to-one transition until the presence of a subsequent one-to-zero transition in said distorted received pseudo video scan line is detected, whereby said signal level of said reclamped signal again becomes unclamped, whereby said compensated pseudo video scan line is provided from said distorted received pseudo video scan line for providing said continuous video display.

42. An improved system in accordance with claim 41 wherein said compensating apparatus tracking means tracks said subsequent one-to-zero transition in said again unclamped signal and said one-to-zero transition responsive means is responsive to said tracked subsequent one-to-zero transition for providing said clamping thereof at said first predetermined signal level until another subsequent zero-to-one transition in said distorted received pseudo video scan line is detected whereby said signal level once again becomes unclamped, said tracking means and said first and second clamping means cyclically clamping and unclamping said distorted received pseudo video scan line at said respective first and second predetermined levels in accordance with the occurrence of the respective one-to-zero and zero-to-one transitions in the peak-to-peak signal level of said distorted received pseudo video scan line for providing said compensated pseudo video scan line.

* * * * *